United States Patent [19]

Neches et al.

[11] 4,412,285

[45] Oct. 25, 1983

[54] MULTIPROCESSOR INTERCOMMUNICATION SYSTEM AND METHOD

[75] Inventors: Philip M. Neches, Pasadena; David H. Hartke, Los Angeles; Richard C. Stockton; Martin C. Watson, both of Northridge; David Cronshaw, Torrance; Jack E. Shemer, Los Angeles, all of Calif.

[73] Assignee: Teradata Corporation, Inglewood, Calif.

[21] Appl. No.: 250,022

[22] Filed: Apr. 1, 1981

[51] Int. Cl.³ .............................................. G06F 15/16
[52] U.S. Cl. .................................................. 364/200
[58] Field of Search ........................ 364/200 MS File

[56] References Cited

U.S. PATENT DOCUMENTS 3,753,234  8/1973  Gilbert et al. ...................... 364/200
4,229,790  10/1980  Gilliland et al. .................... 364/200
4,344,134  8/1982  Barnes ................................. 364/200

Primary Examiner—Raulfe B. Zache
Attorney, Agent, or Firm—Fraser and Bogucki

[57] ABSTRACT

A system using a sorting network to intercouple multiple processors so as to distribute priority messages to all processors is characterized by semaphore means accessible to both the local processors and the global resource via the network. Transaction numbers identifying tasks are employed in the messages, and interfaces at each processor are locally controlled to establish transaction number related indications of the current status of each task being undertaken at the associated processor. A single query to all processors via the network elicits a prioritized response that denotes the global status as to that task. The transaction numbers also are used as global commands and local controls for the flow of messages. A destination selection system based on words in the messages is used as the basis for local acceptance or rejection of messages. This arrangement together with the transaction number system provides great flexibility as to intercommunication and control.

155 Claims, 32 Drawing Figures

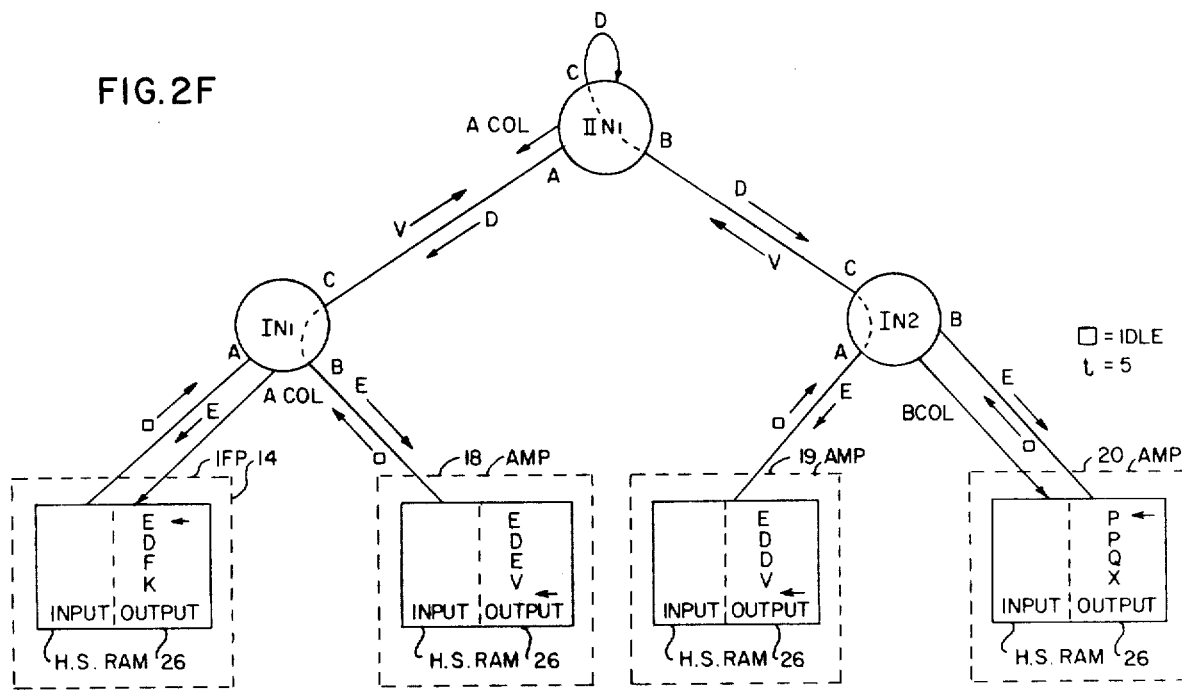
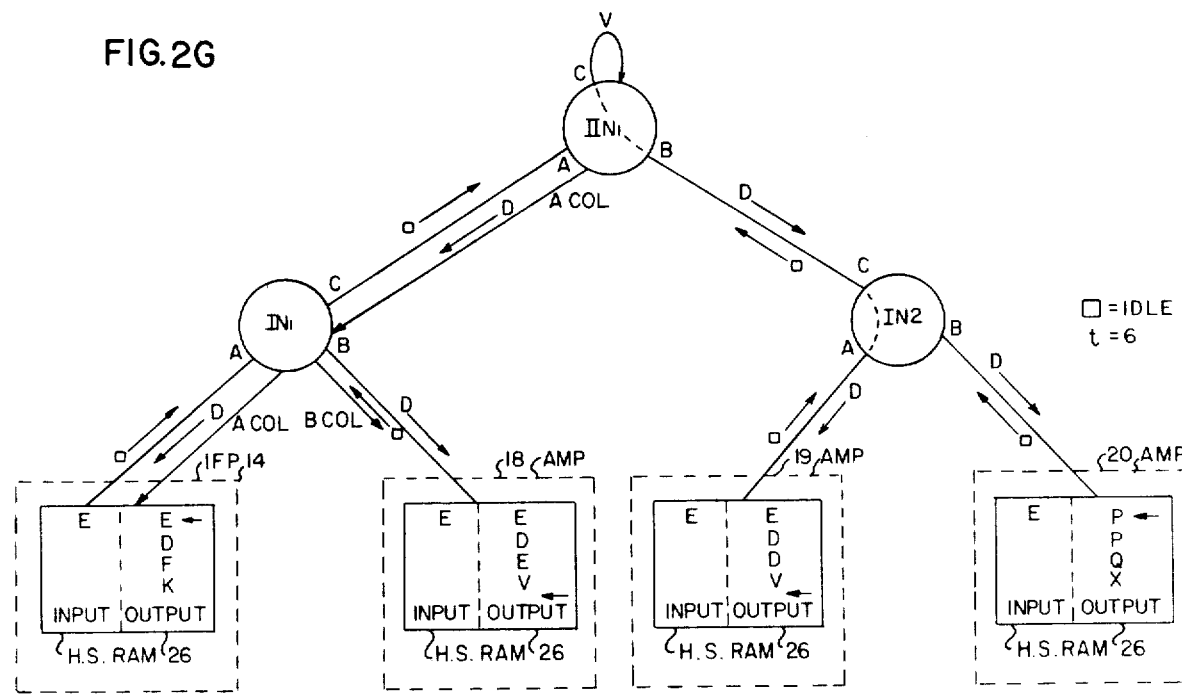

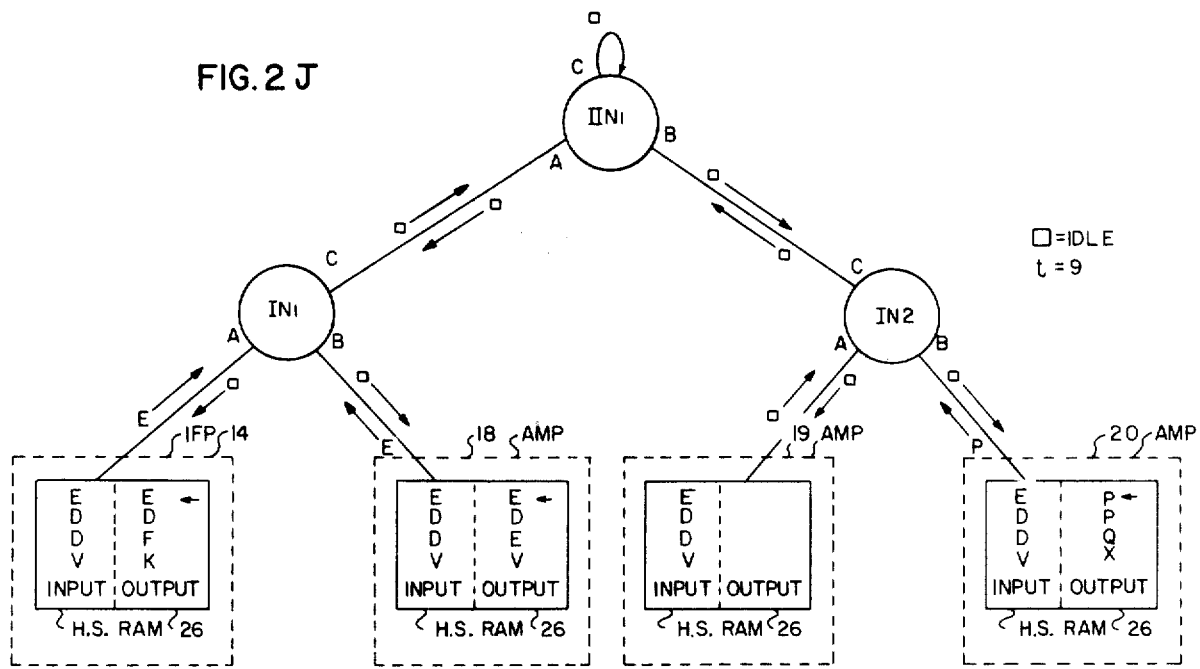

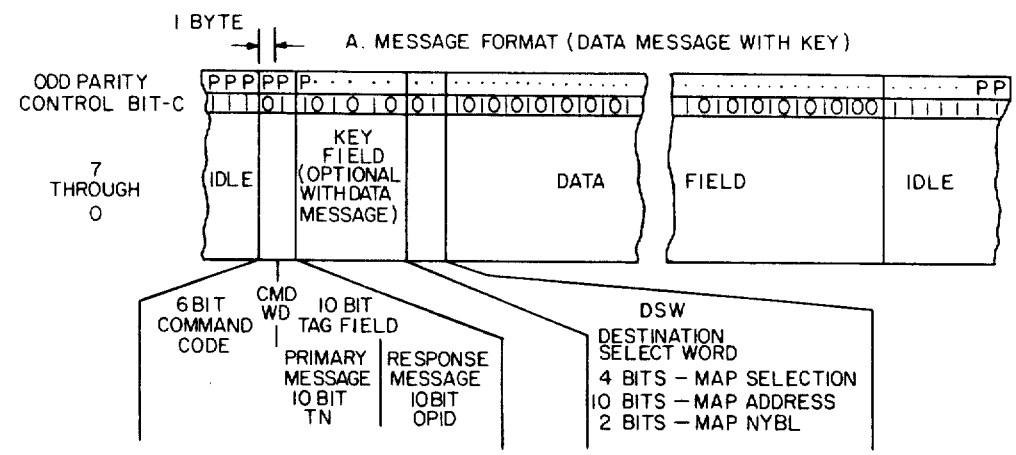
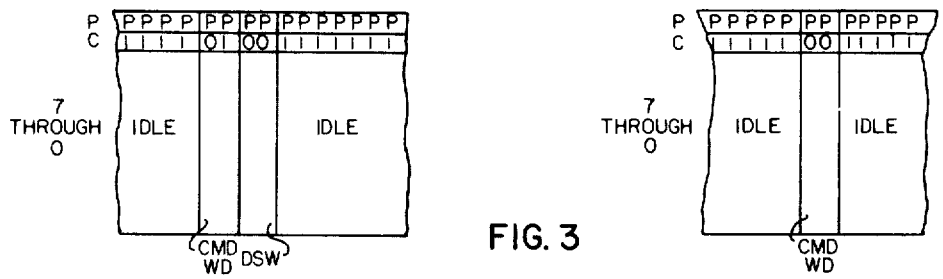
FIG. 3
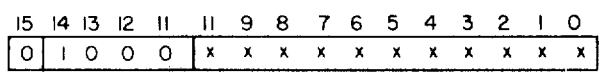
UNASSIGNED
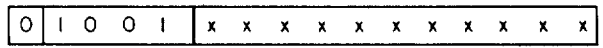
ASSIGNED
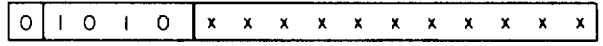
BUSY
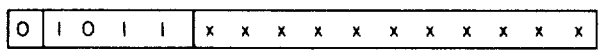
WAITING
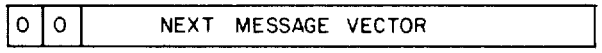
SEND READY
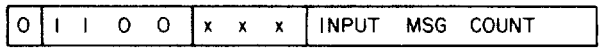
RECEIVE READY
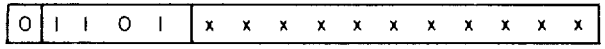
DONE
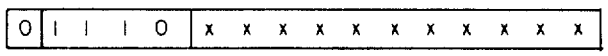
NON-PARTICIPANT
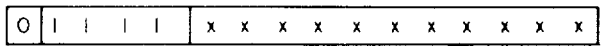
INITIAL
FIG. 12
TRANSACTION NUMBER WORD FORMAT

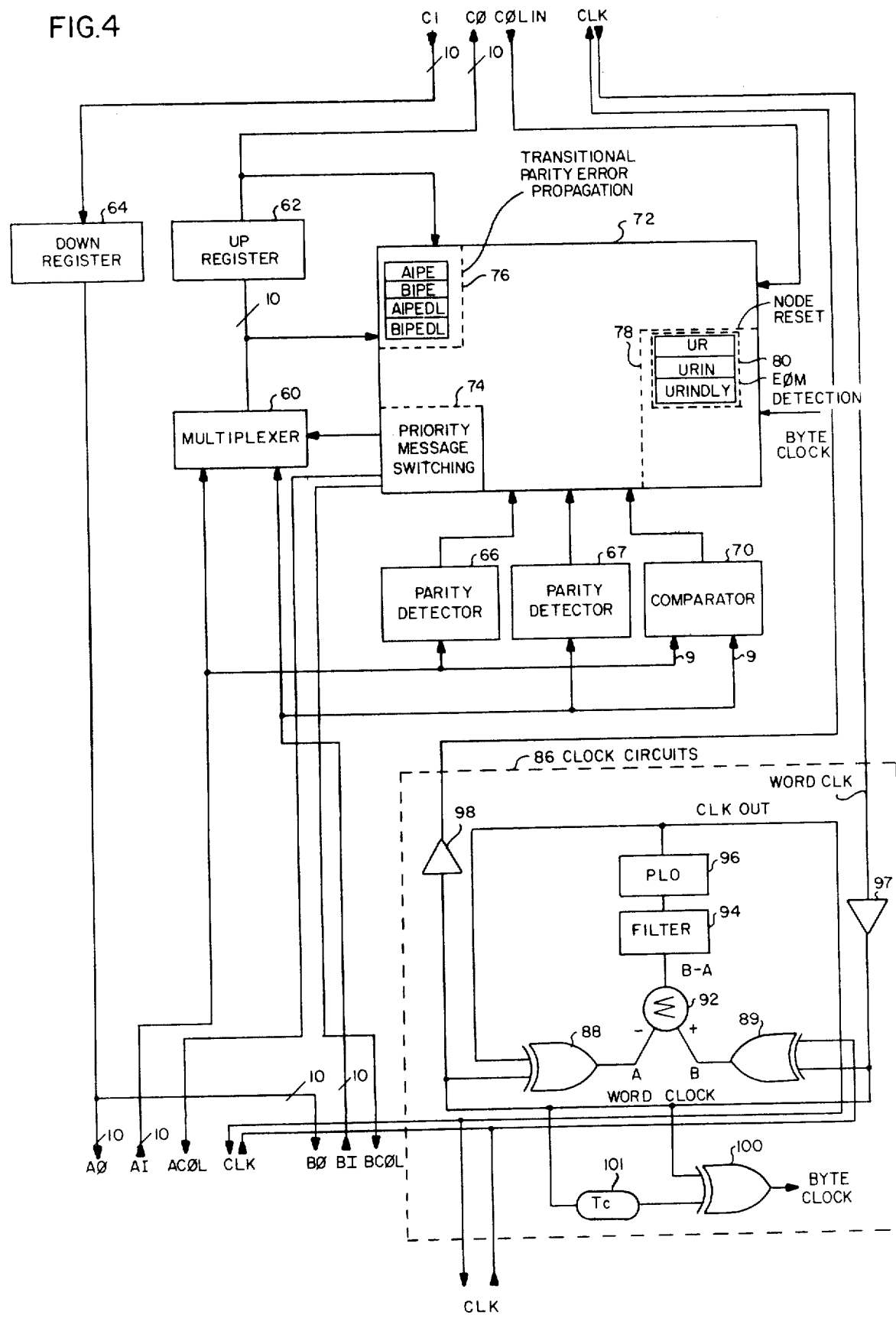

END OF MESSAGE DETECTION

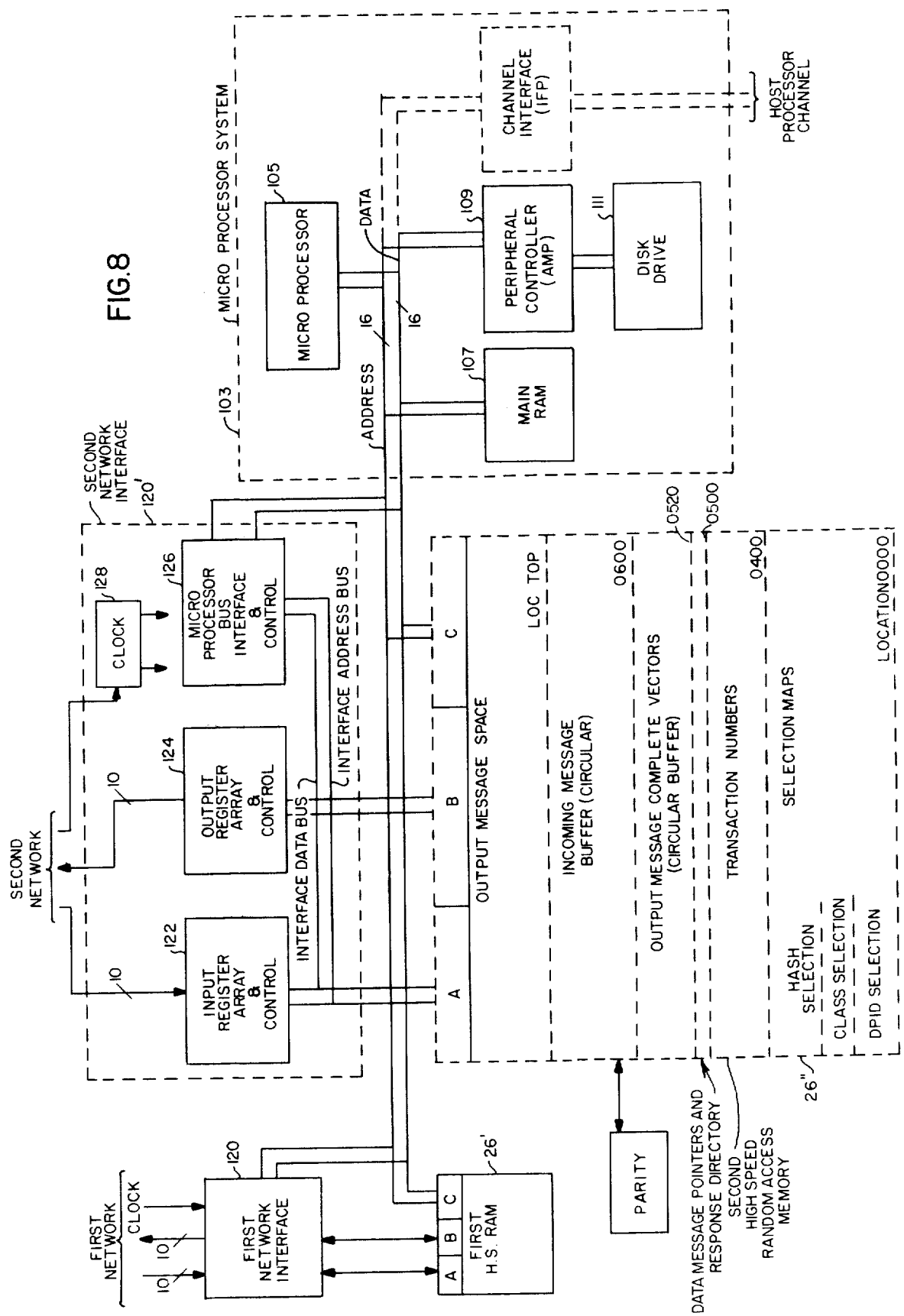

FIG.10

| Command Code | | Description | Location (Hex) |
|---|---|---|---|
| | | ... | 05XX |
| | TOP | INCOMING | 0518 |
| | GET | MESSAGE | 0517 |
| | PUT | BUFFER | 0516 |
| | BOT | POINTERS | 0515 |
| | TOP | OUTPUT | 0514 |
| | GET | MESSAGE | 0513 |
| | PUT | COMPLETE | 0512 |
| | BOT | BUFFER | 0511 |
| | | POINTERS | 0510 |
| 0F | NAP | | 050F |
| 0E | ACK | | 050E |
| 0D | SACK/INITIAL | | 050D |
| 0C | SACK/NOW PARTICIPANT | | 050C |
| 0B | SACK/DONE | | 050B |
| 0A | SACK/RECEIVE RDY | | 050A |
| 09 | SACK/SEND RDY | | 0509 |
| 08 | SACK/WAITING | | 0508 |
| 07 | SACK/BUSY | | 0507 |
| 06 | SACK/ASSIGNED | | 0506 |
| 05 | SACK/UNASSIGNED | | 0505 |
| 04 | NA | | 0504 |
| 03 | NAK/OVERRUN | | 0503 |
| 02 | NAK/TN ERROR | | 0502 |
| 01 | NAK/LOCKED | | 0501 |
| 00 | NA | | 0500 |

Data Message Pointers / Responses

RESPONSES AND POINTERS STORED IN DIRECTORY RESPONSE SECTION OF H.S. RAM

FIG.11

| COMMAND CODE | TAG | COMMAND DESCRIPTION |
|---|---|---|
| 00 | | NA |
| 01 | OPID | NAK/LOCKED |
| 02 | OPID | NAK/TN ERROR |
| 03 | OPID | NAK/OVERRUN |
| 04 | OPID | NA |
| 05 | OPID | SACK/UNASSIGNED |
| 06 | OPID | SACK/ASSIGNED |
| 07 | OPID | SACK/BUSY |
| 08 | OPID | SACK/WAITING |
| 09 | OPID | SACK/SEND READY |
| 0A | OPID | SACK/RECEIVE READY |
| 0B | OPID | SACK/DONE |
| 0C | OPID | SACK/NON-PARTICIPANT |
| 0D | OPID | SACK/INITIAL |
| 0E | OPID | ACK |
| 0F | OPID | NAP |
| 10 | TNO | STOP MERGE |
| 11 | TN | DATA MESSAGE |
| 12 | TN | |
| 13 | TN | |
| 14 | TN | |
| 15 | TN | |
| 16 | TN | |
| 17 | TN | |
| 18 | TN | |
| 19 | TN | |
| 1A | TN | |
| 1B | TN | DATA MESSAGE |
| 1C | TN | STATUS REQUEST |
| 1D | TN | RELINQUISH TN |
| 1E | TN | ASSIGN TN |
| 1F | TN | START MERGE |

RESPONSES / PRIMARY MESSAGES

MESSAGE PRIORITY PROTOCOL

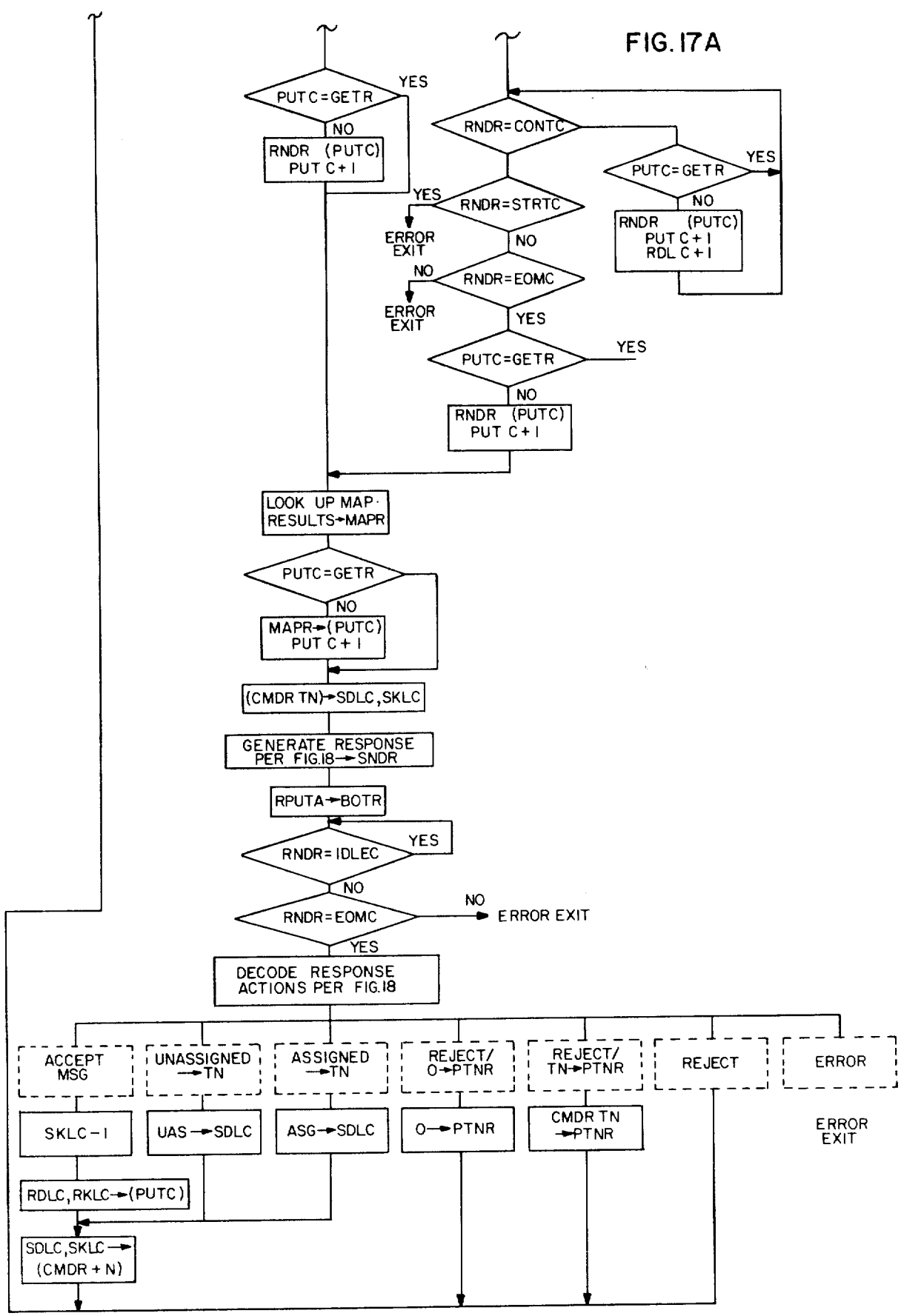

FIG.18

RESPONSE GENERATION AND ACTION

| | | LOCK | TNER | OVER | S-UNASSIGNED (UAS) | S-ASSIGNED (ASG) | S-BUSY (BSY) | S-WAITING (WAT) | S-SEND REG.RDY (SRD) | S-RECV REG.RDY (RRD) | S-DONE (DNE) | S-INACTIVE (INA) | S-INITIAL (INT) | ACKR | NAPR | |
|---|---|---|---|---|---|---|---|---|---|---|---|---|---|---|---|---|
| PRIMARY MESSAGE | DATA | L̄/R | 1/RP | 2/RP | */E | */E | */E | */E | */E | */E | */E | */E | */E | 12/* | 13/* | RESP |
| | | | | | | | | | | | | | | 14/E | R | ACT |
| | STOP | L̄/R | */E | */E | */E | */E | */E | */E | */E | */E | */E | */E | */E | 18/RP | 19/RP | RESP |
| | | | | | | | | | | | | | | | | ACT |
| | STATUS | L̄/R | */E | */E | 3/R | 4/R | 5/R | 6/R | 7/R | 8/R | 9/R | 10/R | 11/R | */E | 19/R | RESP |
| | | | | | | | | | | | | | | | | ACT |
| | RELQ | L̄/R | */E | */E | */E | */E | */E | */E | */E | */E | */E | */E | */E | 18/E | 19/R | RESP |
| | | | | | | | | | | | | | | 15/ | | ACT |
| | ASGN | L̄/R | 20/R | */E | */E | */E | */E | */E | */E | */E | */E | */E | */E | 21/ | 19/R | RESP |
| | | | | | | | | | | | | | | 16 | | ACT |
| | STRT | L̄/R | */E | */E | 3/R | 4/R | 5/R | 6/R | 7/17 | 8/R | 9/R | 10/R | 11/R | */E | 19/R | RESP |
| | | | | | | | | | | | | | | | | ACT |

* = NOT A VALID RESPONSE

1 = L̄OCK·MAP≠0·
 TN≠(RRD+DNE+INA+INT)

2 = L̄OCK·MAP≠0·
 TN≠RRD·(TNCT=0+PUT=GET)

3 = L̄OCK·MAP≠0·
 TN=UAS

4 = L̄OCK·MAP≠0·
 TN=ASSIGNED

5 = L̄OCK·MAP≠0·
 TN=BSY

6 = L̄OCK·MAP≠0·
 TN=WAT

7 = L̄OCK·MAP≠0·
 TN=SRD

8 = L̄OCK·MAP≠0·
 TN=RRD

9 = L̄OCK·MAP≠0·
 TN=DNE

10 = L̄OCK·MAP≠0·
 TN=INACTIVE

11 = L̄OCK·MAP≠0·
 TN=INT

12 = L̄OCK·MAP≠0·
 TN=RRD·TNCT≠0·PUT≠GET

13 = L̄OCK[MAP≠0·
 TN=(DNE+INA+INT)+MAP=0]

14 = L̄OCK·MAP≠0·
 ACCEPT, (TN-1) → TN,
 I/O INTERRUPT IF TN=RRD.
 ·MAP≠0 ELSE REJECT

15 = UNASSIGNED
 →TN IF MAP≠0

16 = ASSIGNED
 →TN IF MAP≠0

17 = REJECT TN → PTNR
 NOTE: NO TNCK MADE

18 = L̄OCK·MAP≠0

19 = L̄OCK·MAP=0

20 = L̄OCK·MAP≠0·
 TN≠(UAS+INT)

21 = L̄OCK·MAP≠0·
 TN=(UA5+INT)

R = REJECT FROM INPUT BUFFER
L = INTERFACE LOCKED
RP = REJECT, 0 → PTNR
E = ERROR
RESP = RESPONSE GENERATION
ACT = ACTION RECEIVED RESPONSE

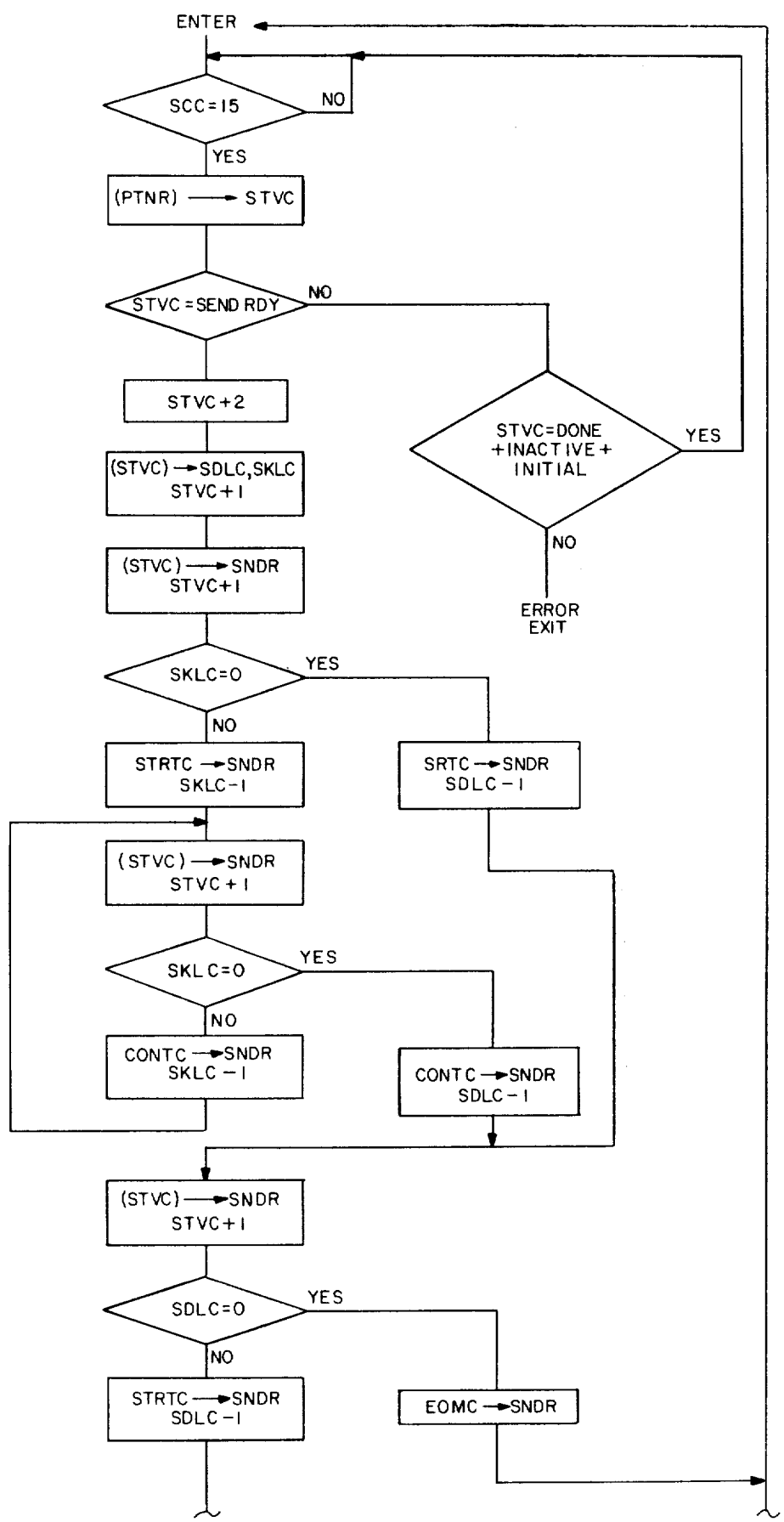

MSG SEND CYCLE

A. SEND MESSAGE FORMAT

B. RECEIVE MESSAGE FORMAT

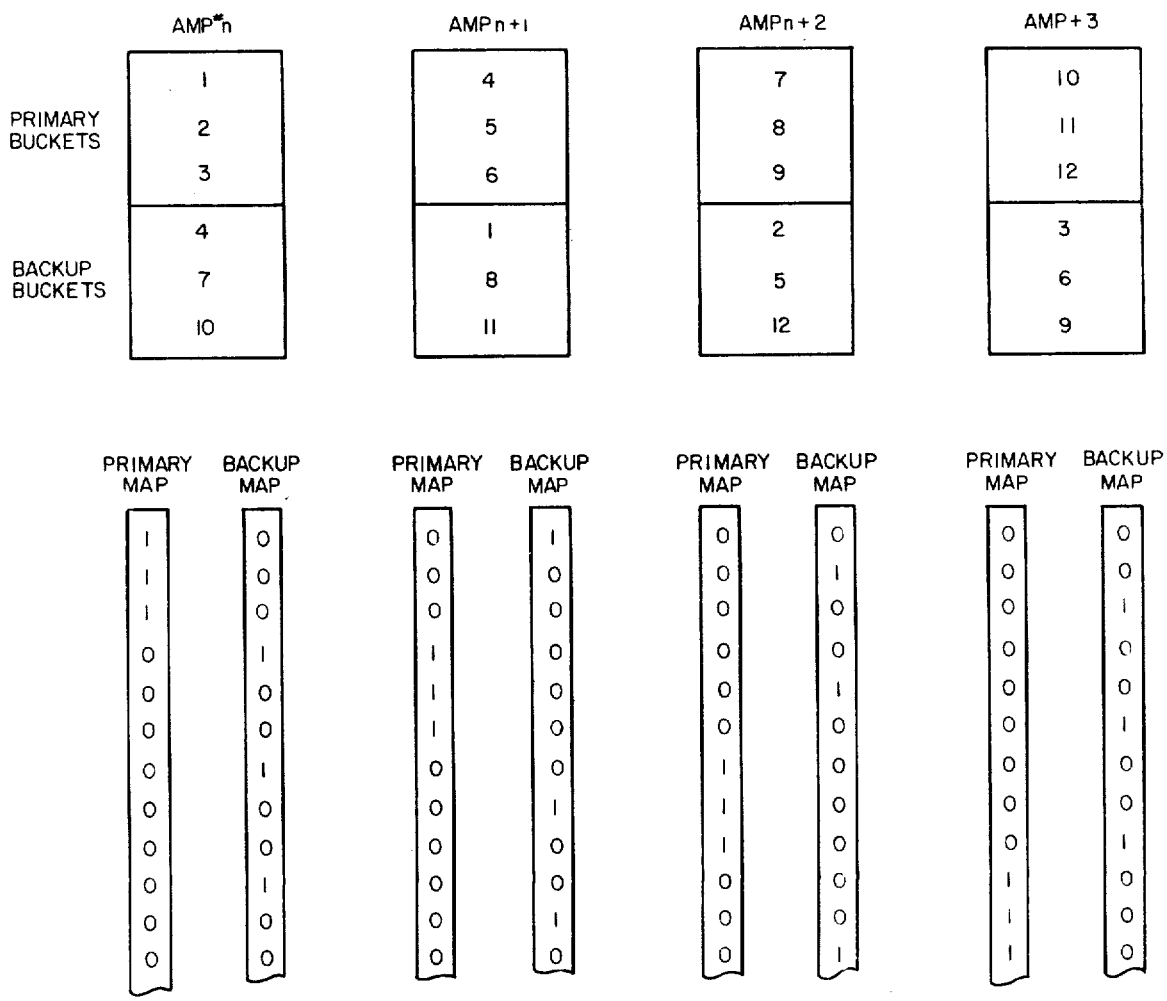
FIG. 22 — SIMPLIFIED EXAMPLE OF THE ASSIGNMENT OF HASH "BUCKETS" TO PROCESSORS

MULTIPROCESSOR INTERCOMMUNICATION SYSTEM AND METHOD

REFERENCE TO RELATED APPLICATION

This application is filed concurrently with an application entitled "Data Processing Systems and Methods", Ser. No. 250,094, filed Apr. 1, 1981, in the name of Philip M. Neches, which application is also assigned to the assignee hereof.

BACKGROUND OF THE INVENTION

The concurrently filed application of Philip M. Neches describes and claims improved data processing systems and methods which in substantial measure are based upon and emanate from a novel active logic network. The active logic network is so configured and arranged that it merges a number of concurrent, competing message packets from different sources during message transfer on the network. A converging progression of pair comparisons is continued without interruption until a winning message packet is determined, and then distributed in the opposite direction to all sources. A coherent priority scheme is employed that encompasses a variety of message types such that responses, status and control messages can be intermingled in the transmissions. In consequence of these and other factors, the ratio of data message traffic to overhead traffic on the network is significantly increased over prior systems. Moreover, the system is broadly expandable without a concomitant increase in overhead systems or software. Use of these techniques greatly facilitates the ways in which multiple message sources, such as an array of data processors may work cooperatively toward a common purpose. The copending application further discloses and claims improved multiprocessor systems, including relational data base machines, arranged both as backend processors and stand alone systems.

Reference should be made to the full co-pending application for a more detailed appreciation of the different aspects and implications of the system, and for a listing and discussion of patents that typify the present state of the art. The present application is concerned with meeting more specific needs of multiprocessor systems in general, and the referenced system in particular.

These needs pertain to the ways in which the processors intercommunicate so that they perform their own tasks efficiently and coherently within the global resource context. A versatile multiprocessor must be able to distribute subtasks in a number of ways, ascertain the status of the processors performing the subtasks, merge and sort messages, correct and revise data, and ascertain when and how resources have changed (as when processors fail or come on line). Performance of such functions has heretofore entailed the use of excessive overhead software and hardware.

As one example, it is often required in a multiprocessor system, such as a data base machine, to route messages between processors so as to select an individual destination processor, or select a class of processors, or select the destination not upon a processor identification but instead upon the portion of the data base distributed to that processor, as by a hashing technique. In some known systems a prefatory communication sequence is used, in which a linkage is established between the sending processor and one or more specific receiving processors. Repeated requests and acknowledgments may be needed to establish the linkage, and deadlock conditions that may arise must be overcome by the use of further hardware and software. In other systems a supervisory control is exercised by one processor or a bus controller, to assure that the transmitting processor is ready to transmit, that the receiving processor or processors are ready to receive, that other processors are blocked out of the linkage and that no extraneous transmissions are generated. Again, the commitment to overhead and the intricacies needed to avoid deadlocks require maintenance functions that become disproportionately large as the system is expanded (e.g. to more than 16 processors).

One objective of the present invention is to make use of the various capabilities of the Neches concept without diminution of the efficiency of the system, requiring additional software, or restricting the capacity for expansion. Another objective is to provide the needed intercommunication versatility in such a way that extremely large numbers of processors (e.g. 1024) can be used in a system without imposing overhead penalties or creating deadlock or lockout possibilities.

Another example of what is required of a modern multiprocessor system relates to how the system can assuredly determine the status of the subtasks being performed by one or a number of processors. A basic requirement is that there be an ability to interrogate a given processor as to its status, without having the interrogation affect the status or creating ambiguity as to the nature of the response. The term "semaphore" has been used in the industry to characterize the function of testing and setting a status indication without interruption. The presence of a semaphore feature is desirable, but should not be incorporated at the expense of diminished performance or increased overhead load. The determination of status in turn becomes extremely important in carrying out sort/merge operations in a multiprocessor system, because the combined results of a plurality of subtasks within a major task cannot be united until the subtasks are appropriately completed. Another requirement is that the processor report its *current* status and that subtasks be performed only once despite repeated interruptions and changes in the multiprocessor sequence. In most present systems processor routines can be disrupted so that significant problems can arise in these respects. It can readily be appreciated that where a plurality of processors are performing related subtasks, the sequences involved in repeated interrogations and responses as to the degree of readiness of the individual processors can require significant overhead, and that the greater the number of processors the more disproportionate is the commitment to dedicated overhead.

Illustrative of the above, a typical drawback in prior art multiprocessor systems is the so-called "distributed update" problem, which is the need to update information a copy of which may be stored in each of several processing elements. This information may consist of data records or of information used to control the operation of the system such that processing can be initiated, terminated, resumed, suspended, or rolled backwards or forwards without causing any required steps to be erroneously either duplicated or omitted. Solutions of the distributed update problem in prior art systems suffer significant limitations. Some consider only two processors at a time. Still others involve protocols of intercommunication which are so complex that they have resisted all efforts to date to prove their correctness in a mathematically rigorous manner.

The complexity of these protocols results from the need to implement a "global semaphore", a control bit which has the appearance that it is tested and set in every processor as one uninterruptable operation. The control bits reside in different processors, with variable delays in communication between them, and necessarily imperfect communications channels introduce noise and also increase the tendency to errors. Those skilled in the art will therefore readily appreciate the difficulty of giving the appearance of a single, uninterrupted operation when the elements which compose the operation are diverse, interruptible, cannot be accessed at the same times, and prone to failures between access attempts.

SUMMARY OF THE INVENTION

The many message routing, mode control and status indication functions required for a complex and versatile multiprocessor system are provided in accordance with the invention by a unique combination of message organization and traffic controlling interface circuits functioning with the active logic network. Message packets, which may be of variable lengths, are organized into variable sequences of fields, the field values being selected to have significance in the prioritizing network. The interface circuits store incoming and outgoing message packets with bidirectional accessibility and moreover include sections dedicated to destination, status and control functions. Particular message fields within a broadcast primary message packet determine, solely by interface operation, whether a message packet is to be accepted by the associated processor, and the multiprocessor mode of operation that is to be used. Responses, status and control messages all function within this cooperative format, serving both a prioritizing function and a traffic control or routing function.

A further feature is that transaction identities are included in primary data, status and control messages. Using the transaction identity as a reference, the local processor maintains at the interface circuits, accessible to the network, a locally updated indication of the state of readiness of that processor as to the task bearing the transaction identity.

In conjunction with this feature, a distributed update as to the global status of the system can be derived by a single query to all processors. Each responds concurrently with its local status, and the least ready status is accorded highest priority in sorting on the network. Thus a single response from all processors is merged into one indication of global readiness.

In a more specific example of a system and method in accordance with the invention, the message organization incorporates an initial command word, which includes a transaction number for primary, status and control messages, or an originating processor identification for responses. The numerical values of the initial portion of the command word, and the transaction number (or originating processor identification) all form a part of the coherent set of priority values such that the network distinguishes between and gives precedence to messages based both upon type and specific data content within the type. An optional key field used as a sorting criteria may also be employed in the message. The data field, which may be of variable length, may initiate with a destination selection word, which by its data content designates a specific individual processor for reception of the message, a process class, or a hashing value related to distributed data storage. A high speed random access memory serves as a buffer between the relatively high speed network and the substantially lower speed microprocessor, having individual ports for coupling to both the network and the processor bus. A portion of the high speed random access memory includes dedicated sections which may be directly addressed by the destination selection word, enabling a specific processor, process class or hashing value to govern destination selection. The high speed random access memory also contains a directory of numerical values representing readiness states for the processor, which the processor may reference to locally update status pertaining to a given transaction number. An inquiry from the network elicits an immediate and unambiguous response as to the local readiness state. The status responses also have predetermined rankings within the priority schedule, and merger of the responses of the network reveals the lowest state of readiness when received by the requesting processor.

In a sort/merge operation, subtasks identified by transaction numbers are distributed as appropriate throughout various individual processors, where the input messages are stored in a circular buffer section in the high speed random access memory. Sequences of output messages available for transmission to the network are assembled by each local processor, the high speed random access memory including a circular output vector section that enables chaining of the output messages together in an ordered sequence. Thus each local processor provides a sorted sequence of output message packets pertaining to each transaction number. Single queries suffice to determine the global state of readiness as to the particular task. When all processors are ready, they concurrently and repeatedly attempt to launch their highest priority messages onto the network, which prioritizes them by transferring winning messages in sequence until that transaction number is exhausted, after which the next transaction number may be selected. A transaction number of zero establishes the non-merge mode without any further communication being needed.

The system provides an integrated, essentially hardware based, mechanism for logical control of globally distributed resources. The dedicated buffer system and interrelated message organization perform global semaphore, control and pacing functions within the system. The random access memory is not only used in particular ways in receiving and supplying outgoing and incoming messages, but also in assuring that overrun conditions do not occur.

Further in accordance with the invention, each group of multiple parallel data lines interconnecting the node elements in the network is associated with a control line, the signal patterns on which vary in accordance with the field groupings, to demarcate transitions between fields and also to characterize the different fields for different types of messages. A parity line may also be used, not only to identify parity errors occurring during transfer, at the node elements or at the processors, but also in conjunction with means for forcing a parity error to denote the failure or recovery of a processor in the system. This is a readily achieved but immediately effective means for generating an interrupt indication to denote a change in the global resource.

Further, the network also includes unidirectional couplings between node elements in the successive tiers, transferring indication of loss of priority from the node at which a determination is made through the successive lower tiers back to the originating processor, which thereupon can terminate transmission for that message packet.

The bidirectional network and a unique clocking arrangement assure simultaneous broadcasting of a message packet to all processors. A high speed clock fed in at the apex of the network is regenerated at each of the active circuit nodes with zero time skew along the network. The network may be physically distributed with active circuit elements intercoupled by short path length conductors or by transmissions lines in a compact but expandable configuration.

BRIEF DESCRIPTION OF THE DRAWINGS

A better understanding of the invention may be had by reference to the following description, taken in conjunction with the accompanying drawings, in which:

FIG. 3 is a graphical representation of the organization of a message packet used in the system of FIG. 1;

FIG. 4 is a block diagram showing further details of the novel bidirectional network of FIG. 1 as to the active logic nodes and clock circuits employed therein;

FIG. 8 is a block diagram of a processor module, including a high speed random access memory, that may be employed in the system of FIG. 1;

FIG. 10 is a block diagram of the arrangement of data within one reference portion of the high speed random access memory of FIG. 8;

FIG. 11 is a chart showing the message priority protocol used in the system;

FIG. 12 is a graphical representation of transaction number word formats;

FIG. 18 is a matrix diagram showing the relationship between primary messages and generated responses and between primary messages and responsive actions;

FIG. 21, comprising FIG. 22 is a simplified diagram of one way in which parts of a data base may be distributed among different processes in a data base system.

DETAILED DESCRIPTION OF THE INVENTION

Data Base Management System

Figure 1:
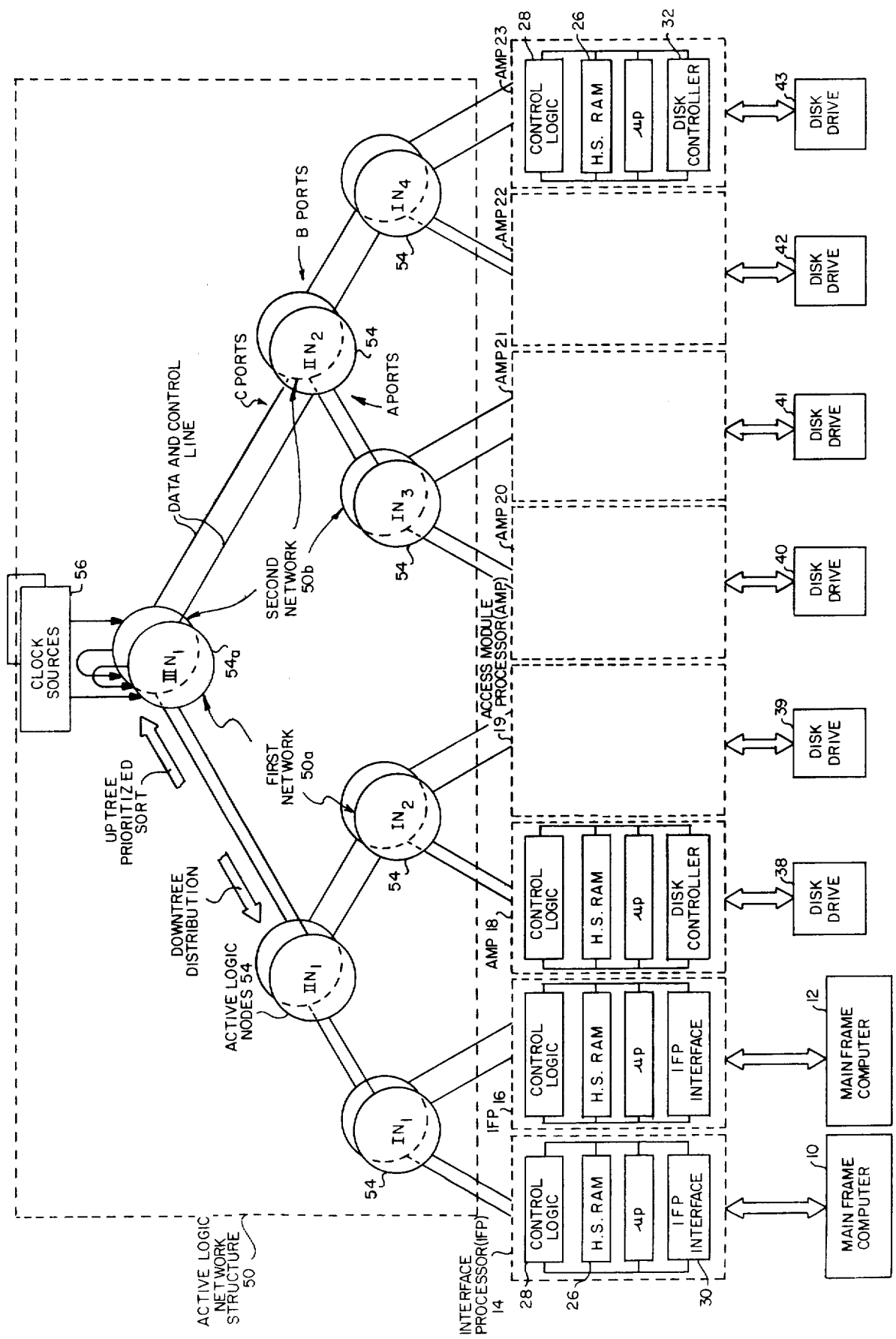
FIG. 1 is a block diagram of a system in accordance with the invention including a novel bidirectional network.

The system depicted generally in FIG. 1 is illustrative of usage of the concepts of the invention in a data base management application. Specifically, the system is configured for cooperation with one or more host computer systems 10, 12, such as one of the IBM 370 family or DEC PDP-11 family, which advantageously, for purposes of this example, operate with existing and conventional operating system and applications software. In the IBM terminology the principal intercommunication networks between the host and the data base computer are referred to as channels while in the DEC terminology the equivalent is referred to as a "UNIBUS" or "MASSBUS" or some other variant. Whether one of these systems or the main frame computer of another manufacturer is used, the channel or bus is an ohmic or logically passive pathway on which data base tasks and subtasks are presented.

The example of FIG. 1 shows a backend processor complex in association with host systems 10, 12. The system accepts tasks and subtasks from the host system, references the appropriate part or parts of an extensive data base storage, and returns appropriate processed or responsive messages in such fashion that no more than menial software management is required of the host systems, irrespective of the configuration of the backend processor complex. Consequently, the user's data base can be structured in a new multiprocessor system in which the data are organized in relational data base files of broadly expandable capacity; expansion can occur without any need to change the operating system or existing applications software resident in the user's host system. An example of a stand alone system is described below in conjunction with FIG. 20.

It will be recognized by those skilled in the art that relational data base management involves an overall function which is divisible into processing tasks that are separable, at least temporarily, because the data entries in storage are not interdependently linked by address pointers. It will also be recognized that many other data processing situations exist in which dynamic subdivision and independent processing of limited or iterative tasks can be used. Thus while this example of the invention is described in terms of the demanding and widely encountered data base management processing problem, the novel methods and implementations disclosed herein are of broad applicability elsewhere as well.

A large data management system involves both potential advantages and the inherent difficulties when multiple processors are to be used. Vast numbers of entries, ranging into the hundreds of millions, must be held conveniently and rapidly accessible in storage. With the relational data base format, a wide range of data entry and information retrieval functions can be carried out concurrently.

In the great majority of data base systems, however, it is as important to maintain the integrity of the data base as it is to process transaction data rapidly. Integrity of data must be preserved across hardware failures, power outages, and other operational mishaps. Further, the data base system must be capable of restoring the data base to a known state to recover from user errors which can include bugs in applications software code. However, the data cannot be lost or entered erroneously, and all parts of the data base that relate to a specific entry must be changed responsively, whether the event involves new data, corrections for past errors or revision of a portion of a data base.

Integrity therefore implies that a degree of redundancy is required in the data base system, along with data roll back and recovery operations, error detection and correction, and detection of and compensation for changes in status of individual parts of the system. The system may have to be used in a number of different specific modes to accomplish these objectives.

It is further required of modern systems to be able to accept discretionary queries that can be complex in form and to respond if necessary in an interactive fashion. Those who seek access to the system should not, despite the complexity of the query, be required to be experts in the system. Examples of discretionary queries that may be generated pertaining to a large production operation include the following:

A. A production manager might ask not merely for an item in inventory but for an inventory aging that identifies all parts inventories which are in excess of the monthly production rate for a part whose production rate is at least 10% less than in the comparable month for the prior year.

B. A marketing manager might ask, not merely if a particular account is 90 days overdue, but for all 90 day receivables as to customers from a particularly depressed geographic area who have exceeded 120 days in the past.

C. A personnel director might ask not merely for a listing of all employees having in excess of two weeks sick leave for a given year but for a listing of all employees with more than ten years longevity who were on sick leave for more than one week during frogging season in more than two of the prior five years.

In all of these examples, the user seeks to gain an insight into a real problem confronting him professionally by correlating, in unanticipated ways, information stored in the computer. The user's experience with his own problem areas and thus his intuition and imagination permits the non-computer-trained professional to make facile use of a data base system that is capable of handling complex queries.

Modern multiprocessor systems seek to satisfy these many and often conflicting requirements through the use of elaborate overhead and maintenance software systems, which inherently militate against easy expansion of the system. Expandability, however, is a highly desirable concept, because any growing business or operation inherently wishes to enlarge and retain its existing data base management system and not to be forced into the adoption of a new system and software.

The Multiprocessor Array

In FIG. 1, a typical system in accordance with the invention includes multiple microprocessors of two principal types, herein designated the interface processor (IFP) and the access module processor (AMP). Two IFPs 14, 16, are depicted, each coupled to the I/O system of a different host computer 10 or 12. A number of access module processors 18-23 inclusive are also incorporated in what may be termed a multiprocessor array. The term "array" is used in the conventional sense of referring to a set, collection or number of processor units disposed in a generally ordered linear or matrix fashion, and does not connote what has come to be referred to as an array processor. Although only eight microprocessors have been depicted as a simplified example of the system concept, many more IFPs and AMPs can and typically will be used.

The IFPs 14, 16 and AMPs 18-23 incorporate Intel 8086 16 bit microprocessors having an internal bus and a main memory with direct memory access for peripheral device controllers. Any of a wide variety of microprocessors and microprocessor system products of different manufacturers may be utilized. The "microprocessor" is merely a specific example of one type of computer or processor that may be used in the array, because the system concept can be used to advantage with minicomputers or large computer systems where the application demands such computing power. The 16 bit microprocessor is an advantageous example of a low cost unit having substantial data processing power and a standard replaceable configuration with a wide range of available hardware and software options.

The IFPs and AMPs utilize similar active logic, control logic and interface circuitry; microprocessors; memories; and internal busses, as described below in conjunction with FIGS. 1 and 8 respectively. These two processor types differ, however, in the nature of and control logic for their associated peripheral devices. Those skilled in the art will readily appreciate that other processor types with different peripheral controllers and functional assignments can be readily incorporated into this invention.

Each microprocessor has associated therewith a high speed random access memory 26 (described in conjunction with FIG. 8) which not only provides buffering of input and output messages but also coacts uniquely with other parts of the system to provide message management. Briefly, the high speed random access memories 26 function as a circular buffer for variable length input (called "receive") messages, provide sequential message output (called "send") storage, incorporate a table lookup portion for use in hash mapping and other modes, and store control information for orderly and sequenced handling of receive and send messages. The memories 26 are further used to fulfill unique roles in multiprocessor mode selection and in handling data, status, control and response message traffic. As described in detail hereafter, they are also arranged such that, based upon transaction identities in the messages, local and global status determinations and control functions are processed and communicated in highly efficient fashion. Control logic 28 (described below in conjunction with FIG. 13) at each IFP 14, 16 and AMP 18-23 is used in data transfer within the module and in the performance of overhead functions.

The IFPs 14, 16 each include an interface control 30 coupling the IFP to the channel or bus of the associated host computer 10 or 12. In the AMPs 18-23, however, the comparable unit is a disk controller 32 which may be of conventional configuration and which is employed to interface the AMPS 18-23 respectively with individually associated magnetic disk drives 38-43 respectively.

The magnetic disk drives 38-43 provide the secondary or mass storage for the data base management system. In the present example, they comprise proven commercial products, such as Winchester technology, to provide high capacity and high reliability storage with extremely low cost per byte.

The relational data base is stored on these disk drives 38-43 in scatter storage fashion as shown in simplified form in FIG. 22. Each processor and associated disk drive is assigned a disjoint primary subset of the records comprising the complete data base, so that each of n storages has 1/nth of the data base. Further, each processor also is assigned disjoint backup data subsets making up 1/nth of the data base. As seen in FIG. 22, each primary file is duplicated by a backup file at a *different* processor, giving two complete data bases distributed in different ways. This redundant arrangement of the primary and backup data subsets protects the integrity of the data base, because no large blocks of data or groups of relations can be substantially affected by a single failure.

Distribution of the data base is interrelated, as also shown in FIG. 22, with hashing of the various files, and incorporation of hash mapping data in the messages. The files at each processor are designated by simplified hash buckets shown as groups of binary series. The relations and tuples in a relational data base system thus can be located by the tables of relationships defined by the buckets. Hashing algorithms are used to derive the bucket assignments from keys in the relational data base system, so that expansion and modification of the data base system are readily feasible.

Selection of storage capacity is dependent upon data base management needs, transaction volume, and the processing power of the associated microprocessors. While a number of disk drives may be coupled to a single AMP, or a single disk file coupled to more than one AMP, such modifications will usually be limited to special applications. Extension of the data base typically is achieved by expanding the number of processors (and associated disk drives) in the multiprocessor array.

Active Logic Network

The objectives of providing orderly message packet flow and facilitating task performance are met by the use of a unique system architecture and message organization, centered upon a novel active logic network structure 50. This structure comprises, relative to the outputs of the microprocessors, a converging, ascending hierarchy of bidirectional active logic nodes 54. The nodes 54 comprise three port bidirectional circuits which may be described as forming a tree network, with couplings to the microprocessors 14, 16 and 18-23 being made at the base of the tree.

It will be recognized by those skilled in the art that nodes may be constructed where the number of logical sources is greater than 2, say 4 or 8, where the greater number of source inputs may also be resolved in the same time by the addition of more combinatorial logic.

For convenience of reference, all nodes (N) in the first tier are designated by the prefix I, in the second tier by the prefix II, and so forth. Individual nodes within a tier are designated by the subscripts $1, 2 \ldots$, so that, for example, the fourth node in the first tier may be referred to as $IN_4$. At the up-tree (or upstream) side, there is a single port, called the C port, which is coupled to one of the two down-tree ports, called the A and B ports, of a node in the next higher tier. The tiers converge to an uppermost or apex node 54a representing a convergence and recirculating means which directs upstream (up-tree) messages back in the downstream (down-tree) direction. Two tree networks 50a, 50b are utilized, the nodes and interconnections of the two networks being disposed in parallel to provide the redundancy desired for a large scale system. Inasmuch as the nodes 54 and the networks are identical, only one need be described.

To aid in visualization, it should be understood first that multiple message packets in the form of serial signal trains are or can be launched concurrently into the active logic network 50 on the couplings for many of the microprocessors. The active logic nodes 54 each function in binary fashion in determining priority between two colliding packets, using the data contents of the message packets themselves. Further, all nodes 54 in a network are under the command of a clock source 56 arranged with the nodes 54 in such fashion as to synchronously advance the message packet trains toward the apex node 54a. In this manner each succeeding byte or other incremental segment of a serial train progresses to the next tier at the same time as the corresponding bytes of other messages also advance along other paths in the network 50.

A prioritized sort of competing signal trains takes place for message packets moving up-tree, ultimately to select a single message train to be redirected from the apex node 54a downstream. Because of the system organization, the decision as to ultimate priority need not occur at any particular point in the message packet, so that message transmission can be carried forward without requiring any more than the binary decisions between two colliding packets that are being made at the individual nodes 54. As a result the system provides message selection and data transfer in the space and time domains but does not delay message transmissions for purposes of gaining control of the bus, identifying sending or receiving processors, or performing handshaking operations between processors.

Further, it is important to recognize that when several processors send identical packets at the same time, if successful, it will appear that *all* such sending processors were successful. This property is extremely useful in exercising efficient control of a large multiprocessor complex, because of the savings in time and overhead.

The nodes 54 also operate in bidirectional fashion to enable unimpeded downstream distribution of the message packets. At a given node 54 downstream messages received at the port C on the up-tree side are distributed to both ports A and B on the down-tree side and then transmitted on to both associated nodes at the next lower tier. Under the control of the common clock circuit 56, the message packet advances synchronously down-tree to be broadcast to all microprocessors simultaneously, enabling one or many of the processors to carry out the desired processing task or to accept a response.

The network 50 has a high data transfer rate in comparison to the data transfer rates of the microprocessors, typically being a multiple greater than two. In this particular example the network 50 has a byte clock interval of 120 nanoseconds and the data transfer rate is five times that of the microprocessor. Each node 54 is coupled, at each of its three ports, to the associated node port in the next tier, or to the microprocessor, by a set of data lines (here 10 in number) and by control lines here 2 in number) and devoted to clock and collision signals respectively. The data and clock lines run in pairs, with separate lines for the uptree and downtree directions. The collision line propagates down tree only. The connections form a full duplex data path, with no delay needed to "turn around" the drive sense of any line.

Referring now to FIG. 3, the 10 data lines comprise an 8 bit byte, designated as bits 0–7 inclusive, occupying 8 of the 10 data lines. Another line, designated C, is a control line, carrying a control sequence that is used to characterize different parts of the message packet in particular ways. The 10th bit is used for odd parity in the present example. Practitioners skilled in the art will recognize that the system can readily be operated with more or fewer bits in the data path.

The byte sequences are arranged in successive fields, basically divided into command, key, destination selection, and data fields. As is discussed further below, a message may utilize only a single field, and concludes with a detectable End of Message code. An intervening idle field between messages is designated by an unbroken sequence of 1's on the C line, as well as on lines 0–7, and is transmitted whenever no message packet is available. The parity line is also employed in a unique fashion to communicate a change of status of an individual processor.

The idle state is an intermediate state and is not a part of the message packet, which typically begins with a 2 byte command word that includes a tag in the form of a transaction number (TN) for data messages or an originating processor ID (OPID) for response messages. The transaction number has many levels of significance in the system and serves as the basis for a number of functional communications and controls. The packet may thereafter contain any or all of a variable length key field and a fixed length destination selection word (DSW) as the first part of a variable length data field. The key field serves the purpose or providing sorting criteria, where messages are otherwise substantially identical. The DSW provides the basis for a number of special functions and also merits particular attention, along with the TN.

The system operates with the interfaces in word synchronism, so that the first bytes of the command words are provided to the network 50 concurrently by all processors which have a packet to transmit. The data contents of the successive fields are used by the network in sorting on a binary basis at each node, with the lowest in numerical value being given priority. Taking bit C as the largest quantity and bit 0 as the smallest in the successive data bits, the sorting priority order is:

1. first arrival at the network 50;
2. lowest command code (word);
3. lowest key field;
4. shortest key field;
5. lowest data field (including the destination selection word);
6. shortest data field.

For purposes of this general overview it should be noted primarily that when a priority decision has been made at a node 54, a collision indication (referred to as $A_{col}$ or $B_{col}$) is returned along the path from which the losing transmission was received. This indication enables the transmitting microprocessor to recognize that the network 50 is busy with a higher priority transmission so that the transmission is terminated and must be retried again at a later time.

Figure 2:
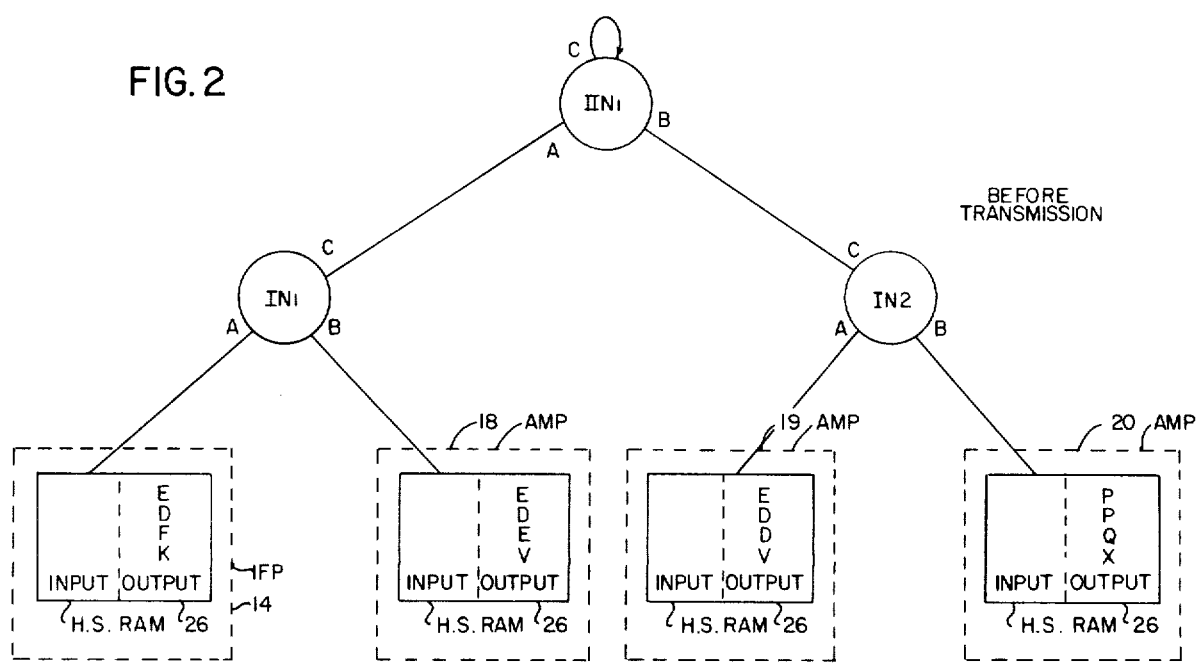
FIG. 2 is a set of sequential diagrams comprising FIG. 2 and FIGS. 2A to 2J showing the transmission of data and control signals in a simplified example of the network of FIG. 1.
Figure 2A:
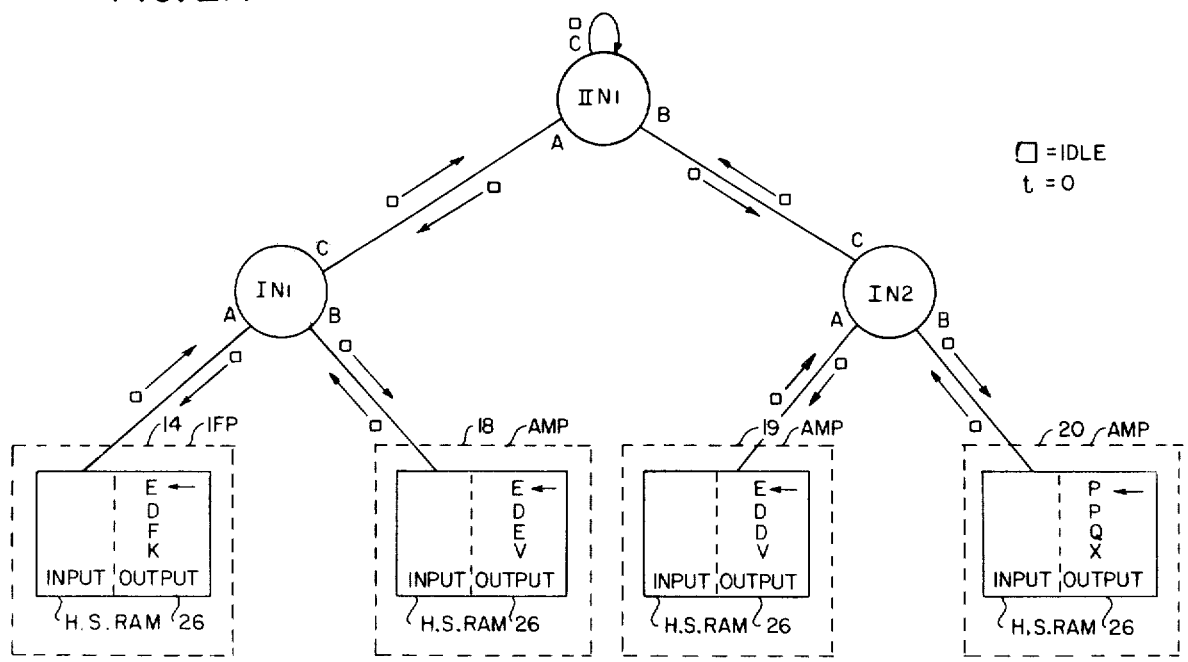

A simplified example is shown in the various representations of FIG. 2 of the manner in which the network 50 operates with the high speed random access memories in a tree using four different microprocessors, specifically an IFP 14 and three AMPs 18, 19 and 20. Ten subfigures 2A, 2B, . . . 2J each correspond to one of ten successive time samples, from t=0 to t=9, to show the distribution of different simplified (four character) serial messages from each of the microprocessors within the network at each of these points in time, and the communications between ports and microprocessors at the different times. The diagram labeled simply FIG. 2 shows the state of the system prior to the beginning of signal transmission. In these separate views, the null or idle state requires a transmission designated ☐. With the convention of lowest data content having priority, the message packet "EDDV" from AMP 19 in FIG. 2A should be the first to be transmitted through the system. These messages are retained, as described in greater detail below, in the high speed random access memories (sometimes H.S.RAM) 26 in the microprocessors. The H.S. RAMs 26 have input and output subdivisions that are depicted generally in FIG. 2, with the packets being arranged in FIFO vertical order in the output portion at t=0, thus being available for transmission, as indicated by the cursor arrow in H.S. RAM 26. At this point in time all transmissions in the network 50 indicate the null or idle state ☐.

Figure 2B:
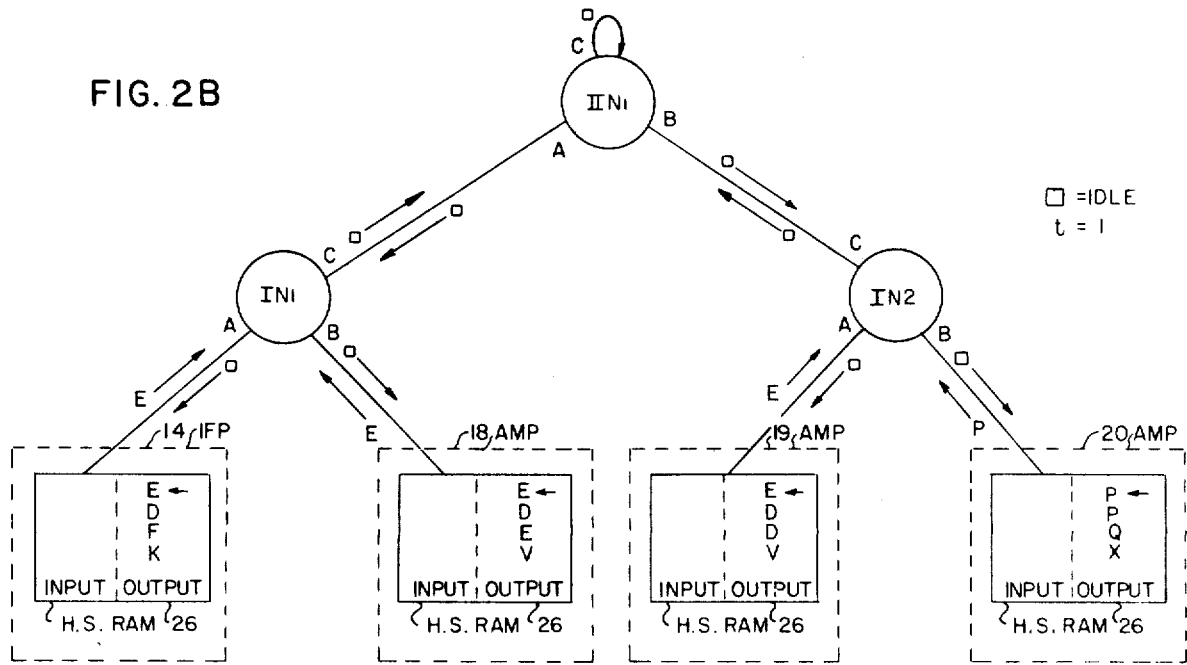

At t=1, however, as designated in FIG. 2B, the first byte of each of the message packets is launched into the network 50 concurrently, with all nodes 54 still returning the idle state indications and all transmissions above the first tier also being in the idle state. In the first clock interval, the initial bytes of the messages are set into the lowest tier nodes, IN₁ and IN₂, so that at t=2 (FIG. 2C) contentions have been resolved and both upstream and downstream transmissions continue. Node IN₁ has received an "E" on both input ports and is transmitting this upstream to the next tier, indicating the undecided state downstream to both sending processors. At the same tier, however, node IN₂ has determined collision priority between the "E" from processor 19 and the "P" from microprocessor 20, in favor of the former, thus coupling port A to up-tree port C and providing the $B_{col}$ signal back to microprocessor 20. As the $B_{col}$ signal is returned toward the microprocessor 20, the IN₂ node in effect locks the A input port to the C output port, so that the serial train from microprocessor 19 is transmitted on to the apex node IIN₁.

Figure 2C:
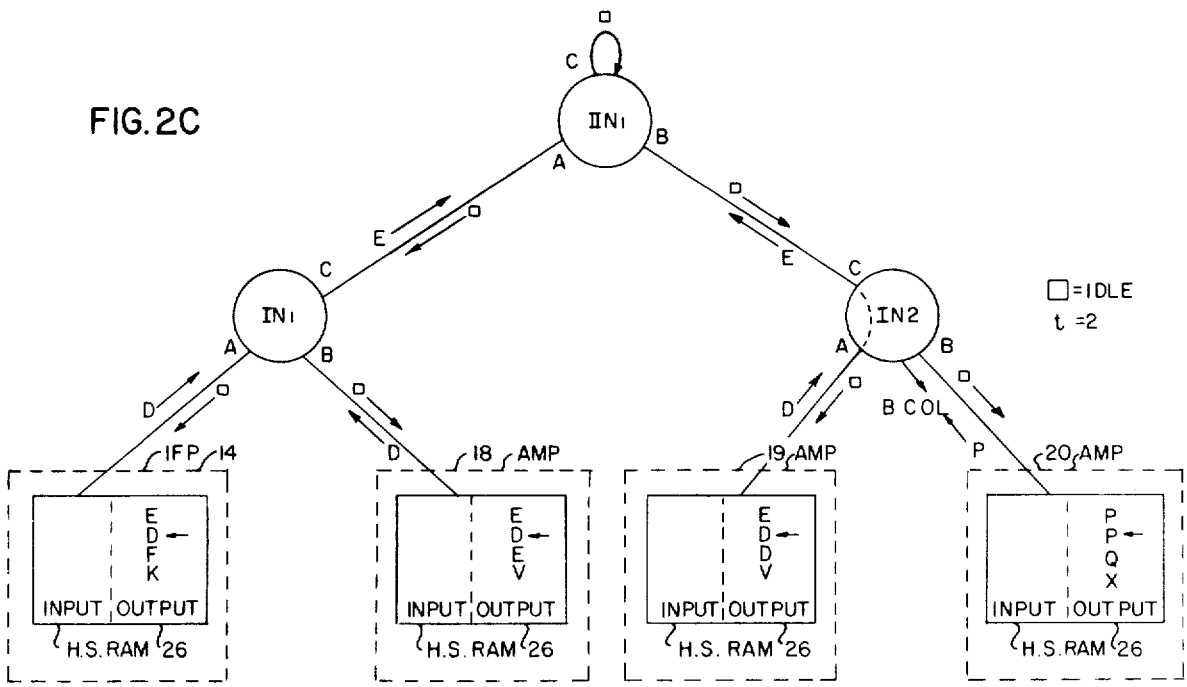
Figure 2D:
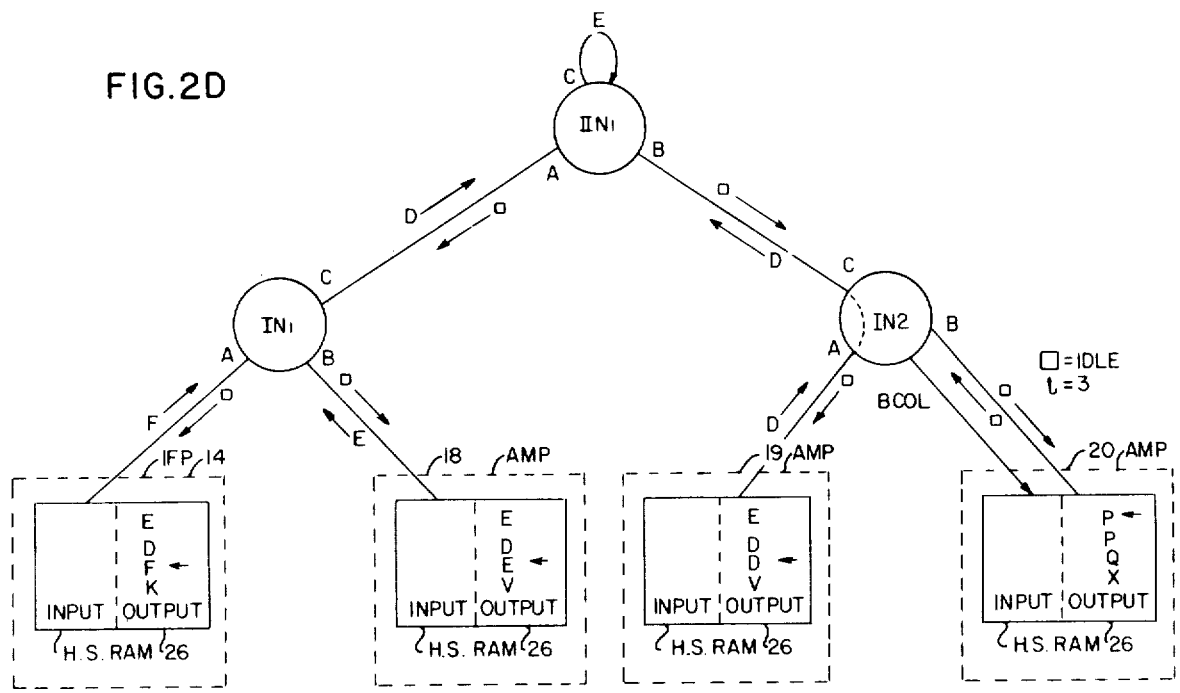
Figure 2E:
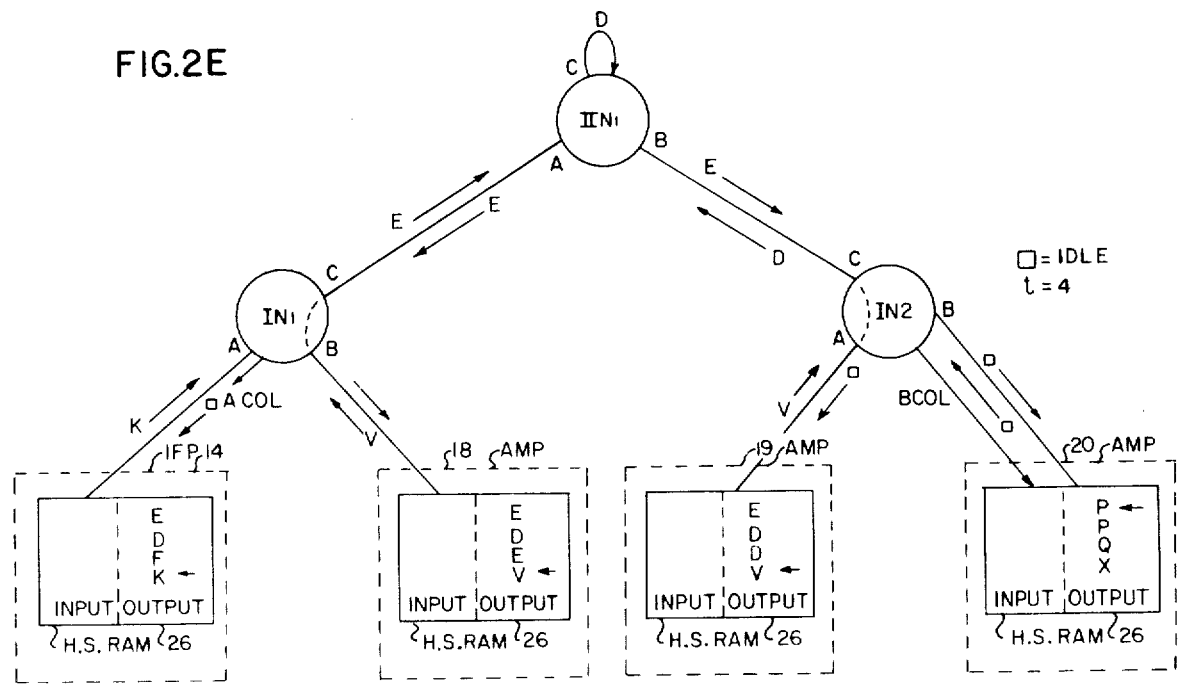

At the IN₁ node the first two characters are both "ED", and no decision can be made at this node at time t=2, as shown in FIG. 2C. At t=3 (FIG. 2D), moreover, the common initial character "E" from the three microprocessors 14, 18, and 19 reaches the IIN₁ apex node and is redirected toward the downstream direction, as the second character "D", also common to all messages, is transmitted toward apex node IIN₁. Node IN₁ cannot yet make a decision at this time, but the third characters, "F", "E" and "D" from the successive microprocessors 14, 18, and 19 respectively are in the course of transmission to that node. Reception of the $B_{col}$ signal at the microprocessor 20 designates that its contention for priority has been lost, and it then and thereafter transmits only the idle indication ☐. The cursor arrows in the output buffers show that the microprocessor 20 has been returned to its initial state but that the other microprocessors continue to send successive characters. Thus at t=4 (FIG. 2E) the significant events are the decision for the port at node $IN_1$ and the return transmission toward the first node tier of the initial character ("E") on all lines. The next collision is indicated at t=5 (FIG. 2F), with the B port of node $IIN_1$ winning contention and $A_{col}$ being generated.

Figure 2H:
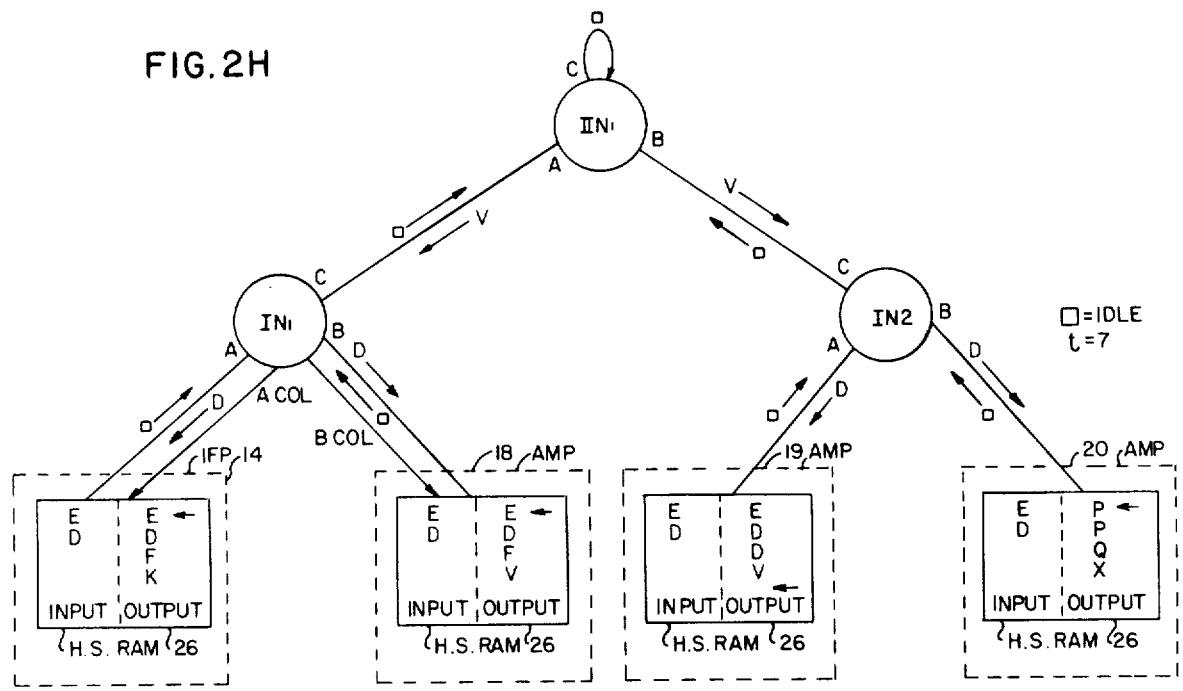
Figure 2I:
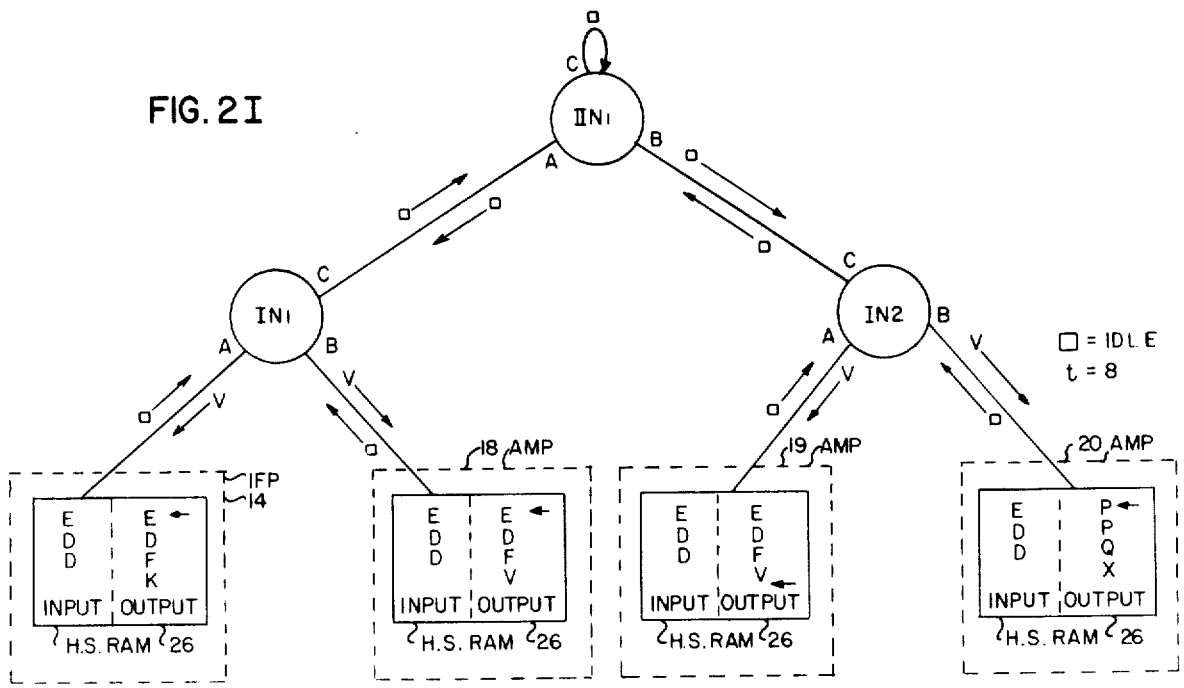

Broadcasting of the serial signal train in the downstream direction continues through successive clock times, and at time t=6 (FIG. 2G) the initial message character is set into the input portions of all H.S. RAMs 26. Concurrently it should be noted that the earlier priority determination at node $IN_1$ is now overridden by the $A_{col}$ indication from the higher tier node $IIN_1$ when the third character ("E") from the microprocessor 18 loses in contention with the third character ("D") from the microprocessor 19. As the cursor arrows show in FIG. 2H, microprocessors 14, 18 and 20 have returned to their initial states and winning microprocessor 19 previously completed its full transmission at time t=4. All input buffers are successively loaded with the priority message "EDDV" as seen in FIGS. 2H, 2I and 2J. At t=8 (FIG. 2I), the message has run out of the first tier and the apex node $IIN_1$ has been reset at t=7, because only idle signals are in contention, as the last downstream character is transferred to the microprocessors. At t=9 (FIG. 2J) the nodes $IN_1$ and $IN_2$ in the first tier are reset, and all the losing microprocessors 14, 18 and 20 now contend again for priority on the network by emitting the first message character when the network is again indicating idle. In practice, as described hereafter, acknowledgment signals are transmitted to the winning microprocessor(s), but this is not required for the most general case of the invention.

The message, once broadcast to all microprocessors in this manner, may be used by any or all as required. This depends upon the mode of operation and the functions being performed, which include many variations.

GLOBAL INTERCOMMUNICATION AND CONTROL

Figure 13:
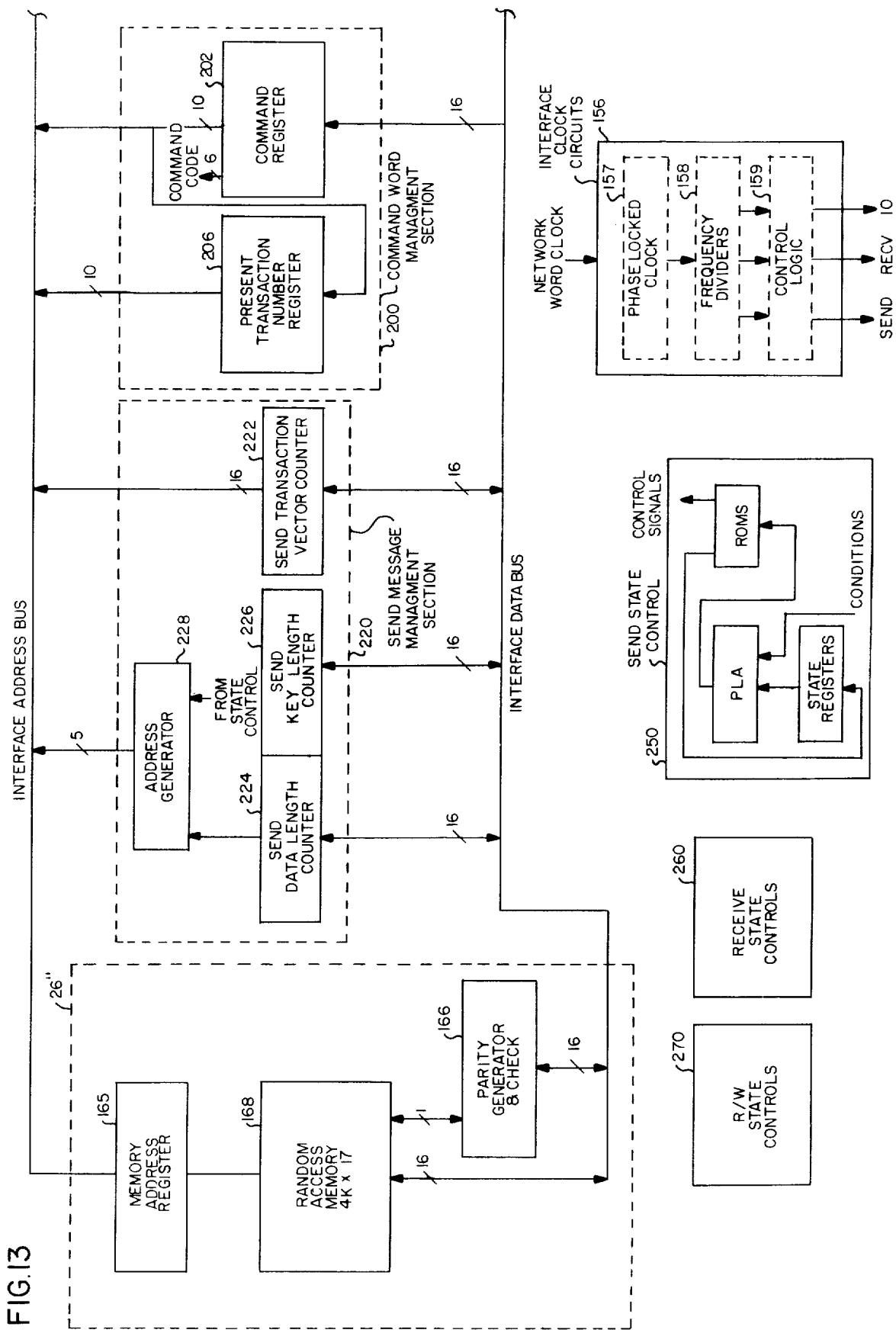
FIG. 13 is a block diagram of interface circuits employed with each processor module in the system of FIGS. 1 and 8 and comprises two sheets (FIGS. 13 and 13A) that are to be placed together with FIG. 13A on the right.
Figure 13A:
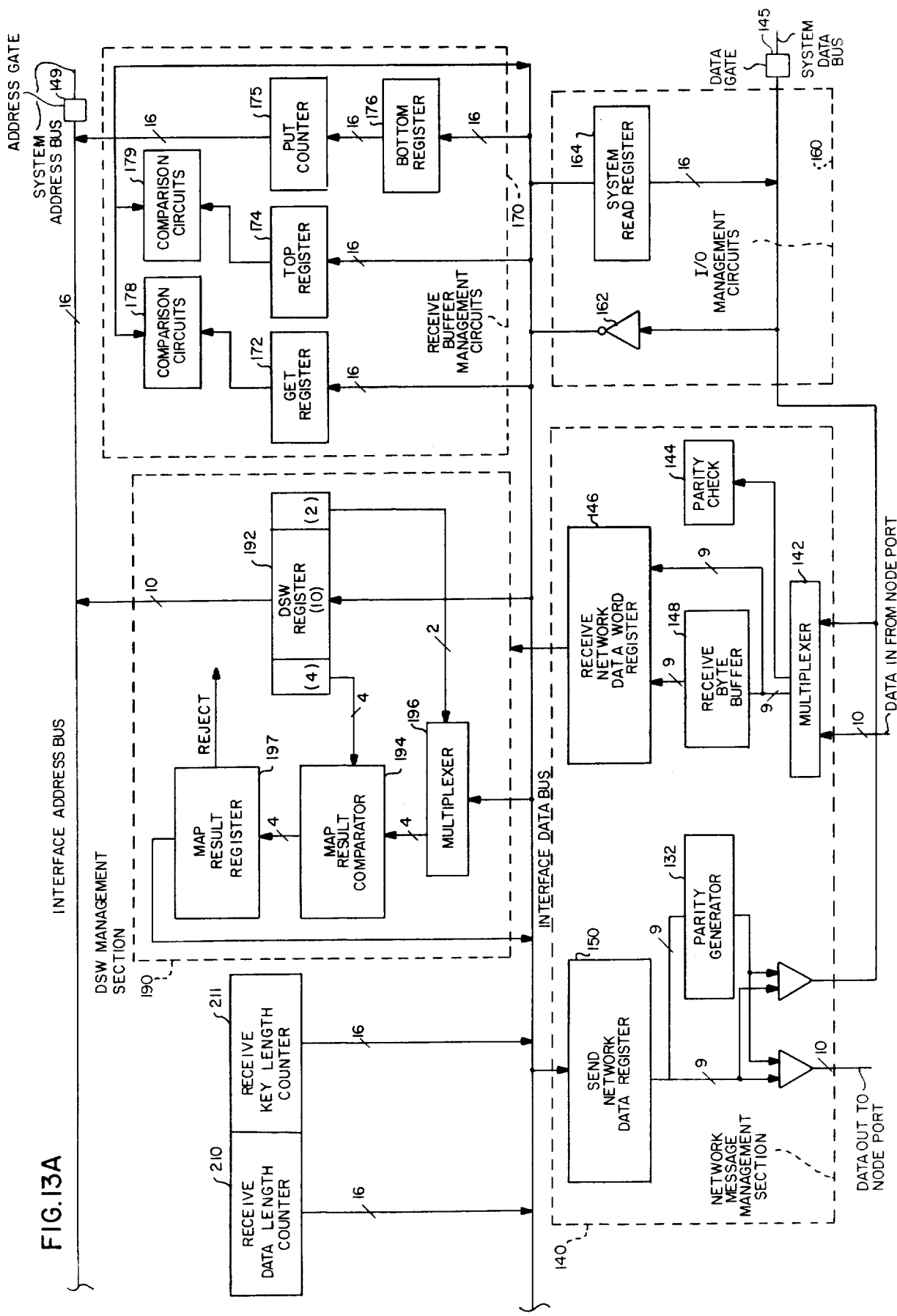

The foregoing example of the manner in which the network prioritizes a given message out of a group of contending messages pertains to the transfer of primary data messages. A complex multiprocessor system must however use many other types of communications and commands to have the efficiency and versatility now required. The principal functions to be supplied encompass, in addition to primary data transfer, what may broadly be termed multiprocessor modes, message acknowledgments, status indications and control signals. The following section provides a general overview from the global, or multiprocessor system, standpoint as to how different modes and messages coact with the prioritized sorting and communication network. Reference should be made to FIGS. 8 and 13 and the accompanying descriptions hereafter for a more detailed understanding.

In the general distribution or broadcasting mode, messages are simultaneously delivered to all processors without specific delineation of one or more recipients. This mode is typically used for responses, status queries, commands, and control functions.

Where there is to be a delineation as to the recipient, the destination selection information within the message packet itself provides criteria for local acceptance or rejection of the packet. For example, interface logic in the receiving processor modules identifies whether the data is in range for their particular processor according to map information stored in the high speed RAM 26. A variety of selection criteria can be readily implemented by means of various settings of the map bits in the high speed RAM, including selection of a specific recipient processor, portion of the data base stored ("hased"), logical process type ("class"), etc. The use of broadcasting with local access control is of particular benefit for a data base management system, inasmuch as minimal overhead software is needed to gain access to any part of the widely dispersed relational data base or to dispersed local copies of any of a number of globally known logical processes. The system is thus capable of specifically selecting a single destination or a class of resources as the destination for a message.

Also, high level data base inquiries often require cross-referencing between different portions of the data base, and consistent reference to a given task. The TN incorporated in the messages provides this global transaction identity and reference, among other features. Many tasks may be worked on concurrently by the asynchronous local processor modules, and each task or subtask has its appropriate TN. Using various combinations of the TN, DSW and commands, virtually infinite flexibility is achieved. An extended sort/merge operation can be undertaken on a large number of tasks that are asynchronously assigned and processed. TNs can be assigned and relinquished and merges can be started and stopped. Certain messages, such as continuations, can have priority over other transmissions. Using the TNs and local processor updating of status as to the TNs, one query can determine the status of the global resource as to a given TN. A distributed update can also be accomplished in one communication. The present system enables all these functions to be performed without extending the software or materially increasing the overhead load.

As a consequence of the invention, multiprocessor systems with much larger numbers of processors than feasible in the prior art can be operated with high effectiveness against problem tasks. Because of the present low cost of microprocessors, systems of high performance in a problem domain, and not just in "raw" power, can be realized at low cost.

A coherent priority protocol that encompasses all message types, and various subtypes, embraces all the different messages that are applied to the network. Although responses, status and control messages are of a different form than the primary data messages they also use the contention/merge operation of the network and thus are prioritized during transfer. Response messages in the present system are positive acknowledgment (ACK), negative acknowledgment (NAK), or an indication that the processor does not have the resources to process the message meaningfully ("not applicable processor"—NAP). The NAK response may be any of several different types, indicating a locked, error or overrun condition. Because an originating processor or processors require such responses after termination of a message transmission, the responses have a higher priority level than primary data messages.

The present system also employs SACK (status acknowledgment) messages that denote the readiness state of a local processor with respect to a particular task or transaction. Such SACK responses are locally updated and held accessible to the network. They provide, in conjunction with the merge operation of the network, a single query global status report for a given task or transaction. Because the status responses are in accord with the priority protocol, the lowest data content response automatically gains priority and establishes the least ready status as the global system state for a transaction number in one uninterruptible operation. The SACK indications also are used in conjunction with certain primary messages to implement various protocols, such as system initialization and lockout operations.

The priority protocol definition for the various message types begins with the command code, using the initial 6 bits of the command word that starts each message and response, as shown in FIG. 11. An adequate range of distinctions as to message types, and subtypes, is available although more could be used. Here the SACK response differentiates seven different status levels (and provides a basis for prioritizing as well), as can be seen by reference to FIG. 11. For responses these first 6 bits are followed by the tag in the form of a 10 bit OPID (see FIG. 3). Both the TN and OPID can serve as further sorting criteria because of their differing data contents, within the tag.

After each primary message has been transmitted through the network, the interface section of *every* processor generates a response message, even if it is only a NAP. The responses also contend on the network, and the single or common winning response message is broadcast to all processors. Losing message packets are retried later, synchronously, after a minimal delay so that the network is substantially constantly in use. Where a number of processors provide an ACK response, the responses are sorted by the OPID.

As a consequence of the invention, tasks can be started, stopped, controlled, and interrogated in synchronism in a very large number of physical processors with a minimum of overhead. This permits the raw power of a large number of processors to be effectively applied to problem-state processing with a minimal diversion of that power to coordination and control. The overhead of coordination and control is a fundamental limitation on the efficacy of any distributed processing system.

Different types of control communications are employed where the purpose is globally (i.e. network) oriented. Thus, Stop Merge, Status Request, Start Merge, and certain task assignment and relinquishment messages have the same format as data messages and are also referred to herein as primary messages. These control messages also include the TN and have their places in the priority protocol, as is later discussed relative to FIGS. 10 and 11.

The term "global semaphore buffer system" has been adopted to connote the fact that the high speed random access memory 26 and control logic 28 shown in FIG. 1 also play a significant role in both multiprocessor mode selection and bidirectional communication of status and control indications. The global semaphore buffer system provides duality of access, in that both the high speed network structure 50 and the slower speed microprocessors can reference a message, response, control or status indication in the memory 26 without delay or requiring direct communication with each other. To this end the control logic 28 times multiplexes the memory 26 to network 50 and to the microprocessor in interleaved word cycles, creating in effect different ports having common access to the memory 26. The global resource or network 50 and microprocessors can use the transaction number as an address locater to a portion of the memory 26 devoted to transaction status. At the local level, the status of a subtask relating to a given transaction covering all useful states, is updated in the memory 26 under control of the microprocessor and locked by the control logic 28 at the buffer system. One of seven different readiness states is used, the entries conveniently being derived from a different dedicated portion of the memory 26. Upon a query from the network, the status of the processors is communicated (the "semaphore" is read) and prioritized in the network with the least complete readiness state taking priority. This arrangement provides an immediate hardware response from all processors to a query. Thus it can be known without delay or the use of software whether all of the distributed subtasks of a given task have been accomplished. In the instant system, moreover, any communicating processor module can assign an available transaction number for use with the messages and in each global semaphore buffer system.

A good example of this integrated use of transaction identity and status indication is presented by a complex merge operation, in which each of a number of processors is called upon to place in order all messages pertaining to a given criterion. In prior art systems each processor would have to receive and complete its tasks and then communicate the results to some "master" processor, which would do the final merge operation. That master processor thus constitutes a significant bottleneck to system throughput.

When the global readiness state establishes that all affected processors are ready, the messages of highest priority from the memory 26 at each processor are entered on the network concurrently and prioritized during merger as previously described. Successive retries with groups of messages generate a serial train of messages of descending priority, ending with the lowest for that transaction number. Specific command messages provide the system with the ability to suspend and resume the merge operation partway through so that the network 50 can be shared by a number of copending merge operations and thus make most effective utilization of the resources of the systems.

At any given time, therefore, all active processors connected to the network 50 can be working asynchronously on messages pertaining to different transaction numbers. When referenced to the same or "present" transaction number by a status query, all respond synchronously with one of the available status levels. For example, The START MERGE message tests the global semaphore represented by a particular transaction number, and if the global state is ready (SEND READY or RECEIVE READY), the present transaction number (PTN) is set to the TN conveyed in the START MERGE message. (If the global state is not ready, the PTN reverts to a value of TN0).

A STOP MERGE message also resets the present transaction number to 0. TN0 is thus utilized as the "default" transaction number used for single processor to single processor (point-to-point) messages. In another sense, it identifies the "non-merge" mode of operation.

The global intercommunication system uses the message organization shown in FIGS. 3A, 3B, 3C and 11, and the high speed random access memory 26 organization shown in FIGS. 8 and 10. More detailed examinations are made below in conjunction with FIGS. 5, 7, 9 and 13.

In FIGS. 3A-3C and FIG. 11 it can be seen that command codes for the responses range from 00 to 0F (hexadecimal) and that those for primary messages range from 10 (hexadecimal) to some higher value. Thus, responses take priority over primary messages, lowest value first, in the sequence shown in FIG. 11.

One dedicated section of storage in the high speed RAM memory 26" (FIG. 8), (designated "transaction numbers") is used for storage of the word formats (the seven readiness states, an Assign TN and an Unassigned TN state) of FIG. 12. Other dedicated portions of the memory 26" include a circular buffer for input (receive messages) and an output message space. Another separate section of the memory 26" is used as a message complete vector section, in which pointers can be placed to completed output messages so that output message space can be used efficiently.

It should be appreciated, therefore, that while the queuing and data buffering functions of the memory 26 and control logic 28 are of importance, the multiple coactions by which global transactions are dispersed and manipulated in relation to the individual processors are uniquely significant.

ACTIVE LOGIC NODES

The active logic nodes 54 of FIG. 1 are alike, in both of the redundant networks, except that the recirculation node 54a at the apex of each network has no upstream port, but merely a signal recirculation path that returns to the downstream direction. As shown in FIG. 4, each node 54 may be broadly divided into functional groupings, one of which pertains to message and collision signal transmissions and the other of which pertains to generation and retransmission of the common clock signal. Clock signals are synchronized such that there is zero skew between them at the different nodes. These two functional groupings are not separate, inasmuch as the zero skew clock circuits form important parts of the signal transmission system. Both a word clock (two serial bytes) and a byte clock are utilized. Note should be taken of the fact that external control of the active logic nodes 54 is not required or utilized, whether to establish or reset the node's state or to set up different modes of operation. Furthermore, the identity between the nodes 54 enables them to be made in quantity using modern IC techniques, substantially reducing cost while improving reliability.

The A, B and C "ports" previously referred to each have ten input data lines and ten output data lines. Taking the A port as an example, the input lines are designated AI and the ouput AO. The single "collision" line is used at each port (e.g. $A_{col}$ for the A port), along with upstream and downstream clock lines. The data lines from the A and B ports are applied to a multiplexer 60 which switches the priority word of two competing words, or the common word (if both words are alike) to an up register 62 coupled to the upstream port (C) as the C0 data signals. Concurrently, the downstream data received at the C port from a higher tier node is shifted into and out of a down register 64, appearing as output at both of the A and B ports.

Although one upstream byte serial signal train may be blocked, no added upstream or downstream delay is introduced and words are advanced in unbroken sequence through the up register 62 and down register 64 under control of the word and byte clocks.

Competing bytes concurrently applied at the A and B ports are supplied to first and second parity detectors 66, 67 and also to a comparator 70 which determines priority on the basis of the eight data bits and one control bit, with lowest data content having priority. The "idle" or no message signal in this protocol is an unbroken sequence of 1's. Parity errors can occur due to typical causes, such as the presence of excessive noise or some other factor affecting signal transmission or circuit operation. In the present system, however, an important additional use is made of parity error indications. Each transition of a microprocessor to an inoperative state is marked by all output lines, including the parity line, going high (or 1 valued), thus establishing an odd parity error. This indication is transferred through the network once upon the presence of an error, as a marker which enables the system to identify a change in global resources and initiate procedures to determine the nature of the change.

The pair of parity detectors 66, 67 and the comparator 70 feed control circuits 72 that include priority message switching circuits 74, responsive to the comparator 70 for locking the multiplexer 60 in one state or the other if priority is determined, and for generating and propagating the downstream collision signals. Transitional parity error propagation circuits 76 are so called because they force the one-time all 1's parity error state along the network. Reset circuits 78 for returning the node to its initial state include an end of message (EOM) detector 80.

It will be appreciated that the functions described above and hereinafter may be accomplished at each active logic node by the use of a microprocessor chip, but they may even more readily be implemented in accordance with the state diagram of FIG. 5 and the logic equations set out below. In the state diagram, the state S0 represents the idle state, and also the state in which competing messages are equal, so that no decision is made to favor one port against another. The S1 and S2 states are the states favoring the A port and B port respectively. Thus the A port is favored (S1 state is established) if the data content of BI is greater than AI and there is no parity error on AI or if there is a parity error on BI (these conditions being designated $\overline{AIPE}$ and BIPE respectively and represented by flip-flop states). The converse logic conditions as to AI and BI exist for the system to go into the S2 state. Any indication from a higher tier node that a collision has occurred at that tier is reflected back in a downstream signal as $COL_{IN}$. Whether the system is in the S0, S1 or S2 states, it goes into the S3 state, transferring the collision signal downstream as $A_{col}$ and $B_{col}$. In the S1 and S2 states, with the node having made a decision, the collision signal is sent downstream to the lower tier nodes in like fashion, with the priority message switching circuits 74 locked to the A port or B port as the case may be.

Figure 5:
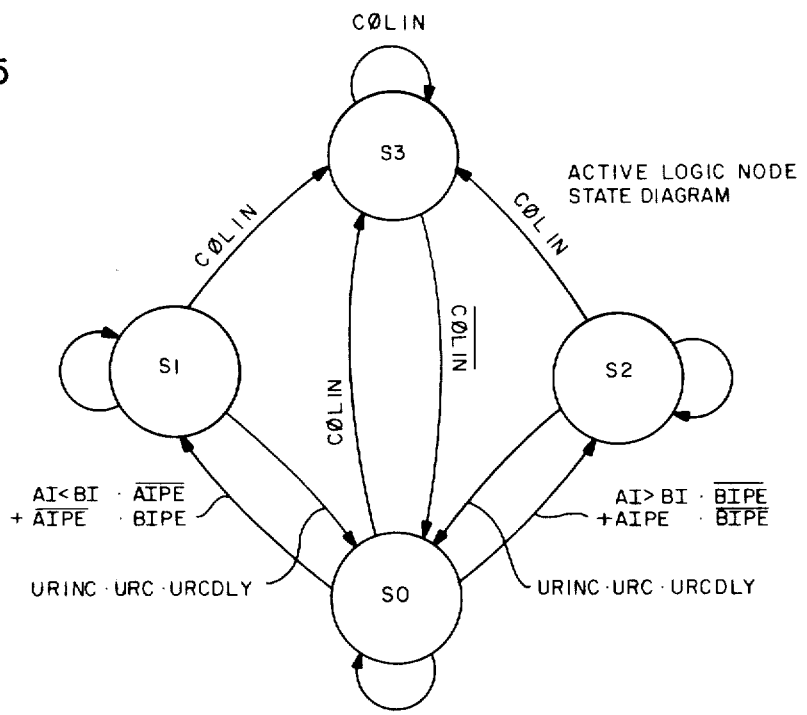
FIG. 5 is a state diagram depicting various conditions of operation in the active logic nodes.
Figure 6:
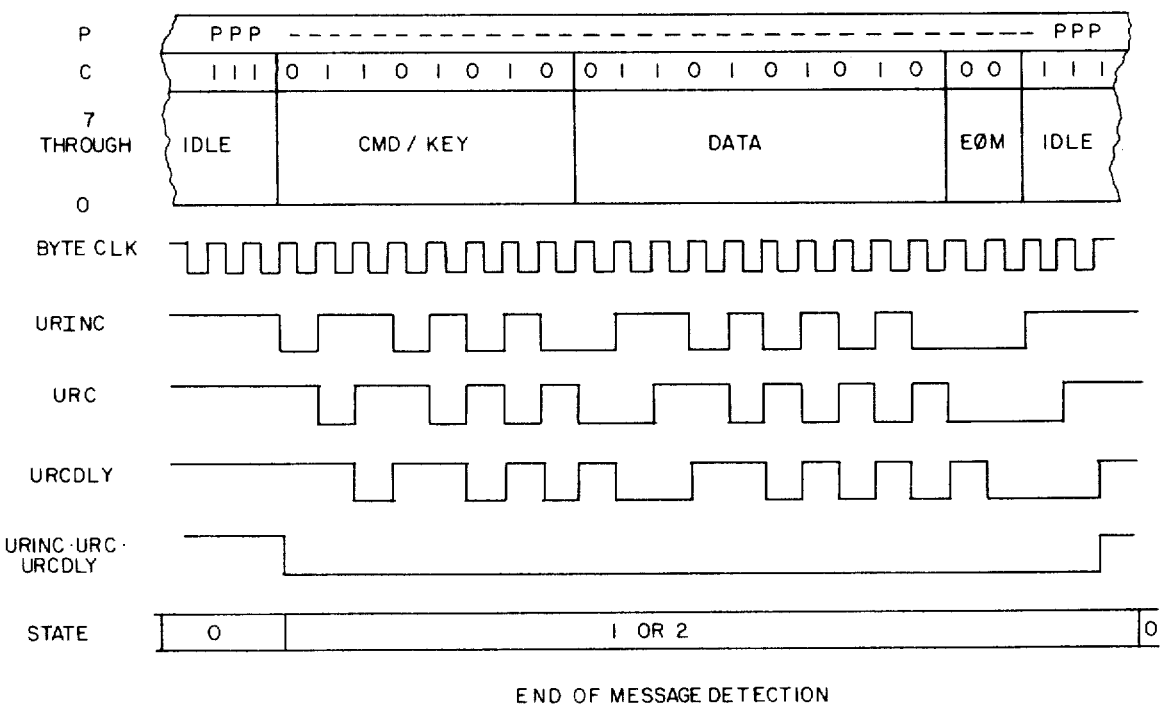
FIG. 6 is a timing diagram useful in explaining end of message detection in the active logic nodes.

The reset circuits 78 include the EOM detector 80, used to reset the node from S3 to S0 (FIG. 5). A first reset mode uses the end of message (EOM) field that concludes the data field in a primary message, as shown in FIG. 6. A group of flip flops and gates are used to establish the logic:

URINC·URC·URCDLY where URC represents the control bit in the up register, URINC represents the control bit value in the up register input and URCDLY represents the C value in an up register delay flip flop.

As seen in FIG. 6, control bit sequence pairs establish certain fields and transitions between them. For example, a transition from the all 1's used during idle to a 0, 1 bit sequence defines the start of a field. The same 0, 1 sequence defines the start of a field. The same 0, 1 sequence is used to identify the start of the data field. Successive 1, 0 control bit strings denote the internal field or subfield, and the end of message (EOM) is identified by the 0, 0 control bit pair. The condition in which the string of 1, 0 pairs is followed by the 0, 0 pair is unique and readily identified. The URINC, URC and URCDLY signals ane ANDed together, with each having a 1 byte clock delay from the other. The result is a waveform that is high until the start of the message packet, and at which point it goes low and stays low through the data. It returns high 2 byte clocks following the EOM occurrence. This positive-going transition in the waveform URINC-URC-URCDLY is the EOM detection. It triggers, as shown by the legend in FIG. 5, a return from S1 or S2 to S0.

A higher node tier that is reset goes to $\overline{COL_{IN}}$, indicating that the collision state has been removed. This logic state initiates a return from S3 back to the base state, S0. Note that the $\overline{COL_{IN}}$ state will propagate down the tiers of the network as the end of the message "runs out". The nodes are thus self-resetting no matter how long or short the message. Also note that no matter the state in which the network starts out, all nodes will be reset to the S0 state by the idle signals.

Collision signals are returned to the processor modules, which store the collision state information and revert to the transmission of the idle sequence as the winning processor continues to transmit. A processor may begin a new transmission as soon as it detects the transition from $COL_{IN}$ to $\overline{COL_{IN}}$. In addition, a processor may begin a new transmission after receiving idles for 2N byte times, where N is the number of tiers in the network, as this also indicates that the network is clear of any prior transmissions. This latter method of enabling new transmissions permits a processor entering a network for the first time to get into message synchronism with the network under conditions of light traffic, so that it need not wait for a poll from another processor in order to start interchange with other processors on the network.

Parity error states have been noted in the state diagram of FIG. 5 and are established pursuant to the following logic:

$$PESIG = AIPE \cdot \overline{AIPEDLY} + BIPE \cdot \overline{BIPEDLY}$$

If PESIG then (URIN 0:7, C, P=1 . . . 1, 1, 1) to implement this logic, the transitional parity error propagation circuits 76 comprise an AIPE, or A input parity error flip flop and a delay flip flop (AIPEDLY). The latter is set 1 byte clock later in accordance with the AIPE setting. For A inputs, the PESIG value thus goes high for 1 byte clock when the AIPE flip flop is set by a parity error, so that the PESIG signal is propagated once, at the first indication of the parity error. The same condition arises when all of the data bits, control and parity bit are 1 values, which occurs at the previously noted transition in the state of the global resources. All lines then go high, forcing all 1's and establishing an even total (odd parity) so that the AIPE and AIPEDLY flip flops are set as previously described, to denote the parity error. This system operates in the same way when the message packet received on the B port contains a parity error or a forced parity indication of change of status.

Parity errors arising because of noise effects or other variables will typically not affect processor operation because of the redundant networks. For monitoring and maintenance purposes, indicator lights (not shown) are utilized to indicate the occurrence of parity error. The once-propagated parity error denoting change of status, however, initiates routines for assessing the significance of the change.

The clocking system used in the node 54, as shown in FIG. 4, provides a unique means for maintaining zero skew between the clocks at all the node elements, despite the number of tiers used in the network. The clock circuits 86 include first and second EXCLUSIVE OR gates 88, 89 respectively, the outputs of which, designated A and B, respectively, are subtractively combined (in the B−A sense) by a summing circuit 92, the output of which is passed through a low pass filter 94 to control the phase of the output from a phase locked loop or oscillator 96. The inputs to the first gate 88 are the output of the PLO 96 and a downstream clock passed from the next higher tier node element through an isolating driver 97. This line is designated as the word clock, and is derived from the next higher tier after a certain known delay, $\tau$, the same signal being returned through another isolating driver 98 to the node at the next higher tier. The inputs to the second gate 89 comprise the word clock and a clock feedback from the next lower tier, which also receives a signal from the PLO 96.

The word clock line feeds the two inputs of a third gate 100, both directly and through a $\tau_c$ delay line 101, to derive a byte clock signal at twice the frequency of the word clock and in timed relation to it.

Figure 7:
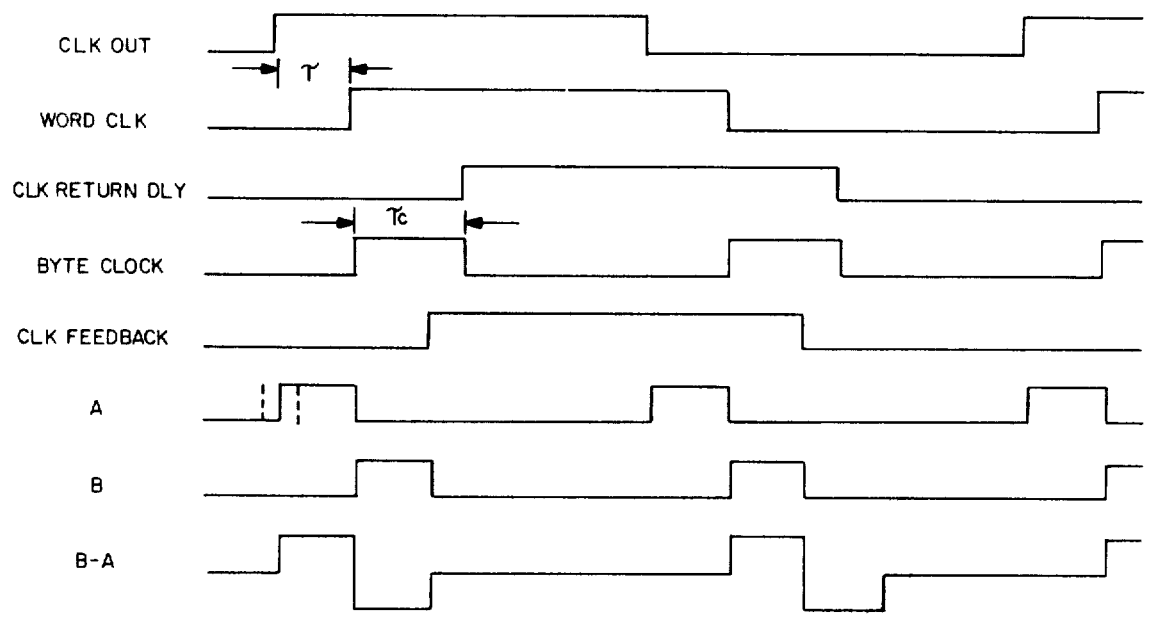
FIG. 7 is a diagram of timing waveforms useful in explaining the operation of the clock circuits of FIG. 4.

The functioning of the clock circuits 86 may be better understood by reference to the timing diagram of FIG. 7. The clock out signal is the output of PLO 96. Inasmuch as a paramount objective of the system is to maintain a zero time skew between these outputs for all nodes in the network, it is clear that they must also have the same nominal frequency. The transmission line delay, $\tau$, between nodes is kept substantially constant, but can be long. Using the presently disclosed technique the length could be as long as 28 feet, with the network and node byte clock rates (nominally 120 ns.) used in a practical system. Those skilled in the art will recognize that lengths which are integer multiples of 28 feet can readily be obtained by adding tiers to the network which are not fully populated with the maximum possible number of processor modules. There will be a corresponding increase in the latency or transmit time through the network.

The word clock derived from the next higher tier, as shown by the next lower waveform, is a similar waveform but delayed by 96 . The word clock constitutes the basic timing reference throughout all the nodes, and this is made possible because the leading edge of each clock out signal is controllable within the circuit and can be made to lead the word clock so that all nodes can be held in synchronism. Referring to the waveforms A and B, it can be seen that the first gate 88 generates a pulse A which terminates with the leading edge of the word clock, while the second gate 89 generates a pulse B whose leading edge is coincident with the word clock. The trailing edge of the B pulse is defined by the initiation of the feedback pulse from the next lower tier mode, which is delayed by $\tau$, so that the B pulse is of fixed duration. The clock circuits 86 function to keep the pulse A of the same duration as pulse B, because the summed signal, B−A, tends toward a null, as the PLO 96 is advanced in phase so as to establish synchronism. In effect, the leading edge of the A signal, which may lead or lag the desired position as shown by dotted lines, is adjusted to precede the leading edge of the word clock by the interval $\tau$. When the leading edge of the clock out signal is in this desired nominal position at all the nodes, there is zero skew between the word clocks. For this reason the processors coupled to the network are freed from any constraints as to the total length of the path between one processor and another, because additive delays and differential propagation times are eliminated.

To produce the double frequency byte clock, the word clock signal is replicated at a delay $\tau_c$ by the delay line 101, which also feeds the gate 100. Thus, as seen in the waveform labeled byte clock in FIG. 7, at either edge of the word clock, a byte clock pulse is produced having a duration $\tau_c$. This occurs twice each word clock interval and in synchronism with the word clock throughout all the nodes. It is implicit in the prior description that the delays introduced by the transmission lines between nodes are nearly identical in both directions between tiers so that in effect all word clocks and byte clocks within the system are held in stable phase relationship. The locally generated byte clocks therefore provide clocking at each node for the individual bytes in the 2 byte words of the messages.

The active logic nodes are of potential benefit wherever a competition between concurrent message packets is to be resolved on the basis of data content. Most known systems, as exemplified by U.S. Pat. No. 4,251,879 issued Feb. 17, 1981 on a "Speed Independent Arbiter Switch for Digital Communication Networks" are directed toward determining the first signal received in time, and utilize external processing or control circuits.

PROCESSOR MODULES

The individual processors in the overall system diagram of FIG. 1 are identified as examples of interface processors (IFPs) 14 and 16 and access module processors (AMPs) 18 to 23 respectively, and are broadly subdivided into principal elements. A more specific example of the organization of the processor modules shows the correspondence to the broad functional subdivisions of FIG. 1 but also reveals a substantial number of further subdivisions. As used herein, the term "processor module" refers to the entire assembly shown in FIG. 8, which with the optional features that are noted can serve either as an IFP or an AMP. The term "microprocessor system" refers to a system 103 that incorporates a microprocessor 105 such as a 16 bit microprocessor of the Intel 8086 type. The address and data busses of the microprocessor 105 are coupled within the microprocessor system 103 to conventional peripheral systems, such as the main RAM 107, and a peripheral controller 109. The peripheral controller 109 exemplifies what may be used when the processor module is an AMP and the peripheral unit is a disk drive 111. As shown in the dotted line rectangle, however, this controller or interface may alternatively be a channel interface if the processor module is to serve as an IFP. In this instance the channel interface would communicate with the channel or bus of a host system. Inasmuch as conventional controllers and interfaces may be used in the microprocessor system 103, they need not be further described.

It is noteworthy that it can be shown to be advantageous to use one disk drive per microprocessor, in terms of both cost and performance. This is true as to data base machines in general, even though there may be benefit at times in arranging one microprocessor so as to have access to a number of secondary storages. The diagram omits, for purposes of brevity, the incorporation of other subsystems that would typically be used, such as interrupt controllers that are supplied by semiconductor manufacturers for use in conjunction with their systems. Those skilled in the art will recognize the importance of a suitable scheme for distribution of electrical power to the processor modules to attainment of the full degree of redundancy and reliability the invention can provide.

The peripheral controller 109 and the channel interface depicted as an option in the microprocessor system 103 correspond to the IFP interface and disk controller in FIG. 1. The high speed RAM 26 of FIG. 1, however, actually comprises first and second H.S. RAMs 26', 26" respectively, each of which through time multiplexing is effectively a three-port device coupled to the microprocessor bus system at one of its ports (designated C). Each of the H.S. RAMs 26', 26" cooperates respectively with a first or second network interface 120, 120', providing communication with the first and second networks 50a and 50b (not shown in FIG. 8) respectively at an input (receive) port A and output (send) port B. With these redundant systems, only the second network interface 120' and the second H.S. RAM 26" need be described in detail. The network interfaces 120, 120' are further shown and described in conjunction with FIG. 13, but can be generally subdivided into four principal parts:

Input register array and control circuits 122 coupling the ten input lines from the second network 50b to the A port of the H.S. RAM 26" via an interface data bus and address bus.

An output register array and control 124 coupling the output lines of the second network 50b to the interface data and address busses and to the B port of the second H.S. RAM 26".

A microprocessor bus interface and control 126 coupled to the interface address and data busses and to the A and B ports of the H.S. RAM 26".

A clock generator 128 that receives the word clock from the network and generates synchronized, properly phased clocks for controlling the interface 120'.

The second network interface 120' and H.S. RAM 26" cooperate with the microprocessor system 103 in coordinating data transfers between the high speed network and the relatively slower speed microprocessor and also provide queuing of messages between these different systems. The microprocessor bus interface and control 126 may be referred to as performing read/-write (R/W) functions with the microprocessor system which (at least with the Intel 8086) has the capability of writing directly into and receiving data from the H.S. RAM 26".

Although the IFP and AMP systems are functionally alike, there can be a substantial disparity in the sizes of the incoming message storage and outgoing message storage in the H.S. RAM 26", as between the IFP and the AMP. In a relational data base system, the IFP has a large incoming message space in the H.S. RAM 26", in order to receive new messages from the high speed network so that the needs of the host computer may be serviced by constant usage of the network. In the AMP the reverse is true, because more storage space should be available to send processed message packets to the high speed network. The H.S. RAM 26" functions with the main RAM 107 in the microprocessor system 103, which has message buffer sections for each network.

Figure 9:
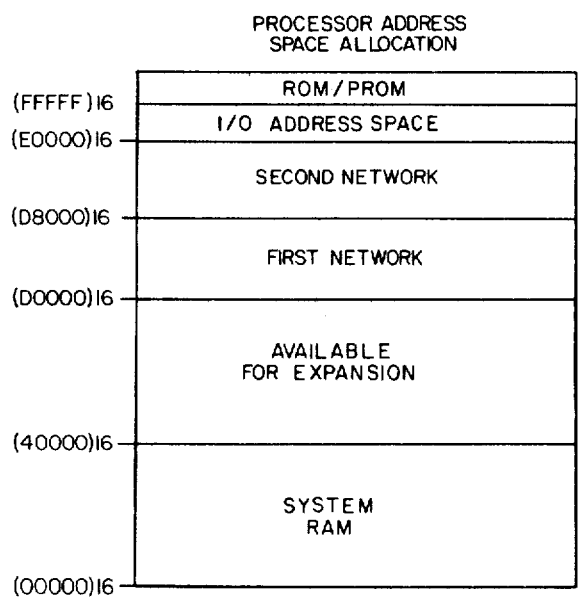
FIG. 9 is a diagram of address allocation in the main RAM of a microprocessor system as shown in FIG. 8.

The allocation of system address space in the main RAM 107 for the microprocessor system 103 is shown in FIG. 9, to which reference should briefly be made. It is conventional in having addresses devoted to system random access functions to provide an expansion space for use in the event the random access capacity is increased, an I/O address space and an address space reserved for ROM and PROM (including EPROM) functions. In addition, portions of the system address space are reserved for message packets from and to the first and second high speed RAMs 26', 26" respectively. This provides greater flexibility in the system operation, inasmuch as even though the microprocessor 105 can address the H.S. RAMs 26", the main RAMs 107 assure greater freedom from software and hardware interdependence.

It has been stated, referring again to FIG. 8, that the bidirectionally accessible H.S. RAMs 26" are organized in such fashion that they perform central functions in multiprocessor mode control, distributed updating and the management of message packet flow. For these and other purposes, the H.S. RAM 26" is divided into a number of different internal sectors. The relative disposition of the different sectors shown in FIG. 8 is used throughout the different processor modules in the system, and the specific addresses that designate the limits of the sectors refer to those used in an actual system. It will be appreciated that the sizes of these sectors of memory and their relative disposition are widely variable dependent on the specific system context. Sixteen bit memory words are employed in this example. The selection map and response directory are dedicated lookup tables of the type that may be written in once during initialization, while the transaction number section provides a dynamically revisable lookup table.

The selection map section of memory starts with location 0 but is based upon the use of four different maps used in interrelated fashion within the memory section. The destination selection word (DSW) that is contained within the message packet is used cooperatively with the dedicated selection maps in the H.S. RAM 26". The destination selection word, comprising 16 total bits, has a map address in 12 bit positions, and map selection data in the four other bits. Each of the first 1024 16 bit memory words of the H.S. RAM contains four map address values. The address value specified by the DSW provides, with a single memory access to the H.S. RAM, map bits for all four maps, while the map selection bits in the DSW determine which map is to be used.

Figure 15:
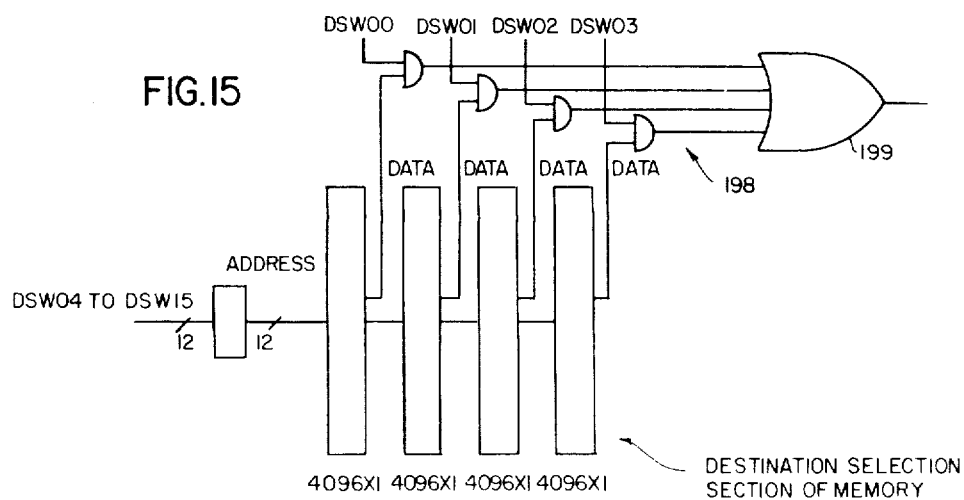
FIG. 15 is a block diagram showing further details of organization of memory and a system for mapping in accordance with destination selection words.

FIG. 15 shows the conceptual organization of the map section as if each map had physically separate 4096-by-1-bit RAM. As a matter of implementation convenience all map data is stored in a single portion of the H.S. RAM, as shown by FIG. 8. The DSW Management Section 190 (FIG. 13) controls multiplexing of four bits from each of the four maps of FIG. 15 from one 16-bit word of H.S. RAM. Those skilled in the art will recognize the advantage of the scheme in that the maps can be initialized by the processor by the same means as used to access other parts of the H.S. RAM.

There are also three different classes of destination selection word that are used, and the selection map locations are correspondingly divided into a hash selection portion, a class selection portion and a destination processor identification (DPID) selection portion. The DPID specifies whether the processor 105 is the specific one for which the message packet is intended, whereas the class selection portion specifies whether or not the processor is one of the number of processors in a particular process class that is to receive the message packet. The hash values are stored in accordance with the manner in which the data base is distributed throughout the relational data base system, following a predetermined algorithm for the particular relations and method of scatter storage that are employed. The hash value in this instance can designate the processor either as having primary or backup responsibility for the data. Thus the selection maps provide a technique for directly addressing the H.S. RAM 26" so as to determine processor destination. This function complements the broadcasting of prioritized messages to all network interfaces 120' and enables local accessing without interruption of microprocessor 105 status.

A separate section of H.S. RAM 26" serves as a pivotal means for checking and controlling globally distributed activities. Transaction numbers (TNs) are assigned to various ones of the processes that are sent on and received from the network 50b, as discussed above and shown in FIG. 3. TNs within messages are retained as global transaction identities as each microprocessor system 103 independently performs the subtasks accepted by it. The block within the H.S. RAM 26" that is dedicated to a number of available transaction number addresses contains status entries that are locally controlled and updated by the microprocessor system 103 as these subtasks are performed. The TN is used in a number of different ways, both locally and globally, in performing intercommunication functions. The transaction number is used to identify subtasks, to call forth data, to provide commands, to control message flow and to characterize the dynamics of a global process. Transaction numbers may be assigned, relinquished and changed in the course of global communication. These aspects are explained more fully in the following description.

The most complex, but perhaps the most dramatic, aspect of the TN is the capability it affords, with the sort network, for distributed updating of the status of local processors as to a given control process. Each control process (i.e., task or multiprocessor activity) has its own TN.

Readiness state values are held in the transaction number section of H.S. RAM 26" and are locally modified under control of the microprocessor system 103. The microprocessor 103 can initialize the appropriate entry (e.g. SACK/Busy) in the response directory (address 050D (hex)) of FIG. 10, and enter the SACK/Busy status by transferring the exact image thus reproduced to the H.S. RAM 26". An entry at a TN address is accessible to the network 50b via the interface 120', at the A and B ports of the H.S. RAM 26". Queries are made using a Status Request message containing the status request command code (see FIG. 11) and TN. The interface 120' uses the content of the designated TN to reference the response directory which contains a properly formatted response message. A global status query as to a given TN, when received at the second network interface 120' elicits a direct response that is solely hardware controlled. No prefatory communication is needed, and the microprocessor system 103 is not interrupted or affected. However, the microprocessor 103 can assure against interruption when setting the status by transmitting a LOCK indication to the interface 120', which communicates the Lock word derived from 0501 (hex) until removed at a later time.

The word format of the readiness states is shown by the seven states from "busy" to "initial" in FIG. 12, which depict the useful variants employed in a practical system. More or fewer status variants may be used, but these seven states provide versatile and comprehensive control. It is the responsibility of the microprocessor system continually to update status levels for different TNs in the H.S. RAM 26" to reflect availability for, or progress toward the completion of a subtask. Such updates are made simply by writing into the TN address in the H.S. RAM 26", using the formats shown in FIG. 12.

In FIG. 10 each status response is accompanied by an initiating status acknowledgment command code (SACK), from 05 to 0D (hexadecimal). The SACK responses sent to the network are essentially the command codes of FIG. 10, the numeric portions of the word formats of FIG. 12, and an originating processor ID (OPID), as seen in FIG. 11. The SACK responses thus define a consecutive priority subgrouping within the overall coherent priority scheme shown in FIG. 11. The OPID is significant in the priority scheme, because if a number of processors are working on a TN but are "Busy", the highest priority message that is broadcast is determined by the OPID. Transfers and system coordination can be based on this data.

The SACK message priority schedule, the simultaneous responses from a number of microprocessor systems 103, and the dynamic prioritizing in the network 50b, enable the status of global resource as to a given task to be determined in a vastly improved manner in comparison to prior art systems. The response given is unambiguous, cannot represent an invalid state and requires no software or local processor time. Thus Deadlock cannot arise due to repeated requests interfering with task performance, for example. Numerous multiprocessor options can be used at the different status levels. It is unique that the local processors can continue to operate independently and that a single query derives a global, prioritized, response.

Some specific discussion of the successive states depicted in FIG. 12 may be useful. The "busy" and "waiting" states connote successively more complete phases as to the assigned subtask, the latter identifying a condition in which a further communication or event is required. These states exemplify the "elevation" of the status of the TN until it reaches a level at which a message packet corresponding to the TN can be sent or received.

When a message packet is to be sent or received, however, a different feature of the TN comes into play, namely its capability for message control. When the microprocessor system 103 has a message for transmission, the status indication becomes "send ready". The microprocessor system 103 not only updates status but it also enters a "next message vector" value in the H.S. RAM 26", using the word format of FIG. 12. This entry defines the location at which the corresponding output message may be fetched from H.S. RAM 26". This vector is used internally in the network interface 120' in chaining together output messages pertaining to a specified TN.

A related function is performed during the "receive ready" state, in which the TN storage location retains an input message count from the microprocessor system 103 as to the number of messages that may be received pertaining to a given TN. This count can be decremented until reduced to zero as successive input messages are transferred. At zero, no more messages can be received and an overrun condition can be indicated. This enables the TN to be used in pacing transfer between the network 50b and the microprocessor system 103.

Locally, at each processor the TN is retained in the send and receive messages during processing, as a constant and uniform reference throughout the system. The TN0 or default state also provides a local command to identify the fact that a message is to be used in a non-merge mode.

From the global standpoint, moreover, the distinction between TN0 and TN>0 values establishes one of the command functions for which the TN is used. The merge/non-merge characterization thus inherent in each message packet, provides a valuable systems approach to prioritizing and sorting messages. Similarly, the "Assigned", "Unassigned", "Non-Participant" and "Initial" status are used to fulfill global intercommunication and control functions. The "Unassigned" state is one in which the processor has previously relinquished a TN, so that it must receive a new primary message reactivating the TN. If the processor indicates "Unassigned" when it should be "Assigned", this establishes that the TN was not properly entered and that corrective action should be taken. When a TN is "Assigned" where it should be "Unassigned", this may indicate a faulty transfer or a competition between two processors for a new TN. Neither "Assigned" nor "Unassigned" is treated as a readiness state, inasmuch as the processor has not yet undertaken work on the TN at these stages.

The "Initial" and "Non-Participant" states are also significant in global resource terms. A processor which comes on line and which therefore must be brought into the system is in the "Initial" state, which indicates that administrative steps are needed to bring the processor on line. Those processors which are "Non-Participants" in a given task do not need to do any processing locally, but must keep track of the TN so as not to inadvertently use it in an erroneous manner.

The dedicated directory or reference section of the H.S. RAM 26", referring again to FIG. 10, also includes other types of prioritized messages for use in generation of responses by hardware. NA (not assigned) entries are held available for future use. Three different types of NAK responses (Overrun; TN Error; Locked) are of lowest data content and at highest priority levels because they identify error conditions. The SACK responses are followed, in order of decreasing priority, by the ACK response and the NAP (not applicable processor) response. In the present implementation, two response command codes are not assigned (NA) and are available for future use. This directory can be initialized by software and is used by hardware to quickly and flexibly generate any of the range of response message texts.

A separate portion of this directory is used to store TOP, GET, PUT, and BOTTOM addresses or pointers related to the functioning of circular buffers for input messages and completed output message pointers. These pointers function in conjunction with the dedicated sectors of H.S. RAM 26" devoted to input message management and output message management respectively. For incoming messages, a circular buffer scheme is used, with "TOP", stored in the directory section of the H.S. RAM 26", being a variable address defining the upper position for incoming messages. The PUT address, also stored in the directory section, defines where the circuits are to store the next message that is received. The GET address is provided and kept updated by software to enable the hardware to recognize the location at which the software is emptying the buffer.

The incoming message buffer is managed by setting PUT at the bottom of the buffer and starting with the GET address equal to TOP. The rule of operation assured by software is that GET is not set equal to PUT, which would create an ambiguous condition. As messages are entered into the incoming message buffer in H.S. RAM 26", the message length value in the message itself establishes the beginning point of the next message and the PUT address stored in the directory is then changed to indicate where the next succeeding message is to be received in the buffer. Incoming messages can thus be fetched by the microprocessor system 103 as its capabilities permit.

Data in the output message space within the H.S. RAM 26" is utilized in conjunction with the output message complete vectors held in a separate circular buffer and the next message vector in the H.S. RAM 26". Messages can be assembled and stored in arbitrary locations, and related messages can be chained together from transmission on the network. In the directory section of the H.S. RAM 26", TOP, BOTTOM, PUT and GET addresses are entered and updated as previously described to maintain active present references to locations within the output message complete buffer. The message complete vectors constitute addresses which reference messages in the output message space that have been successfully transmitted as indicated by a response received. As described below, the system enables the microprocessor system 103 to enter output messages readily, but to handle complex linkage vector sequences in orderly fashion so that output message space is efficiently used and message chains can be transmitted.

The protocol of FIG. 11, which was previously discussed as to responses, is continuous with respect to the primary messages as well. Response messages are given in sequence, the hexadecimal command codes being stated in ascending order. In the primary message grouping, the stop merge (also the base or non-merge control) message is of lowest data content and highest priority. This message constitutes a control communication that terminates merge mode within the network and at the processor modules.

A substantial number of different types of primary data messages can be used in ascending priority, and can be categorized in priority order based upon application and system requirements. As mentioned, continuation messages can have higher priority so as to maintain continuity with the preceding message packet to which they relate.

The last grouping of four primary messages in FIG. 11 comprise, in descending order of priority, the status request message, which is the only type of status message needed to obtain the status response, control messages calling for "relinquish TN" and "assign TN", and, of lower priority, a "start merge" control message.

This system permits versatile operation, as will be evident from the more detailed examples given hereafter. A processor module operates on a present transaction number (PTN hereafter), whether this is externally commanded from the network or generated internally in the course of successive operations. When merge operations are being carried out, the processor modules utilize the global reference or transaction identity defined by the TN. Starting, stopping and restarting of merge operations utilizes only simple message changes. When subtasks do not require messages to be merged, or message packets are generated that have no specific relationship to other messages, they are queued to an output against TN0 and are transmitted when the base or default condition defined by Present Transaction Number (being 0), holds true. TN0 condition enables messages to be queued for transmission whenever a merge mode is not utilized.

NETWORK INTERFACE SYSTEM

FIG. 13, to which reference is now made, depicts in further detail one example of interface circuits useful in systems in accordance with the invention. This section of the description includes a number of detailed features that are not necessary to an understanding of the invention but are embedded in a practical system example and are therefore included to place the examples more firmly in context. Specific gating arrangements and details not the subject matter of the invention and involving well known expedients for which many alternatives are available have been omitted or abbreviated. FIG. 13 is an elaboration of the second network interface 120' and the H.S. RAM 26" from FIG. 8. The interfaces 120 for both networks function in like fashion and thus description of one will suffice.

In FIG. 13, inputs from the particular active logic network 50 associated with the interface are applied at network message management circuits 140 via a multiplexer 142 and known parity check circuit 144. The multiplexer 142 is also coupled to the microprocessor system data bus, enabling access to the message management circuits 140 via the bus. This feature permits the microprocessor system to operate the interface in a step-by-step test mode, transferring data as if the interface were on line to the network. Inputs from the networks are applied to a receive network data register 146, both directly in a first section and through a receive byte buffer 148 which thereafter enters the byte into a different section of the receive network data register 146. Consequently, both bytes of each word received are entered into and held available at the receive network data register 146.

Figure 21A:
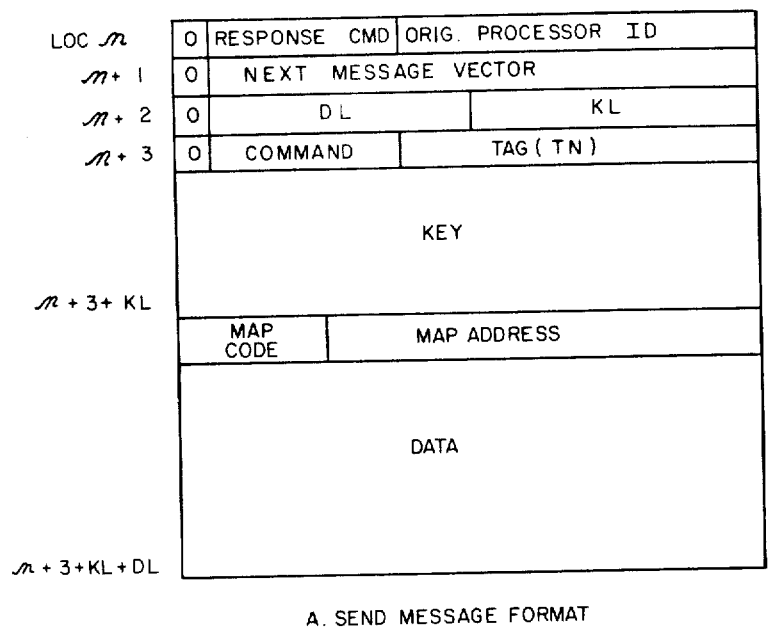
FIGS. 21A and 21B, is a diagram of messages stored in the high speed random access memory.

Output messages for transmission are entered into a send network data register 150, while a parity bit is added in a conventional parity generator 132. Messages are sent to the associated network from the network message management unit 140, or (where the test mode is to be used) to the microprocessor system data bus. For message management purposes within the interface, the send message format in the random access memory 168 comprises identifying data as well as message data. As seen in FIG. 21A, command, tag, key and DSW can all be incorporated along with primary data that is to be transmitted.

The organization shown in FIG. 13 is essentially the same as that shown in FIG. 8, which illustrates the interface data bus and address bus as separately coupled to input ports A and B at the H.S. RAM 26', while the address and data busses of the microprocessor system 103 are illustrated as coupled to a separate C port. In actuality, as seen in FIG. 13, this separate bidirectional access is achieved by time division multiplexing of input and output address functions within the interface and at the H.S. RAM 26". The microprocessor data and address busses are coupled to the interface busses via gates 145, 149 respectively so that the microprocessor can operate asynchronously on its own internal clock.

Figure 14:
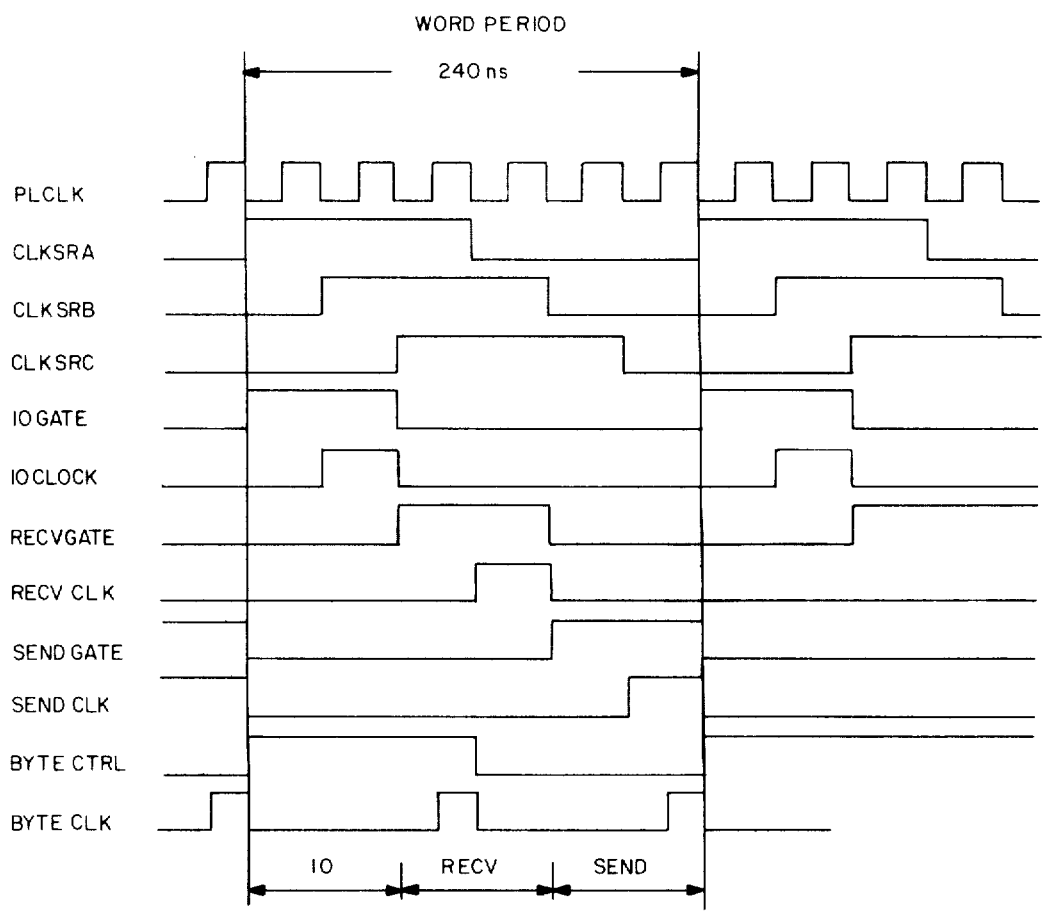
FIG. 14 is a timing diagram showing various clock and phase waveforms used in the interface circuits of FIG. 13.

The timing system used is based upon clock pulses, phase control waveforms and phase subdivision waveforms generated by interface clock circuits 156 (FIG. 13) and having the timing relationships shown in FIG. 14, to which reference is also made. The interface clock circuits 156 receive the network word clock from the nearest node and a phase locked clock source 157 includes means for maintaining zero time skew as previously described in conjunction with FIG. 4. The nominal network word clock rate of 240 ns. in the network is subdivided in time in the interface clock circuits 156 because a frequency multiplier (not shown in detail) held in phase locked relationship provides a faster clock defining reference period of 40 ns. duration (shown in FIG. 14 as PLCLK). The basic word period is defined by the opposite-going half cycles of a cyclic signal designated CLKSRA having a total 240 ns. duration. Two other signals of like frequency and duration are generated from PLCLK by frequency dividers 158 at times delayed by one and two cycles of PLCLK respectively from CLKSRA, and these are designated CLKSRB and CLKSRC respectively.

From these signals, control logic 159 develops timing waveforms, designated IO GATE, RECV GATE and SEND GATE, denoting successive equal thirds of the word period. These intervals are appropriately referred to as IO, receive and send phases. The phases defined by the gate signals are each further subdivided into two equal half intervals by IO CLK, RECV CLK and SEND CLK signals which define the last half of each of the phases. Byte clocking functions are governed by BYTE CTRL and BYTE CLK signals.

The IO, RECV and SEND phases provide the basis for time division multiplexed operation of the random access memory 168 and the microprocessor system busses. The interface can receive or send no more than one word per word period from or to the high speed network, and receiving and sending are obviously never concurrent. Transfer rates to and from the microprocessor system are substantially lower, but even if equal the capacity of the interface circuits would not be taxed. The interface system arrangement hinges in large part on direct access to the random access memory 168, and substantially obviates the need for internal processing or software. Thus as the system cycles through the successive phases in each word period, words are successively advanced in non-conflicting progressions along their predetermined signal paths for the different functions taking place. For example, sending a message to the bus may be interleaved with reception of a message from the microprocessor, each being interchanged using a different portion of the memory 168.

Intercommunication between the data bus for the microprocessor system and the network interface is effected in IO (which may also be referred to as Read/Write) management circuits 160. A write gate 162, for words from the microprocessor system, and a system read register 164, for transferring words to the microprocessor system provide the coupling between the microprocessor's bus and the bus interface to the network interface.

A memory address register 165 and parity generator and check circuits 166 are also incorporated in the network interface subsystem. In this example the high speed storage comprises a 4K word×17 bit random access memory 168, the internal subdivision of which and the use of dedicated memory portions within which have previously been described. The size of the random access memory can readily be reduced or expanded to meet the needs of a particular application.

Receive message buffer management circuits 170 are coupled to the data bus of the microprocessor and in turn are coupled to the address bus for the memory 168. The term "received messages" refers both to the incoming messages from the network for entry into the circular buffer at a location referred to as PUT and to the subsequent transfer of that message to the microprocessor system when a GET value specifies where the system is to sequence in extracting a received message for transfer to the microprocessor system. Address values for accessing the random access memory 168 are entered into a GET register 172, a TOP register 174, a PUT counter 175 and a BOTTOM register 176 respectively. The PUT counter 175 is updated by incrementing from an initial position defined by the BOTTOM register 176. The TOP register 174 provides an opposite limit reference. Both TOP and BOTTOM may be manipulated by software control to modify both the size of the receive buffer and the absolute location with H.S. RAM. When the contents of the PUT register equal the contents of the TOP register, the PUT register is reset to the contents of the BOTTOM register, thus effecting the circular nature of usage of the buffer. The GET, TOP and BOTTOM registers and the PUT counter are shared in managing both the incoming message and output message complete circular buffers.

Entries are made in the GET register 172 under software control, because the length of the then active message in the buffer determines the next address. Comparison circuits 178, 179 coupled to the outputs of the GET register 172, the PUT counter 175 and the TOP register 174 are used in detecting and indicating overrun conditions. An overrun exists when the GET and PUT settings are set equal or when GET is attempted to be set greater than TOP. In either instance an overrun status indication is to be sent until the condition can be corrected.

Figure 21B:
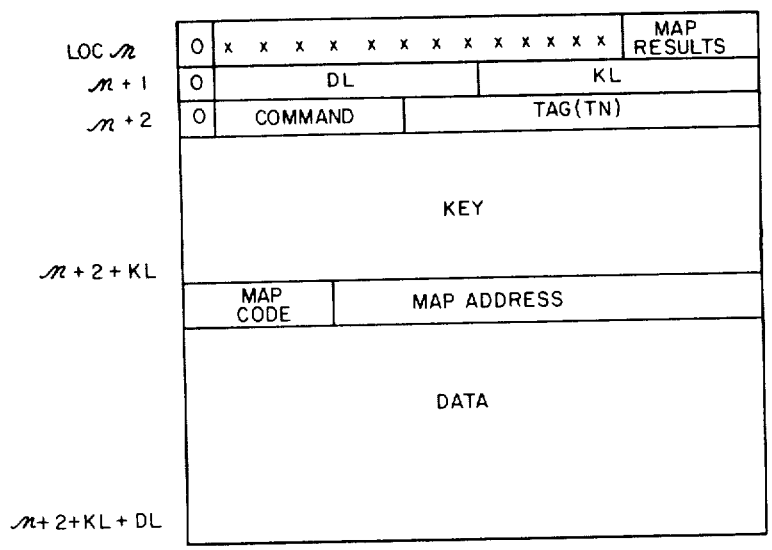

The concatenated manner in which the "receive message" circular buffer is arranged and operated is particularly useful in the present system. Hardware management of PUT and dynamic management of GET can be employed with cross-checks being available to avoid conflict. However, other buffer systems may be employed, although perhaps at some added expense in circuitry and software. The receive message format in memory 168 also, referring now to FIG. 21B, contains identifying data in the form of map results, data length and key length, derived as described hereafter.

A DSW management section 190 within the interface includes a destination selection word register 192 into which the destination selection word is entered for transfer to the address bus. In using the DSW to address the dedicated DSW section of the memory 168, the output on the data bus, from the memory, returns data from which the DSW management section 190 may also determine that the message packet is appropriate for the processor. It will be noted from FIG. 13 that the Destination Selection word comprises 2 bits of map nybl address, 10 bits of map word address, and 4 bits for map selection. The "nybl" address is used to delineate a subsection of a word from memory 168. The 4 map selection bits are applied to a map result comparator 194, which receives relevant map data from the memory 168 via a multiplexer 196. The multiplexer 196 receives 16 bits, representing 4 different map data nybls stored at the address defined by the 10 map word address bits in the DSW. The memory 168 is specifically organized in comparable fashion in the dedicated map section to facilitate this comparison. The appropriate one of the four map nybls is selected by the 2 remaining bits in the DSW, applied to control the multiplexer 196. A comparison is made, and the resulting map code is entered in the map result register 197 and inserted in the incoming message entered in the memory 168. If the comparison shows that a "one" bit is not present in any of the selected maps, a "reject" is generated to indicate that the processor module is not intended to receive the message packet.

Referring to FIG. 15, there is shown in general form an advantageous way to subdivide the memory 168 in the dedicated destination selection portion and to make the map result comparison. Each map is organized as 4096 words × 1 bit, and further subdivided (see FIG. 8) into specific processor ID, class ID and hashing sectors. Using the 12 address bits (10 address and 2 nybls) the common map address is selected and a 1 bit output is derived from each map. (The multiplexer and nybls of FIG. 13 are not shown for simplicity in FIG. 15). The four parallel bit outputs can be compared to the 4 map selection bits in a group of four AND gates 198, so that if one or more compare, the output of an OR gate 199 goes true. The map result can be entered in the map result register 197 of FIG. 13 and the message can be accepted in the memory 168. Alternatively, the message is rejected and a NAK is transmitted.

The command word management section 200 includes a command register 202 that receives the command word. The TN field of the command word has access to the address bus so that the referenced receive TN may be examined to determine the proper response message (see FIG. 18). In addition, during a Start Merge command, a data path exists from the TN field to the PTNR 206 in order that the PTN value may be changed in conjunction with a Start Merge command.

The incoming messages entered into the memory 168 also include, as discussed relative to FIG. 21, for address vector purposes, the value of the length of the data field and the key field, if these fields are used. These values are derived by a receive data length counter 210 and a receive key length counter 211, each of which counts the sequence of words in the appropriate field as the fields are presented by the input source.

A send message management section 220 is also used to encompass the functions of accepting processed packets for memory 168 and transferring them to the network at a later time. This section 220 comprises a send transaction vector counter 222, a send data length counter 224 and a send key length counter 226 coupled bidirectionally to the data bus. The send transaction vector counter 222 is coupled to the address bus, while the send data length counter 224 is coupled to an address generator 228 which is in turn coupled to the data bus. The output buffer section and the circular buffer comprising the output message complete vector section of FIG. 8 are both used in sending messages. In this instance, however, message packets are entered serially, but then fetched in a sequence defined by the vectors.

Within the interface, the separate operating phases are carried out at mutually exclusive times, and this time sharing permits the memory 168 to receive and supply network message packets at the network clock rate, operate internally at an effectively higher rate, and communicate with the microprocessor system, which operates asynchronously at its slower clock rate. To control gating of the messages to the various counters and registers, phase controls respond to control bits which generate command, DSW, data and other signals denoting the individual fields within the messages. Send state controls 250, receive state controls 260 and R/W state controls 270 receive the clock pulses, identify the fields within the data and control sequencing of data flow during the send, receive and processor clock.

Control of the interface is then effected by three finite state machines (FSMs) one each for the send, receive and processor (R/W) phases. The FSMs are implemented in a conventional manner, using programmable logic arrays (PLAs), a state register and action ROMs. Each FSM is advanced to its next state once per network clock cycle. Because of the number of control signals to be generated, the outputs of the PLAs are further encoded by action ROMs. Those skilled in the art will readily appreciate that translation of the control sequences implied by the operation of the network as described to FSM mode so as to incorporate conventional details and operations is a tedious but straight-forward task.

Figure 17:
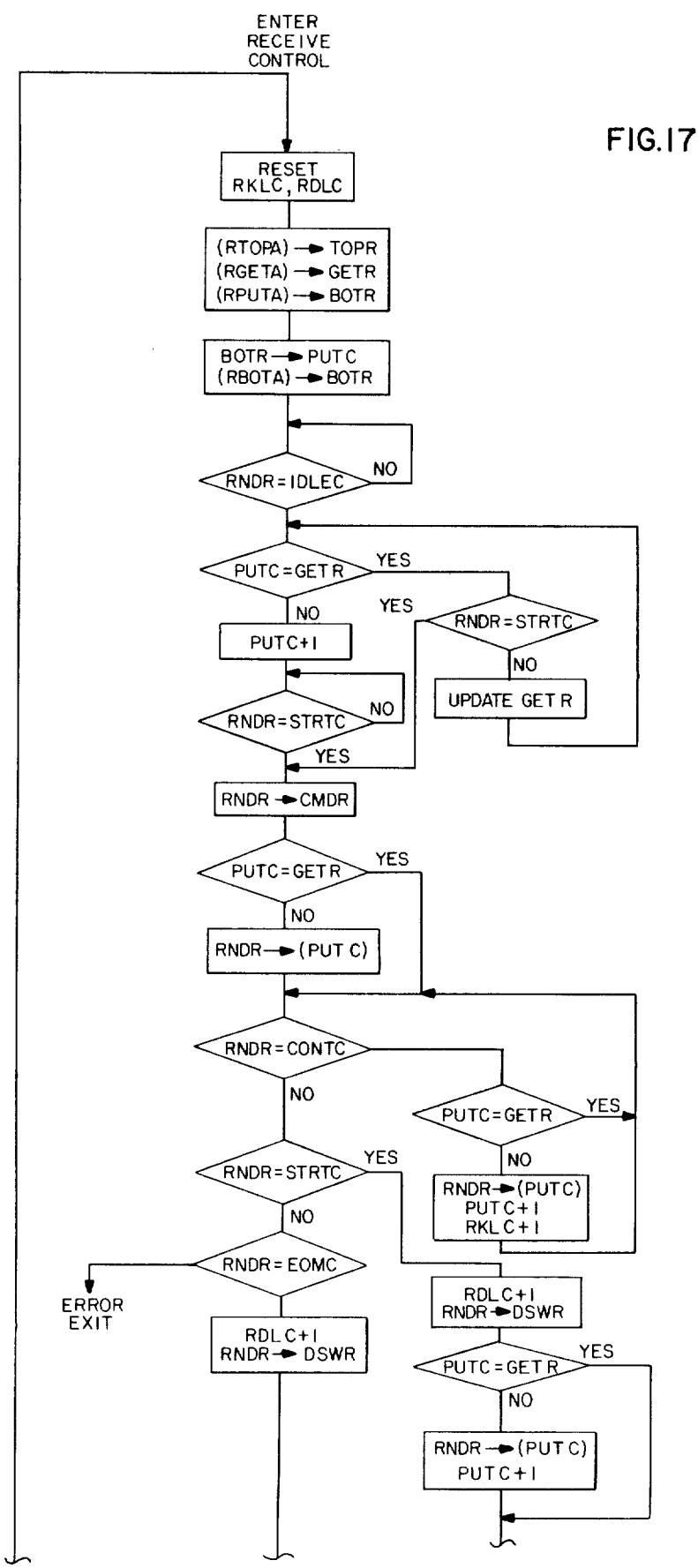
FIG. 17 is a flow diagram depicting status changes in receiving a message and comprising two sheets and designated FIG. 17 and FIG. 17A, to be abutted with FIG. 17 on the top.
Figure 19A:
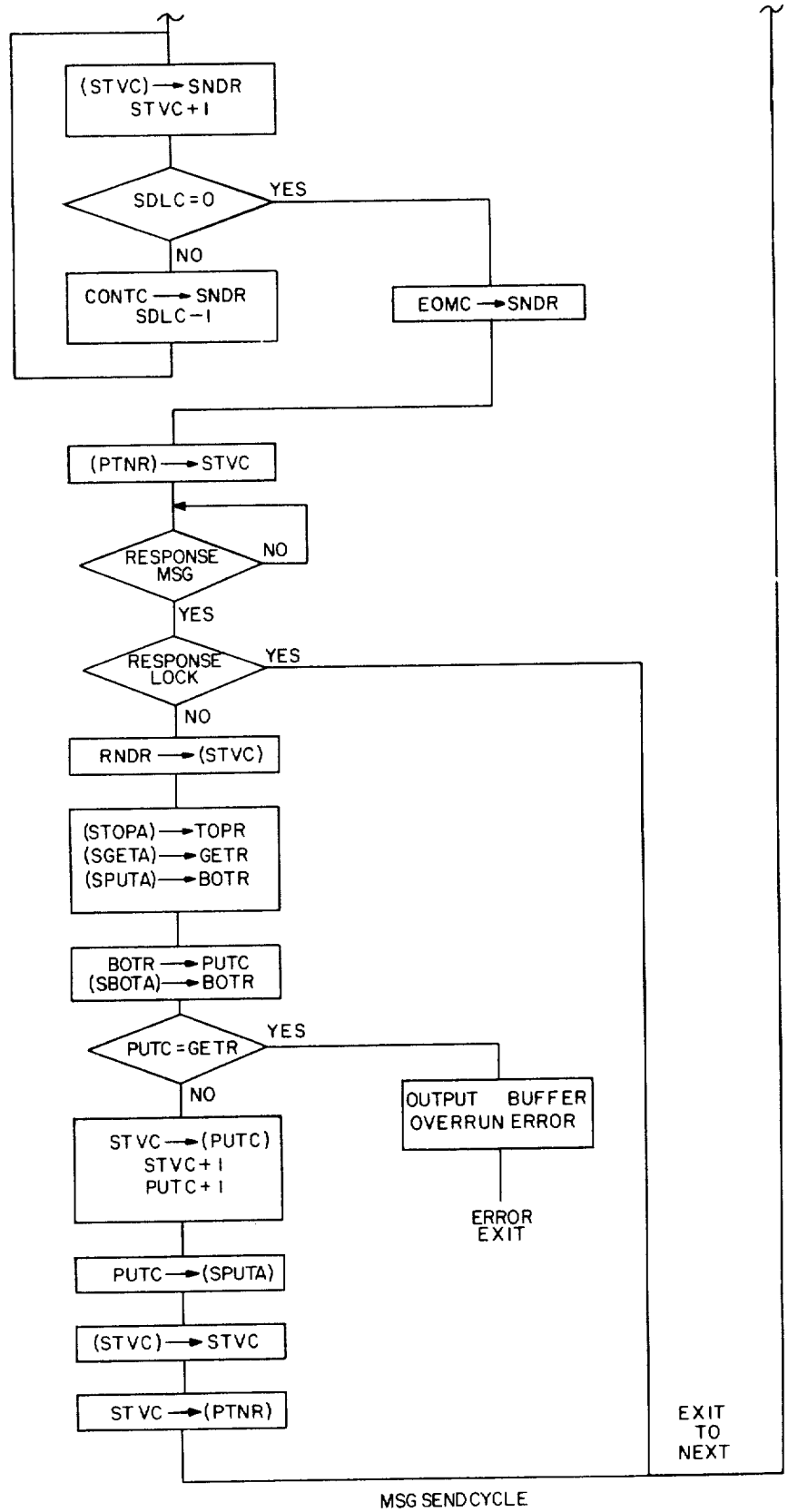
FIG. 19 is a flow diagram depicting status changes in sending a message and comprising two sheets and designated FIG. 19 and FIG. 19A, to be abutted with FIG. 19 on the top.

The state diagrams of FIGS. 17 and 19, and the matrix diagram of FIG. 18, are included to provide comprehensive detail as to internal design features that may be used within a complex system. In FIG. 17, which pertains to the receive phase, and FIG. 19, which pertains to the send phase, the designations used correspond to those employed elsewhere in the specification and drawings. For example, the following terms apply:

RKLC = Receive Key Length Counter
RDLA = Receive Data Length Counter
RNDR = Receive Network Data Word Register
PUTC = Put Counter
GETR = Get Register The state diagrams thus are essentially self explanatory, when taken in conjunction with FIG. 13 and the specification. The state diagrams detail the sequences and conditional statements involved in complex message management and inter-processor communication. In FIG. 17, the states labeled "Generate Response" and "Decode Response" and the conditional statements indicated by dashed line rectangles are in accordance with the designated responses and actions set out in the matrix diagram of FIG. 18. FIG. 18 depicts both the responses generated and the actions undertaken for any given combination of primary message and readiness state pertaining to a given TN. Obviously, normal system operation involves some message rejection but very few Error Conditions.

In both FIGS. 17 and 19, many of the conditional determinations can be made concurrently, while the state steps will be changed sequentially. In either event, the Send and Receive operations are regular progressions which do not require external control because of the organization of the messages and manner of operation of the network.

A number of features that are used in typical processor systems, or in multiprocessor systems, are not germane to the invention and are therefore not depicted. These include parity error circuits, interrupt circuits, and various means of monitoring activity, including a watchdog timer and a wide variety of test functions.

EXAMPLES OF SYSTEM OPERATION

The following are provided as examples of how the integrated system of FIGS. 1, 8 and 13 functions in different modes of operation internally while cooperating with the network and the H.S. RAMs. These examples demonstrate how interrelations between the priority scheme, the addressing techniques utilized and the transaction identities provide both local control global intercommunication.

Primary Data Message Reception and Transmission

Figure 16:
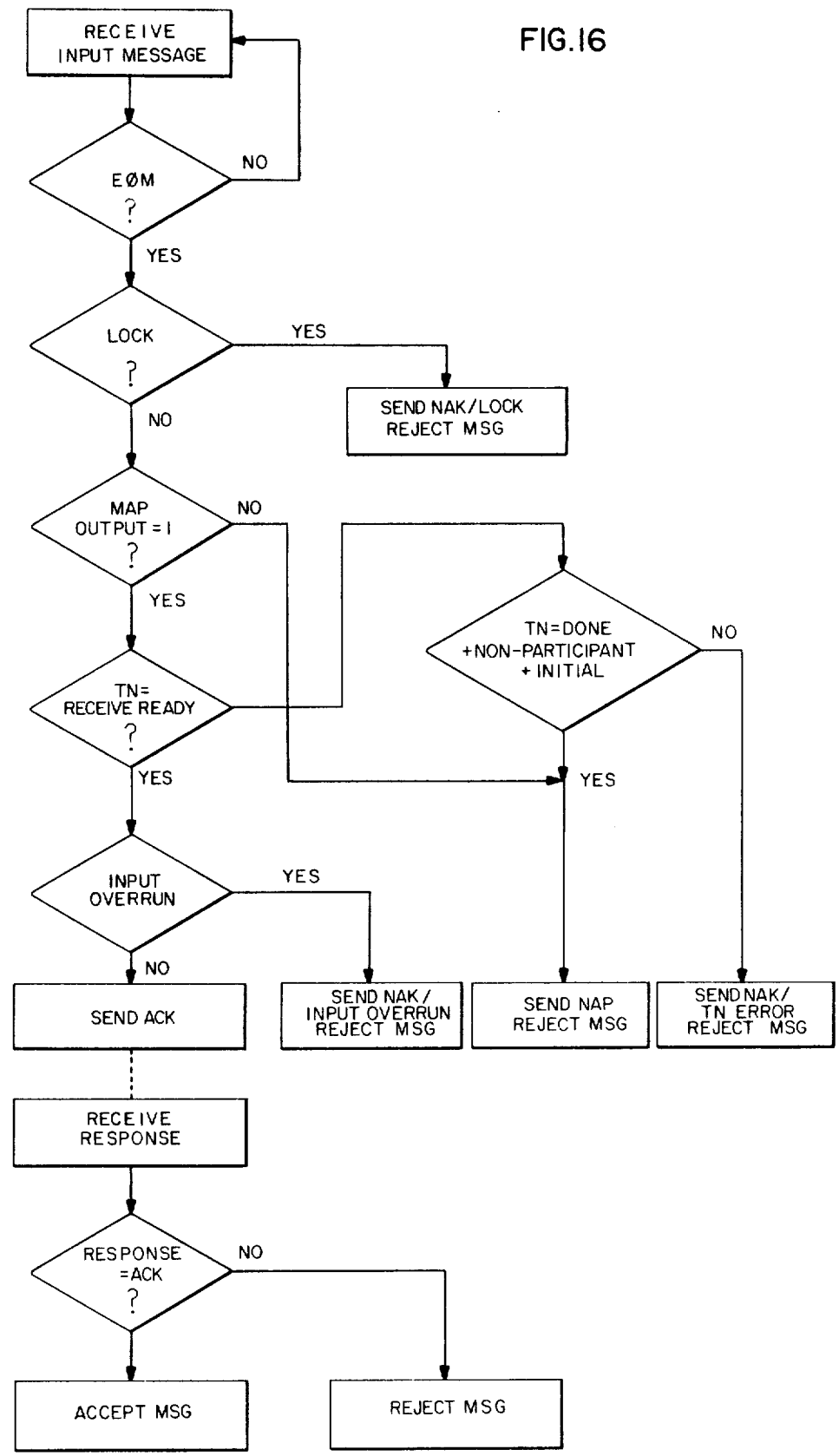
FIG. 16 is a simplified flow diagram depicting status changes on reception of an input data message.

FIG. 16, to which reference is now made in addition to the other Figures, is a simplified state diagram of the states involved in the ultimate acceptance of a primary message. Reception of the message, at buffers and in storage, does not effectuate acceptance until these logical states have been satisfied. Although depicted at a serial train of events, determinations are essentially made in parallel or concurrently because conditions are mutually exclusive or circuitry bypasses intermediate stages in arriving at a certain operating level.

A message on the network of FIG. 1 is passed through the receive network data register 146 of FIG. 13 until the EOM state is identified, at which point it is known that the message is complete. If a LOCK condition exists, the system references the response directory in the H.S. RAM 26" of FIG. 8, sending the NAK/-LOCK reject message.

Alternatively, if the LOCK condition does not exist, the system moves to the map comparison check, carried out within the DSW management section 190 in the interface as shown in FIG. 13. If a proper comparison exists, as indicated by Map Output=1, the system can continue to receive the message. If not, the message is rejected and a NAP is sent.

Having a correct Map determination, the system is then ready to check for TN status by making reference to the directory of the TN's as shown in FIG. 8, specifically to determine whether the local status is "receive ready". It is assumed that the TN was previously assigned by a prior primary message.

If this check reveals that the TN is in the done, nonparticipant or initial states, a NAP reject message is sent. If the status is some other condition that is invalid, the reject message is a NAK/TN error, both types being again taken from the response directory of FIG. 8. If the status is "receive ready" another determination can be made.

This determination is for "input overrun", and is made in the input/output management buffer section 170 of FIG. 13, by comparing the GET and PUT addresses as previously described. The transaction number is also checked for a receive message count of zero, which also indicates input overrun. If the overrun condition does exist, the NAK/input overrun is sent and the message is rejected.

When all conditions are satisfied, an ACK message is derived from the response directory in H.S. RAM 26" and transmitted on the network, in priority competition with other processor modules, some of which may also have acknowledged the message. At this point the message is accepted if the common (i.e. merged) response from the network is an ACK affirming that *all* selected receiving processor modules can accept the message. If the response is in any other form, the message is rejected by *all* processors.

In this example of reception and response, it should be noted that after a primary message has been received, all processors generate one of the ACK, NAK, or NAP responses. After receiving one of these response messages, processors may attempt to transmit a primary message. (They may also do so after a delay that is equal to or greater than the total latency delay through the network as discussed above under "Active Logic Node"). Note further that if several processors transmit *identical* messages, they may *all* win, in effect, in contention on the network. In this case, *all* of the transmitting processors receive the ACK response. This fact is of importance in the operation of the broadcast and global semaphore modes, which are described in detail in later examples.

Practical examples of the invention incorporate substantially more responses and perform a number of different actions in addition to those just described. FIG. 18 demonstrates these in the vertical columns entries for Lock, TN error, and Overrun interrupt conditions, the nine different previously identified status levels and the Acknowledgment and Not Applicable Processor responses.

When a processor module is ready to transmit a message, the PTN value stored in the PTN register 206 of FIG. 13 is available, and it need only be ascertained that the TN status is in the "send ready" condition. As seen in FIG. 12, the "send ready" entry contains the next message vector address for the output message. The assembled output message will be transmitted on the network and, if it loses in contention, it is repeated until successful, and a response is received, unless the PTN is changed in the interim. After successful transmission and acknowledgment, the address vectors are changed. The next message vector is obtained from the second word of the present message (FIG. 21A) that is transmitted from the send transaction vector counter 222 to the random access memory 168. The PUT counter 175 is advanced by one if the output message section is not in an overrun condition, which would be indicated by PUT equals GET. Finally, the next message vector from the send transaction vector counter 222 is entered into H.S. RAM at the transaction number address specified by the present transaction number register 206. Thus if the new TN is in the "send ready" state, the vector value again points to the location of the next message pertaining to the transaction identity. Refer to FIG. 21 for the format of an output message in H.S. RAM.

Message management in transmitting messages, however, can involve a number of variants, including an internal or external change in the PTN. Errors, overrun or locked conditions can cause the system to shift the transaction number to TN0, causing the system to revert to the non-merge mode and examine the status at TN0 until the "send ready" state is identified or a new TN is assigned. Refer to the flow chart of FIG. 19 for a delineation of states and conditions that may be used in a detailed example.

Output Message Complete Buffer Example

Upon completion of transmission of a message, as evidenced by any response message except LOCK, a pointer to the newly-completed output buffer is placed in the Output Message Complete Circular Buffer section of H.S. RAM (see FIG. 8). The pointer is simply a 16 bit word which gives the address of the output message buffer. (The format of an output message buffer is shown in FIG. 21. It should be noted that the output message buffer includes a place to record the response message received from the network).

The output message complete circular buffer provides communication between the network interface hardware 120 and supervisory programming on the microprocessor 105. Programs in the microprocessor place messages to be output in H.S. RAM. As described in a subsequent example in detail, output messages can be chained together, with TNs acting as head-of-chain pointers, to form complex sequences of activity. A further factor is that because the network can be multiplexed among TNs (also described in detail below), messages may be output in various orders depending on events throughout the network.

It is important, however, to quickly recover the space in H.S. RAM taken by a successfully transmitted packet so that the space can be reused for another outgoing packet. The output message complete circular buffer serves this function.

When a data message has been successfully sent and a non-Lock response received, the network interface advances the PUT pointer at 0510 (hex) in H.S. RAM (see FIG. 10) by one and stores the address of the first word of the output message just sent at the address in the PUT register. (If the PUT value becomes larger than the TOP pointer at 0512 (hex), it is first reset to be the same as the BOT pointer, which is stored at 0513 (hex)). If the PUT pointer becomes larger than the GET pointer (location 0511 (hex)), the circular buffer has overrun, and an error interrupt is generated to the microprocessor.

Asynchronously, software executing in the microprocessor examines the output message buffer pointed to by the GET pointer. After completing any processing required, the processor advances the GET pointer by 1 (if GET becomes larger than TOP, it is reset to BOT). If, GET=PUT, there are no more output messages to service. Otherwise additional output messages have been successfully sent, and must be processed. Processing includes returning H.S. RAM output buffer space to a free pool, so that it can be reused for other packets.

It is important to note that the output message complete circular buffer is distinct from the input message circular buffer, and the two circular buffers are managed by different PUT, GET, TOP, and BOT pointers. In one implementation, as shown by FIG. 13, circular buffer management hardware 170 can be shared by both circular buffers, although this is not essential.

Initializing Procedures

Each processor module has access to the TNs in its own high speed random access memory 168 (FIG. 13) comprising the directory of potentially available TNs. Those TNs which are unassigned, however, are specifically so designated by the transaction number value in the relevant location. Consequently, the microprocessor system 103 can identify the unassigned transaction numbers and select one for use in initiating communications with other processor modules pertaining to a given transaction identity.

Although TNs are locally assigned and updated under local microprocessor control, global control through the network is achieved by the primary control messages "relinquish TN" and "assign TN". No deadlock condition can arise between competing processor modules that may desire the same TN, because the network will give priority to the lower-numbered processor. Other attemping processors will receive a NACK/TN error response which indicated that they must try to reserve a different TN. There is thus complete flexibility in reserving and referencing these transaction identities within the system and locally.

It will also be noted that repeated use is made of the TN in shifting between the base transmission mode, TN0, and the merge mode, when TN is greater than 0. The system is thus able to change not only the focus of its operations but also the character of its operations by a single broadcast transmission of the TN.

A different and particularly useful technique for transmitting changes of global status is the forced parity error propagation previously discussed in conjunction with FIG. 4. This unique indication, interleaved among other transmissions, enables discontinued system resources to be surveyed and appropriate action to be undertaken.

Processor-to-Processor Communications

There are two forms of specific processor communication, one directed to an individual destination and the other directed to a class of processors. Both types of transmissions utilize the DSW, and both functions are carried out by broadcasting in the non-merge mode.

When specifically communicating between an originating processor and a single destination processor, a destination processor identification (DPID) is used in the DSW. Referring to FIG. 8, when this value is used to address the selection map portion of the H.S. RAM 26" at each receiving processor module, only that specific desired processor module provides an affirmative response and accepts the message. Transmission and ultimately successful reception of the acknowledgment enable both processors to take whatever future action is required.

When a class of processors related to a control process are to receive a message, the map nybl and map address within the DSW specify the corresponding section in the selection map portion of the H.S. RAM. All receiving processors then transmit acknowledgments, competing for access to the originating processor module until the communication interchange is finally complete.

The full broadcast mode of processor communication may be used with primary data messages, as well as status, control and response messages. The inherent capabilities of the priority protocol and prioritizing network facilitate the interjection of such messages into other message sequences.

The hashing mode of processor selection is predominantly used in data processing tasks in a relational data base system. Primary and backup disjoint data subsets are distributed in accordance with an appropriate algorithm among the different secondary storages. When two processors respond concurrently, because one is responsible for the primary and the other for the backup, subset, the primary message will be prioritized. A higher priority command code (see FIG. 12) can be chosen to insure this condition. Maintenance of the reliability and integrity of the data base is also achieved by using the various multiprocessor modes to best advantage for each condition that arises. If, for example, the secondary storage having responsibility for a primary data subset fails, it can be updated by a specific processor-to-processor communication. An error can be corrected or a part of the data base can be rolled back in similar fashion or by operating in a class mode.

Transaction Number Example

The transaction number concept provides powerful new hardware facilities for the control of a multiprocessor system. In the present system, the transaction number implements a "global semaphore", plays important roles in sending and receiving messages on the network, and in rapidly ascertaining the readiness of a given task distributed among plural processors.

The physical realization of transaction numbers (TNs) is as a set of 16 bit words in H.S. RAM 26. The words are formatted as shown in FIG. 12 to achieve a variety of functions. Because TNs are stored in H.S. RAM, they can be accessed by both the microprocessor 105 and the network interface 120.

Global Semaphore

The term "semaphore" has come into common use in computer science literature to denote a variable used for control of asynchronously executing processes. A semaphore has the property that it can be tested and set in one uninterruptible operation.

Consider, for example, a semaphore variable with two states: UNASSIGNED and ASSIGNED. The test-and-set operation is then defined as: "if the semaphore is in the UNASSIGNED state, set it to the ASSIGNED state and indicate success; otherwise if the semaphore is already in the ASSIGNED state, leave it in the ASSIGNED state, but indicate failure." The semaphore thus permits the process which successfully tested and set the semaphore to proceed with its task, where a process which fails must either wait for the semaphore to be reset to the UNASSIGNED state or try to test and set another semaphore controlling another equivalent resource. It will be readily seen that if the test-and-set operation could be interrupted, two processes could simultaneously gain access to the same resource, resulting in unpredictable erroneous results.

Every multiprocessor system implements in hardware a concept which can be equated to semaphores to control access to system resources. Prior art systems, however, can maintain only one copy of the semaphore. It is desirable to maintain plural copies of a semaphore, one in each processor, in order to reduce contention for simple test only access to semaphores, and to use multiple-valued semaphore variables for other purposes, as will be discussed below. The problem is that multiple copies of a semaphore must be manipulated in exact synchronism, or else the access-to-resources integrity which semaphores are intended to enforce will be lost.

A plural-copy, or "global" semaphore is provided by the present system. The following table contrasts the operations on global semaphores with a simple semaphore:

| Operation/Property | Simple Semaphore | Global Semaphore |
| --- | --- | --- |
| states | 2 (UNASSIGNED, ASSIGNED) | n (UNASSIGNED, ASSIGNED, ...) |
| number of semaphore "copies" | 1 | m (number of processors) |
| test | returns either ASSIGNED or UNASSIGNED. | returns highest priority (numerically lowest) state of all m copies. |
| reset | sets semaphore to UNASSIGNED, regardless of prior state. | sets all m copies of the semaphore to UNASSIGNED, regardless of prior state. |
| test-and-set | if semaphore is UNASSIGNED, set to ASSIGNED and indicate success - else if semaphore is ASSIGNED, leave it alone indicate failure. | if all m copies are UNASSIGNED, set all m copies to ASSIGNED and indicate success; else if any copy is in any state other than UNASSIGNED, leave all copies unchanged and indicate failure. |

In the present system, the ASSIGN TN and RELINQUISH TN commands provide the test-and-set and reset functions respectively on transaction numbers used as global semaphores. With reference to FIG. 12, the NAK/TN error response provides the failure indication, where the SACK/ASSIGNED response provides the success indication.

The nature of the network, including the synchronous clocking scheme employed for nodes and the broadcast of the priority packet simultaneously to all processors, is the basis for implementation of the global semaphore concept. With this concept in place, the system can allocate, deallocate, and regulate access to plural copies of any desired system resource simply by associating the resource with a TN. It is important to notice that the control of a distributed resource can be effected with nearly the same modest software overhead of a simple semaphore. This is a considerable advance on prior art systems which either cannot manage distributed resources or require complex software protocols and lead to hardware bottlenecks.

State of Readiness

The set of values BUSY, WAITING, READY (send or receive), DONE, and NON-PARTICIPANT (refer to FIG. 12) provide the capability to rapidly ascertain the state of readiness of a task associated with a TN. In the present system, the following table shows the meaning associated with each state:

| | |
| --- | --- |
| BUSY | The processor is working on the task in question, and results are not ready. |
| WAITING | The processor has completed processing, and is waiting for all other processors to complete processing for this task. |
| SEND READY | Data is available in H. S. RAM for output for this task (TN). |
| RECEIVE READY | Space and other needed resources are available in this processor to receive data for this task (TN). |
| DONE | The processor has no further data to send for this TN. |
| NON-PARTICIPANT | The processor does not have any processing for this task. |
| INITIAL | This TN has never been used since the processor started. |

A task is associated dynamically with a TN by use of the ASSIGN TN command. Success (a SACK/ASSIGNED response to the ASSIGN TN message) indicates that all active processors have successfully assigned the TN to a task. Note from FIG. 11 that since the NAK/TN ERROR response has higher priority (lower value), if *any* processor's network interface 120 detects a conflict in the use of the TN, *all* processors see the failure response. Further, the OPID (originating processor ID) field of the response on the network will indicate the first (lowest numbered) processor with a conflict—a fact of use to diagnostic routines.

By software action, each processor will process the task and will set the TN to BUSY, WAITING, SEND READY, RECEIVE READY, DONE, or NON-PARTICIPANT as appropriate. Any processor, including the processor which issued the original ASSIGN TN, can readily ascertain the state of completion of the task (TN) by issuing either a STATUS REQUEST or START MERGE command at any time.

The STATUS REQUEST corresponds to a simple test of the multiple-valued global semaphore. Notice from FIG. 11 that the highest priority status response (SACK) message will win in contention on the network, thus indicating the least state of readiness. Further, the OPID field will indicate the identity of the first (lowest numbered) processor in the least ready state.

This latter property is used to implement the "non busy" form of waiting for completion of a task distributed to plural processors. The processor which originally issued the ASSIGN TN is considered the original "wait master". That processor then designates some other processor the new "wait master" on any arbitrary basis. When the new "wait master" has itself reached the desired state of readiness, it interrogates all processors by issuing either START MERGE or STATUS REQUEST. If all other processors have become ready, the SACK will so indicate. If some processors are still not ready, the OPID field of the SACK response will indicate the first least ready processor. The "wait master" instructs that processor to become the new "wait master". Eventually, all processors will become ready, but in the meantime, the system only tries to interrogate status when it is known that at least one processor has become ready. The system is thus not burdened by periodic status interrogations, which consume resources without producing results. Further, this scheme guarantees that the system will know that all processors have completed work at the exact moment when the last processor to complete is done. Those skilled in the art will recognize that many other "waiting" schemes are feasible within the context of the invention.

The START MERGE command is a special kind of test-and-set instruction. If the status of the global semaphore is SEND READY or RECEIVE READY, the Present Transaction Number Register (PTNR) 204 (see FIG. 13) is set to the transaction number in the START MERGE message (see FIG. 3), thus setting the PTNR register. If any active processor is in a lesser state of readiness, the PTNR will not be altered.

The STOP MERGE command is the corresponding reset operation, and unconditionally resets the PTNR of all active processors to TN0.

As discussed below, messages pertaining only to the PTNR current global task are output by the network interface 120. The START MERGE and STOP MERGE commands thus provide the ability to time multiplex the network among plural tasks, which can arbitrarily be suspended and/or resumed.

An important detail of the present system is that the network interface 120 must insure that a command from the network and the microprocessor 105 cannot access a TN simultaneously. In the present implementation this is accomplished by a signal from the receive state controls 260 to the read/write state controls 270 which is asserted whenever a command from the network which could alter a TN is being processed. For this brief time, access to the H.S. RAM is denied to the processor by the controls 270. Those skilled in the art will recognize that many alternate implementations are possible within the scope of the invention.

Receive Control

Another function of the TN is control of incoming messages. A given task can be associated with an incoming message stream on plural processors by the ASSIGN TN command. When the TN for that task in a given processor is set to RECEIVE READY, the TN then additionally indicates a count of packets that processor is prepared to accept (FIG. 12). The network interface 120 decrements the count (by arithmetically subtracting 1 from the TN word) for every packet successfully received, until the count reaches zero. At that time, a NACK/OVERRUN response is generated, signaling sending processors that they must wait until the NACKing processor is ready to accept more input. Note also from FIG. 18 that in this case, the PTNR is also reset to TN0.

This mechanism leads to straightforward implementation of control of flow of packets through the network 120. It guarantees that a processor will not become congested with unprocessed packets and thus become a bottleneck to the system.

Send Control

Referring to FIG. 21, it can be seen that each message in H.S. RAM contains a field for a new TN vector value. After a message is sent and the corresponding response received successfully, the new TN vector from the message just sent is stored in H.S. RAM at the address for the Present Transaction (from the PTNR). The TN is thus updated for every message sent, and thus can automatically be set to any desired state on successful transmission of a message.

Referring to FIG. 12, the SEND READY TN format includes a 14 bit address in H.S. RAM which is used to point to the next packet to be output for the given task (TN). Thus, the TNs in H.S. RAM also serve as head pointers to FIFO queues of messages for various tasks. Within a given task (TN), each processor will thus attempt to output its packets in the serial order defined by the New TN Vector chains.

When combined with the facilities for rapidly multiplexing the network among TNs (tasks) discussed previously, it becomes apparent that complex sets of tasks distributed among many processors can be managed with minimal software overhead. The coaction of the network, interface, and processors provides facilities to allocate, deallocate, suspend, resume, and otherwise control resources and tasks copies of which are distributed among potentially hundreds or even thousands of processors.

DSW Examples

The destination selection word (FIG. 3) coacts with DSW logic 190 (FIG. 13) and the DSW section of H.S. RAM 26 (FIG. 8) to provide several modes by which the network interface 120 of each receiving processor can rapidly determine if the message being received is intended for processing by the associated microprocessor 105. As described above, the DSW in the received message both selects and is compared to a nybl in the DSW section of H.S. RAM.

Processor Address

As shown in FIG. 8, a part of the DSW section of H.S. RAM is devoted to processor address selection nybls. In the present system, each of the 1024 possible processors is associated with a bit address in this part of H.S. RAM. The bit is set to 1 at the bit address which corresponds to the processor's ID, all other bits in this section are set to 0. Each processor thus has only one bit set in this section.

Hash Maps

Another part of the DSW section of H.S. RAM is devoted to hash maps. In the present system, two of the map selection bits are devoted to hash maps, giving two complete sets of 4096 possible values. In the hashed mode, keys to records stored on secondary storages are put through a hashing algorithm which results in a "bucket" assignment between 0 and 4095. A processor which has responsibility for a given "bucket" of records has a 1 bit set in the map bit whose address corresponds to the bucket number. Other bits are set to 0. A given processor can be assigned responsibility for plural buckets simply by setting plural map bits.

In the present implementation, it is readily appreciated that map bits can be set so that for a given map selection bit, each bit address is set to 1 in only one processor, and further that every bit address is set to a 1 in *some* processor. As a direct consequence, each processor (AMP) is responsible for a distinct *disjoint* subset of the records of the data base, and further, across the entire system, a *complete* set of records exists.

Although the present example is couched in terms of the relational data base problem those skilled in the art will readily appreciate that the same technique can be applied to any problem domain where disjoint subsets of the problem can be assigned to different processors in a multiprocessor complex.

It is further worth noting that with two complete maps, the scheme described above can be arranged so that buckets assigned to a given processor in one map can be assigned to different processor(s) in the other map. If one map is considered as "primary" and the other as "backup", then as a direct consequence, records which are primary on a given processor can be guaranteed to be backed up on other processor(s). Further, the number of processors which provide backup to a given processor is completely flexible.

Those skilled in the art will recognize that the number of distinct map sets which can be realized within the scope of this invention can be greater than two, and further, that the number of buckets can be any value.

Class

In both of the previous examples, examination of a given bit address in every processor shows that that bit address is set to a 1 in only one processor; the corresponding bit address in all other processors is set to 0. However, it is possible and useful for a corresponding bit address to be set to 1 in plural processors. This is referred to as "class address" mode.

The class address is thought of as the name of a process or capability, a copy of which exists in plural processors. Any processor which has the process or capability in question has a 1 bit set in the corresponding bit address.

A message is sent to a class address by setting that class address in the DSW (FIG. 3). *All* active processors which "belong" to the class, as indicated by a bit set to 1 at the appropriate spot in H.S. RAM will respond to the packet with an ACK. Processors which do not belong to the class respond with NAP.

The DSW thus provides in hardware most of the routing calculations needed to control the flow of messages in a multiprocessor system. Further, programs can be independent of knowledge of in what processors various capabilities of the system reside. Since the maps are part of H.S. RAM, and thus can be accessed by the microprocessor 105, it is further possible to relocate a capability from one processor to another dynamically.

Merge Example

In complex multiprocessor systems, tasks may require a series of interrelated actions to be undertaken. This is particularly true in a relational data base system handling complex queries, in which reference to a number of secondary storages may be needed to assemble data into a file that can then be redistributed in a particular way to a number of processors. The following example briefly delineates how the system of FIGS. 1, 8 and 13 can readily carry out these functions, by manipulating the TNs, DSWs and global semaphores.

First, a merge coordinator, typically but not necessarily an IFP 14 or 16, identifies a class of AMPs (from AMPs 18-23) that are to merge a file, acting as data sources. An unassigned TN is selected and assigned to identify the data source function. The second principal function, of distributing or hashing the file to another set of AMPs (which may be the original processors) is referenced to a different hitherto unassigned TN.

The coordinator for the merge function uses the DSW to identify the class of processor modules that are to perform work in merging of a file related to the first TN. Each participant elevates the status of its TN to a busy or waiting status, and control of the merge operation is then passed over (assigned) to one of the participants in the merge. After reception and acknowledgement of the message packets pertaining to the merge task that has been defined, each participant (all other processor modules are nonparticipants for that transaction number) carries forward with its subtask, updating its status level as appropriate. Consequently, when the assigned merge coordinator reaches the end of its task, it can request status from all other participants as to that transaction number, and receive a response that indicates the least ready of the participants. Control of the merge can be passed to the least ready respondent, which can then poll all of the other participants at such time as its work is completed, and this process can be repeated if necessary until a response has been received that indicates that all participants are ready. The then active coordinator can then, using a DSW to identify the class of participants, initiate the transfer of messages to H.S. RAM 26, accompanied by update of the status levels to "send ready" with appropriate output message vector information. When subsequent polling reveals that all participant AMPs are in a send ready state, the coordinator issues a start merge command for the specified TN.

During merge, the processed data packets are to be directed to the class of processor modules which are then to distribute the results to secondary storage in accordance with the relational data base. Whether or not the receiving processors are the same as the now originating processors, the class of participants in the distribution is identified by a DSW and the transaction is identified by a new TN. All participants in the new transaction will have been assigned that TN and will have elevated their readiness state to "receive ready".

The DSW can be a hashing selection designation instead of a class designation, but in any event all of the participants are enabled to receive the broadcast messages during merge. Initiation of the start merge is followed by concurrent transmission of the message packets by each sending participant on the network with dynamic prioritizing taking place. When it completes its set of messages, each sending participant tries to send an identical End of File message of lower priority than the data messages. The End of File messages lose in contention with data messages, until such time as all participants send End of File, when the End of File finally carries through. The coordinator then transmits an End of Merge message, and can follow this with a Relinquish TN which completes the transaction. Overrun, error or lock conditions can be treated appropriately by reinitiating the merge or the transmission.

When a merge has been completed relating to one TN, the system can then shift to the next successive TN in the sequence. Each processor module will have queued the appropriate message packets for that TN and can again commence trying the network to carry the merge operation forward. Separate intra-processor merges accompanied by efficient use of the network merge enables the system to carry out extremely large sort/merge tasks with marked superiority to prior art systems. The time to sort a file in a system in accordance with the invention having n records and m processors can be shown to be:

$$C_1 \frac{n}{m} \log_2 \frac{n}{m} + C_2 n$$

where $C_2$ is a constant, estimated for the present implementation to be about 10 microseconds for 100 byte message; and $C_1$ is a constant estimated to be about 1 millisecond for a typical 16 bit microprocessor. The approximate sort/merge times, in seconds, for combinations of n and m under different relationships are shown in the following table, based on 100 byte records:

| M processors | FILE SIZE N RECORDS | | | | |
|---|---|---|---|---|---|
| | 1,000 | 10,000 | 100,000 | 1,000,000 | 10,000,000 |
| 1 | 10 | 130 (2 min.) | 1,700 (½ hr.) | 20,000 (5½ hr.) | 230,000 (3 days) |
| 10 | 0.7 | 10 | 300 (5 min.) | 1,700 (½ hr.) | 20,000 (5½ hr.) |
| 100 | 0.04 | 0.8 | 11 | 140 (2 min.) | 1,800 (½ hr.) |
| 1,000 | 0.011 | 0.13 | 1.7 | 20 | 230 (4 min.) |

Comparing these examples to prior art systems is not readily feasible because two interrelated sorting sequences (processor and network) are involved and because few systems even exist that have this capability. Moreover, the system sorts and merges long and variable length messages whereas most sort capabilities are rated in terms of bytes or words.

A significant further factor is that the present system is truly a multiprocessor and not dedicated to sort/merge operations. It can shift with complete flexibility between merge and non-merge operations, both locally and globally, and do so without software penalties or loss of system efficiency.

Task Request/Task Response Cycle Example

Any processor 14, 16 or 18-23 on the network 50, referring to FIG. 1, can formulate a request, in the form of a message packet, for a task to be performed by one or more other processors. In the relational data bse system, most of these tasks will originate with the host computers 10, 12 and be entered into the system via the interface processors 14, 16, but this is not a necessary condition. The message packet that is formulated is put into competition on the network 50 with packets from other processors to gain priority at a time dependent upon the priority level of other tasks and the level of activity on the processor. The task may be defined by a single message packet or continuation packets that are assigned higher priority levels within the data message groupings (see FIG. 11) so as to minimize delay in the reception of the continuation portion.

The message packet contains the transaction identity in the form of the transaction number, which inherently distinguishes, by the choice made, between the non-merge or default mode (TN0) and the merge mode (all other TNs) as to the manner in which results are to be derived. Further the message packet contains the DSW, which implicitly identifies the target processor and the mode of multiprocessor operation, whether by specific processor identification, plural processor class or hashing, in this instance to a part of the relational data base. A message packet, being broadcast through the network 50 to any target processor is locally accepted at that processor and the reception is acknowledged by a response. All processors 14, 16, and 18-23 provide a concurrent response following the EOM to the network 50, but the ACK from the target processor(s) gains priority and is received by the originating processor.

The target processor or processors then asynchronously perform the processing required by the request packet, at such time as the message is transferred through the local H.S. RAM 26 and interface 120 (FIGS. 8 and 13) into the local microprocessor. For a relational data base task, the DSW typically references a part of the disjoint data subset stored at the associated disk drive although tasks sometimes may be performed that require no reference to the data base. Any specific operation or algorithm may be executed by the individual processor, and if plural processors have been targeted, each can work on a disjoint subset of the overall task. A variable length message packet is structured such that the request can specify the operations to be performed and the files to be referenced in the data base system. It should be noted that there may be numerous message packets in conjunction with a given task, and to provide adequate sorting distinctions within the network 50, the optional key field (FIG. 3) becomes important.

The task response packet that is generated by each processor that is to respond is shifted from the microprocessor into the local H.S. RAM 26 via the control logic 28 of FIG. 1 where it is stored in the send message format of FIG. 21A. Where the task response requires continuation packets to be employed, there are transmitted after the lead packet but given the higher continuation priority. Where the system is operating in the merge mode and each processor generates a number of packets pertaining to a transaction number, the packets may first be locally chained together in a sort order for subsequent merge into a global sort order on the network 50.

The task result packet or packets are sent from the processors 14, 16 and 18-23 to the network 50 in concurrent groupings, with a single priority messge packet being broadcast back to all processors after the predetermined network delay. The transfer of these task result packets may, dependent upon the nature of the task, be targeted for the original request or to one or more other processors, and may be transferred in accordance with any one of the multiprocessor modes. The most general case in the relational data base system is a concurrent merge and redistribution using hashing for destination selection. Thus it is seen that each processor can act as an originator, coordinator or responder, or all three, in a task request/task response cycle, Because multiple task request/task response cycles are involved, the processors 14, 16 and 18-23 and the network 50 are multiplexed among the tasks, but the multiplexing is done on a priority as well as a time basis.

Complex Query Example

In the relational data base system, using the host computers 10, 12 and a distribution of the relational data base among the disk drives 38-43 in accordance with an algorithm defining the tuples and the primary and backup disjoint data subsets, complex queries are entered into the system from the host computer 10 or 12 at the IFP 14 or 16. The message packet is first parsed by the IFP 14 or 16, in order to transform the message from the host into task requests for the AMPS 18-23. At the outset, the IFP 14 or 16 may be required to initiate request packets to derive information from one or more specific AMPs to obtain the system data that is needed to parse the message from the host. Having the data needed for processing the request, the IFP 14 or 16 may then require any number of task request/test response cycles with the AMPs 18-23, and actually process the data and satisfy the request from the host. In the sequences, the task request and task response cycle enumerated above are utilized, and may be of arbitrary length. The IFP 14 or 16 then communicates with the host via the IFP interface. This response may simply provide the data needed for the host computer 10 or 12 to generate another complex query.

STAND ALONE MULTIPROCESSOR SYSTEM

Figure 20:
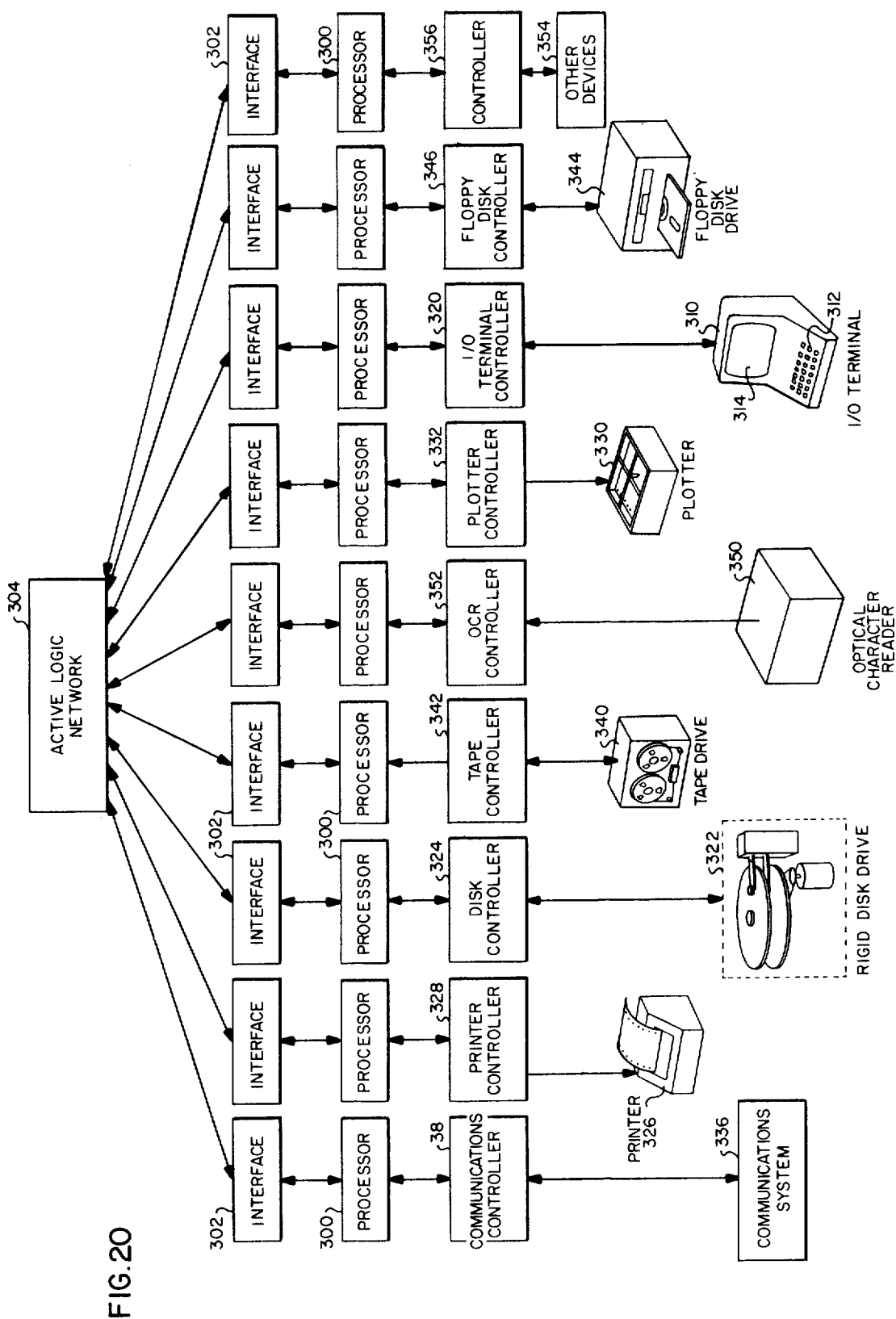
FIG. 20 is a block diagram of a stand alone system in accordance with the invention.

The primary example of a system in accordance with the invention, discussed above in conjunction with FIG. 1, exemplifies a backend processor that may be utilized in conjunction with a host computer and its existing software package. As noted above, however, the present invention is of particular advantage for a wide range of processing applications, particularly those of the type in which processing tasks may be readily subdivided and distributed without requiring massive central processing power. FIG. 20 illustrates one simplified example of a stand alone multiprocessor system in accordance with the invention. In FIG. 20, all of a number of processors 300 are coupled by interfaces 302 to an active logic network 304, such as previously described. It is understood that redundant active logic networks 304 may be utilized for data integrity. The processors 300 may again use 16 bit microprocessor chips, and incorporate adequately large main RAM memory. Only nine processors 300 are shown, each associated with a different peripheral, in order to depict the versatility of the system. In actuality the system becomes far more efficient with many more processors on the network, although particular advantages can be gained in system reliability and data integrity even with relatively few processors.

In the present example, the processors 300 may be physically separated by convenient distances, inasmuch as the maximum internode spacing of 28 feet for the stated data rates allows a large array of processors to be utilized on one building floor or on several adjacent floors without undue crowding.

In the stand alone system the peripheral controllers and peripherals themselves can vary much more widely than in the backend processor example discussed above. It is convenient to assume that each input and output device is associated with a separate processor 300. For example, an I/O terminal 310 including a keyboard 312 and display 314 is coupled to its respective processor 300 by a terminal controller 320, even though a 16 bit processor might control a substantial network of relatively slow terminals. The I/O terminal shown merely illustrates how manual keyboard and other manual entry and processing devices may be tied into the system. Using the processing power of the processor 300, the terminal 310 can comprise a word processor, and it can communicate via the network 304 with a data base, other word processors, or various output devices. Large secondary memories, such as a rigid disk drive 322 may be coupled to their respective processor by disk controllers 324, it being understood that more disk drives or a different form of mass memory could be used in a large system. Output devices, such as a printer 326 and a plotter 330 interface with their processors 300 via a printer controller 328 and plotter controller 332, respectively. Interaction with other systems, not shown, is via a communications system 336, such as a TTY or one of the larger networks (e.g. Ethernet), through a communications controller 338. Some processors 300 may be coupled to the network 304 without a peripheral device (not shown).

Bidirectional data transfers may take place using a tape drive 340 and tape drive controller 342, and a floppy disk drive 344 with its associated controller 346. Tape drives not only provide large storage capacity for on-line use, but can also be employed for disk drive backup. For this purpose tape is used to retain data that was stored, as of a fixed point in time in a sealed rigid disk system. Because these backup operations are usually performed during low load periods (e.g. nights or weekends) long "streaming" transfers can take place through the network 304. Similarly, because floppy disk drives 344 may be used for program entry during system initialization, some network time is available in these modes for transfers of substantial amounts of data. An optical character reader 350 provides another source of input data for the system through its controller 352. Finally, peripheral units, labeled simply "other devices 354" can be coupled to the system via a controller 356 to provide further capabilities as needed.

Using the technique of concurrently transmitting message packets from the various processor modules, and prioritizing these message packets into a single or common message packet that is concurrently broadcast within a predetermined fixed time interval back to all processor modules, each processor that is on line can have equal access to other modules in the system. Because the global semaphore system using prioritized transaction numbers and readiness indications, as well as destination selection entries in the messages, permits any processor to act as controller, the system can function in either a heirarchical or non-hierarchical manner. It is highly significant that the system can be expanded, or contracted, without requiring software elaboration or modification.

Where access for messages substantially longer than those previously described but still relatively limited in length is required, this can still be accomplished. For example complex computer graphics systems (not shown) may require access only to particular parts of an extensive data base to generate sophisticated two dimensional and three dimensional representations. A word processing system may need, from the data base, only small sequences of data at any one time because of the slowness of the human operator. In these and other situations the capability of the system for handling variable length messages and giving priority to continuation messages can be of benefit. While situations that call for concentrated processing power and extremely long message transfers impose limits on use of the system, there are other circumstances in which it functions to much greater advantage. Any dynamic situation involving the manipulation of different data forms and inherent sorting or merging functions falls in this category. Management decision making involving the gathering, collation and analysis of complex data is one such example, while the preparation and assembly of the visual and graphical input for a periodical is another.

CONCLUSION

It will be immediately evident to those skilled in the art that the system of FIG. 1 is expandable to incorporate any number of processors (up to a practical limit imposed by data transfer capacity) without any need for software modification. It will also be appreciated that the system circumvents in large measure the need for supervisory and overhead software to ascertain the status of units, to establish task and processor priorities and to assure efficient usage of processor capability.

Clear benefits are derived for data base systems and for other systems in which it is similarly feasible to subdivide the overall task into subtasks that can be processed independently. In the relational data base context for example a dramatic increase in secondary storage capacity requires only that the additional data base be properly integrated into the primary and backup structure. Stated in another way, the network can be indefinitely expanded because being based upon a binary progression with standardized intersections or nodes there is no change with expansion in the functions performed at each individual node. Further, no setup sequence or external control of node operation is required. Consequently if a system in accordance with the invention is coupled as shown in FIG. 1 to serve as back-end processor for one or more host computers, the system user can arbitrarily expand (or contract) the data base without changing either operating system software or applications software. From the standpoint of the host processor system the back-end processor is transparent, whatever its configuration, because its interaction with the host processor remains the same. Conversion of the back-end processor to service a different host processor system requires only that the IFPs converse properly with the new host processor channel or bus.

The network configuration in one exemplification enables up to 1024 microprocessors to be used in a single array without excessive delay in transferring messages through the network or encountering undue delays due to interprocessor competition. Those skilled in the art will readily see how to extend the example described to more than 1024 processors. For a system using 1024 processors, the maximum line length between active nodes in a practical example is found to be 28 feet, which presents no problems in configuring an array. The delay introduced by the network is constant for all messages, and is $2\tau N$, where $\tau$ is the byte clock period and N is the number of tiers in the hierarchy. As is evident, doubling of the number of processors by adding another tier imposes only a minimal increase in the delay. Because data messages will necessarily be long (of the order of 200 bytes) and because the prioritizing is done during data transfer along the network with respect to all competing messages, the network can carry data messages with much higher utilization percentages than prior art systems.

Important economic and operative aspects of the system also derive from the fact that standardized active logic circuits are used instead of software or even firmware in the network system. Using modern LSI and VLSI techniques, reliable circuitry can be incorporated at low cost in relation to overall processor and peripheral equipment costs. Expenditures of time and money for software are limited to the important aspects that pertain to data base management or other problem-domain tasks. For example, the system organization is such that all of the functions needed to maintain the integrity of a data base can be carried out within the message packets and network configurations. Such functions as polling, change of status and recovery of data are provided for within the system.

An important further consideration is that this network compares very favorably to the conventional ohmic wire bus in its capability for rapid data transfer. Message packets are transmitted concurrently for a time, and transferred while priority is being determined, so that delays for conventional status requests, responses and priority determinations are avoided. Moreover, the inter-nodal couplings can be kept to less than a predetermined length, even for an extremely large number of processors, so that propagation time through the bus is not a limitation on data transfer rate.

It has been established that the system approaches the optimum in terms of efficiency of usage of the microprocessors and the network as well. What is important is that all microprocessors be kept busy and that the network be utilized to full advantage. The IFP-network-AMP configuration effectively makes this possible because microprocessors whose transmitted message packets lose in contention for priority simply retry at the earliest feasible time, thus helping to assure a high bus duty cycle. The high speed random access memories contribute further to this result, because they accumulate both input message packets to be processed and output messages to be transmitted, and thus a backlog of work is constantly available for each microprocessor and a backlog of message packets are also available for the network. When all input buffers are filled, a processor indicates that fact on the network. Further, when the input buffers used in an IFP to receive messages from a host computer are full, an indication to that effect is placed on the channel. Both internally and externally, therefore, the system is self pacing.

The system is realized in such a way, employing both the architecture and the message organization, as to carry out numerous other functions necessary to a versatile multiprocessor system. The prior art, for example, devotes considerable attention to schemes for assessing and monitoring changes in the status of the global resource. In accordance with the present invention, however, the parity channel alone is arranged and utilized as the means for communicating both the existence of parity errors and the fact of a change in processor availability. Shut down of one or more processors is substantially immediately communicated throughout the system such that an interrupt sequence can be initiated. Using the prioritized sort of responses, the nature of the change in global capability can be identified with far less circuitry and system overhead than previously.

The single query, prioritized global response that is achieved by the use of global semaphores and the active logic network has profound systems implications. Obtaining an unambiguous global result by a broadcast query in this fashion bypasses any need for complex software and overhead. Distributed update and other status identifying operations can be realized even though numerous simultaneous operations are taking place at different processors.

The system also provides, by using the network, transaction numbers, global semaphores, and destination selection words, superior capabilities for distributing work and collecting results in a multiprocessor system. A number of multiprocessor modes and control messages are available and priority levels are easily defined and changed using only the priority protocol. The capability of simultaneously broadcasting to all processors, in conjunction with message sorting in the network, insures that any processor grouping or individual processor can be reached and that processed results can be derived in orderly fashion. Complex queries to a relational data base system can thus initiate any sequence needed for a data base operation.

Another advantage of the system lies in the redundancy which can readily be built into a multiprocessor, such as a relational data base system. Dual networks and dual interfaces provide redundancy which permits the system to continue to operate if one network fails for any reason. The distribution of the data base into disjoint primary and backup subsets reduces the probability of data loss to a minimal level. Where a failure or change does occur, the integrity of the data base can be maintained because of the versatile controls that can be used.

What is claimed is:

1. A multiprocessor system comprising:
   a plurality of processor modules, each including means for providing externally accessible semaphores evidencing readiness states of the procesor as to different transactions;
   network means coupled to the processor modules for conducting a "test and set" operation as to the readiness states of the processors relating to a given transaction simultaneously in all processors, and selecting the least ready state as an indication of global readiness.

2. The system as set forth in claim 1 above, wherein said means for providing semaphores comprises means for providing one of a range of values for each different transaction.

3. The system as set forth in claim 2 above, wherein said means for providing one of a range of values provides values of varying data content, and wherein said means for selecting the least ready state comprises means in said network means for merging the values in accordance with data content.

4. The system as set forth in claim 3 above, wherein said network means comprises a bidirectional network including means for broadcasting messages to all processor modules concurrently and means for merging messages from the processor modules within a predetermined fixed time interval.

5. The system as set forth in claim 4 above, wherein said plurality of processor modules include means for applying messages to the network means concurrently, the messages including primary data messages, semaphore queries and semaphore responses.

6. The system as set forth in claim 5 above, wherein the messages further include control messages and responses to primary data messages, and wherein all messages have data contents varying in accordance with a predetermined priority protocol.

7. The system as set forth in claim 6 above, wherein all messages have an initial command field having varying data content in accordance with the sorting priority for the message type.

8. The system as set forth in claim 7 above, wherein primary data messages, status and control messages include transaction numbers of varying data content, and said plurality of processor modules each include buffer means for storing and locally updating semaphores in externally accessible form in accordance with each transaction number.

9. The system as set forth in claim 8 above, wherein the transaction numbers comprise addresses for semaphore locations in the buffer means such that the buffer means may be addressed directly by transaction number to derive the semaphore value.

10. The system as set forth in claim 7 above, wherein the messages include destination selection information, and said plurality of processor modules include means for determining whether the processor module is to utilize the message, based upon the destination selection information.

11. The system as set forth in claim 10 above, wherein the destination selection information is a destination selection word of fixed length.

12. The system as set forth in claim 11 above, wherein said plurality of processor modules comprise memory means having a dedicated section and means for comparing the destination selection word to the contents of the dedicated memory section to determine if the message is appropriate for the processor module.

13. The system as set forth in claim 12 above, wherein the dedicated memory section comprises buffer means having destination selection data identifying the message as appropriate for the processor module specifically, or as one of a class of processor modules, or in accordance with a hashing function.

14. The system as set forth in claim 13 above, wherein the dedicated memory section comprises buffer means having portions corresponding to individual processor selection, class of processor selection, and hashing function selection, and the means for comparing comprises means for addressing the dedicated memory section in accordance with the destination selection word, and comparing the output of the addressed portion of the dedicated memory section to at least a portion of the destination selection word.

15. The system as set forth in claim 14 above, wherein the destination selection word comprises a map address, and a map selection code and wherein the dedicated memory section comprises a number of portions each addressed in parallel by the map address of the destination selection word, and the means for comparing comprises means responsive to the map selection code for selecting one of the outputs from the dedicated memory section, and means for comparing that output to the corresponding map code.

16. The system as set forth in claim 7 above, wherin primary data messages are of variable length, and include a code identifying end of message.

17. The system as set forth in claim 7 above, wherein primary data messages, status, control and response messages include tag following the command field, the tag having varying data content and being of fixed length and comprising an originating processor identification for responses.

18. The system as set forth in claim 17 above, wherein the combination of command field and tag characterize the message as a status query, an assigned transaction number control message, a relinquish transaction control message or a start or stop processor module merge control message.

19. The system as set forth in claim 18 above, wherein a predetermined one of the tags identifies the nonmerge state to the processor modules.

20. The system as set forth in claim 19 above, wherein the messages further comprise a fixed length destination selection word of varying data content and means at each processor module for identifying, from the destination selection word, whether a message is intended for the particular processor module.

21. The system as set forth in claim 20 above, wherein said plurality of processor modules each include means storing a number of reference values and responsive to the destination selection word for determining, from the destination selection word, whether the processor module is being addressed individually, is one of a class of addressed processor modules, or is being addressed in accordance with a hashing function.

22. The system as set forth in claim 21 above, wherein said plurality of processor modules each generate messages containing destination selection words and tags in the form of transaction numbers, such that any of the processor modules, using variations of the command field, transaction number and destination selection word can coordinate via the network means with all the other processor modules.

23. The system as set forth in claim 22 above, wherein the combination of command field, transaction number and destination selection word define a plurality of multiprocessor intercommunications, including task assignments, distributed updates, and coordinated merging of processed subtasks.

24. The system as set forth in claim 23 above, wherein said plurality of processor modules include means for varying the transaction numbers in the commands, means responsive to a specific transaction number and a non-merge command and means providing start merge commands, such that global merges and broadcast modes can be intermingled as to different tasks, to enable global coordination of system resources.

25. The system as set forth in claim 24 above, wherein the primary data messages further comprise key fields of varying data content as further merge criteria.

26. The system as set forth in claim 25 above, wherein the messages comprise serial byte sequences, and the bytes include control bits whose serial patterns define fields, transitions between fields and the end of message.

27. The system as set forth in claim 7 above, wherein the messages further comprise a fixed length transaction number for primary data messages, status and control messages, and an originating processor identification for responses, and are arranged in serial byte sequences, with the bytes including control bits whose sequence identifies different fields within the messages, such that the network merges messages including responses using the transaction number and originating processor identification where other criteria do not permit a merge determination.

28. The system as set forth in claim 27 above, wherein primary data messages further comprise destination selection words having a map address portion and a map code selection portion, and an end of message section characterized by a selected pattern of control bits.

29. The system as set forth in claim 28 above, wherein the command field data contents are arranged in accordance with a selected priority protocol covering all message types.

30. The system as set forth in claim 7 above, wherein each processor module includes message and semaphore buffer means, including means for accessing both to the network means and the processor module.

31. The system as set forth in claim 30 above, wherein said message and semaphore buffer means comprises means for storing a plurality of semaphore status indications in accordance with transaction numbers, and the processor module includes means coupled to the buffer means for locally updating the semaphore status in relation to transaction numbers, and the buffer means further comprises means for reading out semaphore status in response to a global transaction number status query without reference to the then current operation of the processor module.

32. The system as set forth in claim 31 above, wherein said message and semaphore buffer means further comprises table lookup means providing different processor references, and wherein the messages include destination selection information, and the buffer means includes means for addressing the table lookup means directly in response to the destination selection information for determining whether the processor module is selected for operation with respect to the message.

33. The system as set forth in claim 32 above, wherein said message and semaphore buffer means comprises a circular input buffer section for receiving messages from the network means and providing messages to the processor module on a first in, first out basis.

34. The system as set forth in claim 33 above, wherein the buffer means comprises an output buffer section for receiving messages from the processor module and providing them to the network means, and a circular output message complete vector buffer section for storing information as to the locations from the procesor module in which output messages are sent, and means coupled to said buffer means for sequencing output messages.

35. The system as set forth in claim 34 above, wherein the messages further include fixed length transaction number and destination selection words, and wherein the buffer means comprises dedicated transaction number and destination selection word portions, and means for addressing the dedicated memory portions directly using at least portions of the transaction number and destination selection word.

36. The system as set forth in claim 7 above, wherein the system includes means for transmitting, between messages, lowest priority idle signals.

37. The system as set forth in claim 36 above, wherein said plurality of processor modules include means responsive to the idle signals and the last prior transmission for initiating subsequent transmissions after a delay greater than the time of transmission through the network.

38. The system as set forth in claim 36 above, wherein the bidirectional network comprises a plurality of active circuit nodes, each including means for controlling transfer of messages therethrough, and means for resetting the node following the end of a message transmission.

39. The system as set forth in claim 38 above, wherein the nodes further include means for indicating collisions between competing messages and means for transferring the collision indications along the network.

40. The system as set forth in claim 7 above, wherein the messages comprise serial bytes of data including parity bits, the processor modules include means for forcing a parity error upon a change in status, and the network means comprises a plurality of nodes each including means for propagating the forced parity error once through the network to note a change in status of global resources of the system.

41. The method of intercommunication between processors in a multiprocessor system comprising the steps of:
   maintaining locally updated semaphores as to readiness states at each processor;
   globally testing the local semaphores simultaneously to provide competing responses; and
   selecting the state evidencing least readiness as the global state from the competing responses.

42. The method as set forth in claim 41 above, wherein the state evidencing least readiness is selected by dynamically prioritizing the competing responses within a predetermined fixed time interval.

43. The method as set forth in claim 42 above, wherein the competing responses have different data contents in accordance with readiness state and the responses are prioritized by successive multiple pair comparisons for data content.

44. The method as set forth in claim 43 above, including in addition the steps of maintaining locally updated semaphores as to a plurality of differently identified transactions at each processor, and testing the local semaphores for a specific identified transaction by a distributed global status communication.

45. The method as set forth in claim 44 above, wherein the readiness states include a non-participating state, such that different processor subsets can participate in a given transaction and responses from other processors are excluded as being of lower priority.

46. The method as set forth in claim 45 above, including the step of directing different modes of multiprocessor operation by distributing a global command pertaining to an identified transaction.

47. The method as set forth in claim 46 above, wherein the global commands identify suspension and resumption of operations as to a particular identified transaction.

48. The method as set forth in claim 46 above, wherein a specific value of transaction identification represents the non-merge mode of operation.

49. The method as set forth in claim 46 above, including the steps of time sharing of the multiprocessor system between tasks by identifying tasks to be shared by different transaction numbers, determining the global state of readiness of the system as to a given transaction number, and proceeding to a different appropriate transaction number if the global readiness state is not yet complete as to the prior transaction number.

50. The method as set forth in claim 49 above, wherein the multiprocessor system is a data base management system and the method further includes the steps of maintaining the transaction number reference throughout processing of a given task.

51. The method as set forth in claim 50 above, wherein the data base management system includes data distributed in disjoint subsets upon which the processors operate asynchronously, and the method includes the step of maintaining primary and backup subsets in different mutually exclusive distributions.

52. The method as set forth in claim 41 above, including in addition the step of distributing concurrently to the processors, with the global testing, a selection value controlling the category of processor response.

53. The method as set forth in claim 52 above, wherein the distributed selection values identify a broadcast mode, a processor communication, or a specific class of recipient processors, and wherein the method further includes the step of comparing distributed selection values to stored reference values at each processor.

54. The method as set forth in claim 53 above, wherein the system has data distributed in accordance with hash maps and the method comprises the further step of using the selection value as a hashing value in identification or recipient processor in accordance with the data distributed thereto.

55. The method as set forth in claim 41 above, wherein the local semaphores have different data contents, and the step of selecting the state evidencing least readiness comprises dynamically prioritizing the competing responses in accordance with data content within a predetermined fixed time interval.

56. The method as set forth in claim 55 above, further comprising the step of maintaining locally updated semaphore status for each of a number of transactions at each processor, and broadcasting a status query as to a given transaction concurrently to all processors for deriving concurrent responses.

57. The method as set forth in claim 56 above, further including the step of prioritizing the responses within a fixed number of time frames by making binary pair comparisons.

58. The method as set forth in claim 57 above, further comprising the steps of repeatedly attempting transmissions from processors having available messages and prioritizing the competing transmissions to derive a single or common priority transmission, wherein the messages include a pair of reference entries for at least data messages and comprising transaction identity and destination selection entries, and the further steps of using the transaction identity to define the task and the destination selection entry to define the processor subset for accomplishing the task, such that all processors have equal access to each other and any can be the coordinator for a system task.

59. The method as set forth in claim 58 above, further including the steps of accepting or rejecting message transmissions at local processors based upon the transaction identity entry and the destination selection entry to control the multiprocessor mode of operation.

60. The method as set forth in claim 59 above, further including the step of providing a directory of transaction readiness states at each processor, entering the transaction readiness states in an accessible file to denote the readiness states as to given transaction identities, and globally querying the local readiness states simultaneously without modification of the readiness states.

61. The method as set forth in claim 60 above, wherein each processor includes a library of potential transaction identities, and the method further comprises the steps of assigning transaction identities to tasks, identifying processors to perform the task by destination selection entries, performing the task by reference to the transaction identity, and commanding the relinquishment of the transaction identity when the task is completed.

62. The method as set forth in claim 61 above, further including the step of coordinating message flows between processors by temporary storage of both accepted received messages and prepared send messages before transmission for prioritizing.

63. The method as set forth in claim 62 above, further including the steps of storing accepted received messages and transferring them in successive sequence to the associated processor, and receiving processed send messages from the processor and transmitting them in sequence.

64. A computing system for ascertaining the global status of a task being undertaken by individual processors performing subtasks related thereto, comprising:
  locally controllable storage means at each of the processors for providing an externally accessible indication of readiness state as to the particular subtask; and
  global test means intercoupling the processors and including means for broadcasting a status query to all the storage means concurrently and deriving, in a predetermined fixed time interval, the least ready status of the processors undertaking subtasks pertaining to the given task.

65. The system as set forth in claim 64 above, wherein the processors include means for storing the indication of readiness states as different ones of a group of digital values of different data content, and wherein the global test means comprises means for reading the digital values stored at the local storage means concurrently and merging the competing digital values in accordance with data content to derive the least ready state.

66. The system as set forth in claim 65 above, wherein the storage means at each processor includes interface means responsive to the processor associated therewith for locally updating the digital values in accordance with processor readiness for each of a plurality of transactions identified by transaction numbers and the global test means further includes network means for transmitting status queries characterized by command and transaction number data, the network means including means for prioritizing the queries in accordance with their data content.

67. An intercommunicating multiprocessor system whose global state of readiness as to any of a number of transactions can be ascertained within a predetermined fixed time interval comprising:
  a plurality of processors, each including means for maintaining and updating local test and set semaphores pertaining to the different transactions;
  network means coupled to each of the processors for providing transaction queries simultaneously to all processors and dynamically sorting concurrent responses within a fixed time interval; and
  global test and set means coupling each of the processors to the network means for providing semaphore response transmissions concurrently to the network means.

68. The system as set forth in claim 67 above, wherein the semaphores have varying data contents dependent upon the local state of readiness, and the network means includes means for sorting in accordance with data content.

69. The system as set forth in claim 68 above, wherein the means for maintaining semaphores comprises random access storage means, and interface means coupling the storage means to the associated processor therewith and the network means, and wherein the semaphores are digital entries selected from a sorting sequence and stored at locations addressed by the transaction queries.

70. A computing system comprising:
  a plurality of processor modules, each including means for locally establishing a semaphore as a digital value pertaining to different ones of a number of given transactions identified by different transaction numbers;
  network means coupled to the processors for broadcasting concurrent messages to the processors, the messages including queries and commands identified by transaction numbers, the network means including means responsive to the concurrent messages for prioritizing the messages; and
  a plurality of interface means coupled to the network means and associated with each processor module for providing digital semaphore values to the network means in response to a broadcast query, for prioritizing of such values to derive a single value.

71. The system as set forth in claim 70 above, wherein the means for locally establishing a semaphore includes means for providing a locally revisable, externally accessible semaphore for each of the different transaction numbers, and the interface means are responsive to the commands and include means for controlling the sequence of communications to the network means.

72. The system as set forth in claim 71 above, wherein the means for establishing semaphores comprises memory means for storing messages from and to the network means, and the interface means are responsive to the transaction numbers and commands for transmitting messages to the network means for prioritizing in merge and non-merge modes relative to particular transaction numbers.

73. The system as set forth in claim 71 above, wherein said means for providing semaphore states comprises storage means including a plurality of dedicated transaction number addresses, means for entering digital values representing semaphore values at the different addresses, and wherein the means for deriving semaphores comprises means for reading the storage means in response to transaction number addresses concurrently.

74. The system as set forth in claim 73 above, wherein the system further includes means for generating messages including present transaction numbers, and the means for reading the storage means are independent of the processors associated therewith, such that software and processor availability are not involved in the response.

75. A computing system having a plurality of processors and being capable of distributed asynchronous processing of multiple tasks and coordinated usage of task results, comprising:
- a plurality of processors operating asynchronously but generating synchronous competing message transmissions, the messages including reference values of varying data content;
- network means coupled to the processors and responsive to the data content of the competing messages for transferring a priority message to all processors;
- a plurality of storage means, each associated with a different processor, for storing data relating to the reference values; and
- a plurality of controller means coupled to the different storage means and responsive to the reference values and data relating thereto for controlling processor intercommunication via the network means.

76. The system as set forth in claim 75 above, wherein the reference values comprise transaction numbers and the storage means comprises a library of transaction number locations for storing digital values representing processor readiness as to tasks identified by particular transaction numbers.

77. The system as set forth in claim 76 above, including in addition means responsive to processor operation at each controller means for entering processor readiness values at each transaction number location, and means for accessing the readiness values via the network means.

78. The system as set forth in claim 77 above, wherein the readiness values have data contents varying in accordance with a predetermined priority protocol such that concurrent readiness values from a number of controller means are sorted to a priority status on the network means.

79. The system as set forth in claim 78 above, wherein a plurality of transaction numbers identify merge modes of operation and a single predetermined transaction number identifies a non-merge mode of operation.

80. The system as set forth in claim 75 above, wherein the storage means each include a dedicated memory section addressable by the reference values for generating related data.

81. The system as set froth in claim 76 above, wherein the reference values comprise destination selection words and the dedicated memory section comprises a file of destination section data.

82. The system as set forth in claim 81 above, wherein the controller means further comprises means responsive to the destination selection words for addressing the dedicated memory section, and means responsive to the related data derived from the memory section for comparing the values to determine whether the message is intended for the particular processor.

83. The system as set forth in claim 82 above, wherein the dedicated memory section comprises a portion for identifying an individual processor, a portion for identifying the processor as one of a process class, and a portion containing hash values.

84. The system as set forth in claim 83 above, wherein the dedicated memory section is arranged as at least two groups of commonly addressed storage maps providing corresponding independent outputs, and gate means responsive to at least a portion of the destination selection word and the outputs for detecting the existence of a match.

85. The system as set forth in claim 84 above, wherein the system includes a secondary storage having a subset of a data base associated with each processor and the hash values identify the portion of the data base associated with the processor.

86. The system as set froth in claim 80 above, wherein the reference values comprise a transaction number and a destination selection word, each having a selectable data content and providing a sort criteria for the network means, and the dedicated memory section comprises a transaction number section and a destination selection word section.

87. A system for intercommunication between a plurality of processor modules comprising:
- means at each processor module providing serial messages comprising initial command bytes varying in data content to characterize the message as comprising data, status, control or response messages, and further to characterize messages within the different types, the command bytes being followed by subsequent message bytes;
- means at each processor for transmitting messages in synchronism following the termination of prior messages; and
- means intercoupling each processor to all other processors and including means for merging the serial messages in accordance with the data content therein during transmission to all the processors, wherein the data contents of the command bytes followed by the remaining message information successively determine message priority, and data, status, control and response messages are transferred between processor modules in accordance with a priority protocol without prefatory communications between processors.

88. The system as set forth in claim 87 above, wherein said further message bytes comprise alternatively transaction numbers and originating processor identification, and wherein said means at each processor for transmitting messages includes means for transmitting responses to primary messages in synchronism, the responses having higher priority than primary messages and being merged with a priority dependent first on response type and then originating processor identification.

89. The system as set forth in claim 88 above, wherein said transaction numbers are originating processor identification are fixed byte length words following immediately after the command bytes and varying in data content to act in determining priority.

90. The system as set forth in claim 89 above, wherein said primary message information further includes a fixed byte length destination selection word of varying data content following the transaction number.

91. The system as set forth in claim 90 above, wherein said means intercoupling each processor comprises a network of node means arranged in successive tiers and includes means for advancing the serial messages in successive time frames between tiers and means for determining priority between competing pairs of messages at each node means, and wherein the means intercoupling each processor further includes clock means coupled thereto for advancing the serial messages in synchronism.

92. A multiprocessor system for performing multiple data processing tasks in different individual processors within the system without the need for substantial software to determine routing, availability and priority status, comprising:
- means providing message packets including priority determining commands and data;

spatially distributed network means coupled to receive the message packets and including a plurality of bidirectional active circuit means merging at a return circuit means, each of the active circuit means being responsive to the message packets to continue transfer of competing message packets having priority whereby multiple messages concurrently on the network are prioritized in the time and space domains and the single priority message packet is distributed concurrently on the network; and a plurality of processor modules, each comprising a processor operating at a different rate than the network means and interface means including a random access memory means, the interface means being coupled to both the network means and the processor means and including means responsive to the message packets for responding only to those message packets appropriate for the individual processor, the interface means including means for storing receive and send messages to and from the processor, and dedicated memory sections for retaining task identifying and destination selection information separately accessible to the network means, whereby tasks may be automatically accepted for the appropriate processors without requiring interprocessor communications or central determinations of priority and routing.

93. The system as set forth in claim 92 wherein the interface means includes clocking means operating at a higher rate than the network means and processor means and control means responsive to the clock means for time multiplexing operation of the random access memory means between processor, send and receive phases.

94. The system as set forth in claim 93 above, wherein the processors operate asynchronously and the clock means is synchronized with the network means.

95. The system as set forth in claim 92 wherein the interface means further comprise means, including the random access memory means, responsive to the associated processor for storing status data in the random access memory means as to different tasks in a form accessible to the network means.

96. The system as set forth in claim 95 above, wherein the random access memory means comprises a reference directory of status indication response texts and the processor module includes means for controlling status indication response texts stored in the random access memory means.

97. The system as set forth in claim 96 above, wherein the message packets include transaction numbers and the interface means includes means for directly addressing the random access memory means to derive status indications without communication with the processor.

98. The system as set forth in claim 97 above, wherein the status data includes message count data for use in controlling the flow of message packets.

99. The system as set forth in claim 92 above, wherein the random access memory means includes message buffer means for assembling pluralities of receive and send message packets for communication between the network means and the associated processor.

100. The system as set forth in claim 99 above, wherein the interface means includes means for determining from the immediate contents of the receive and send buffer sections whether the processor module capacity for receive or send is exceeded, and indicating the nonavailability of the associated processor in response thereto.

101. The system as set forth in claim 100 above, wherein the means for indicating the nonavailability of a processor comprises means providing a circular buffer receive section in the random access memory means, and means for detecting an overrun condition therein.

102. The system as set forth in claim 100 above, wherein the message buffer means for assembling send message packets comprises a send buffer storage for message packets, and a send output message complete vector circular buffer for providing pointers to output message locations.

103. The system as set forth in claim 92 above, wherein the message packets include destination control information, and the interface means include means responsive to the destination control information, for (1) providing a response from a specific identified processor module, (2) providing responses from a specific identified group of processor modules, or (3) providing responses from all processor modules.

104. The system as set forth in claim 92 above, wherein the message packets comprise serial byte sequences including an initial command word, and including at least one control bit per byte, the control bit sequences defining internal fields, field translations within the message packets, and end of message.

105. The system as set forth in claim 104 above, wherein the network means includes means for granting priority in accordance with lowest data content and the processor modules include means providing an uninterrupted sequence of 1's in at least the control bit to represent the idle state.

106. The system as set forth in claim 92 above, wherein the message packet bytes further include parity bit, the processor modules comprise means for forcing parity errors on change of status, and the network means comprises means for propagating the forced parity error once.

107. A system for controlling routing of messages between processors in a multiprocessor system comprising:

means at each processor for providing a serial message train including destination selection data comprising alternatively specific processor identification, identification of a process class, and hashing values;

lookup table means at each processor including at least three separate sections defining different destination selection criteria comprising a specific processor identification section, a processor class section and a hash value section;

means coupled to each of the processors for delivering to all processors, from a number of messages concurrently transmitted by the processors, a single priority message; and means at each processor responsive to the destination selection data in the single priority message for addressing the lookup table means directly with the destination selection data to determine whether the particular processor is being addressed, such that the processor may be selected in accordance with one of a variety of multiprocessor modes, including a general broadcasting mode in the absence of a destination selection data entry.

108. The system as set forth in claim 107 above, wherein said means for delivering a single priority message comprises an active logic network and the lookup table means comprises a high speed random access memory and means for accessing the memory separately from the associated processor and the active logic network.

109. The system as set forth in claim 108 above, wherein the means for addressing the lookup table means comprises means for comparing the value at the addressed location to at least a portion of the destination selection data.

110. In a system having a number of processors communicating via an interconnect network, the combination comprising:
- a number of buffer means, each associated with a different one of the processors and coupled to the network and the processor associated therewith, each buffer means including a dedicated memory reference section having at least two different selection maps representing different modes of selection;
- the processors generating messages having selection data for referencing the selection maps; and
- a number of interface means, each connected to a different processor and the buffer means coupled thereto, and coupled to the network, and each responsive to the selection data for referencing the selection maps in the buffer means to determine whether the selection data specify that the message is intended for the processor associated therewith, and coupled to control reception of messages intended for the processor associated therewith.

111. The system as set forth in claim 110 above, wherein the interconnect network includes means for providing the messages concurrently to the processors, and wherein each buffer means includes at least three reference sections, one organized to denote individual processors, a second to denote processors by class codes, and a third providing a hash map for distributed data.

112. The system as set forth in claim 111 above, wherein the interface means further includes means responsive to the selection data and the reference values for incorporating hash results in the message, and the buffer means includes a receive message section coupled to store the messages intended for the associated processor.

113. The system as set forth in claim 112 above, wherein at least the hash map section of the buffer means is divided into a number of parts each identified by a different map selection code and commonly addressed by a map address, and wherein the messages comprise destination selection words containing map selection code and map address portions.

114. The system as set forth in claim 113 above, wherein the interface means each comprise means for addressing the buffer means with the map address, and the interface means further comprise comparator means responsive to the map address and map selection code portions, and the contents of the buffer means addressed thereby, for determining whether the message is intended for the associated processor.

115. A system for effecting data transfer between a network and a processor providing transaction numbers comprising the combination of:
- a network providing message streams associated with transaction numbers identifying a particular processing transaction or transaction type;
- interface means, including high speed random access memory means, coupled to the processor and the network and including:
  - a memory section storing data in externally accessible form in accordance with transaction number addresses,
  - a memory section storing a directory of transaction readiness words, and
  - a section storing messages for transfer between the processor and the network;
- and the processor being coupled to reference the directory to store updated entries in the transaction number addresses, such that the network can determine the state of readiness as to a particular transaction solely from the random access memory means.

116. The system as set forth in claim 115 above, wherein the random access memory means further includes a section for storing send messages from the processor, and a section for storing pointers to the locations from which send messages are transferred to the network, and wherein the processor controls the entry of messages in the memory means.

117. The system as set forth in claim 116 above, wherein the processor also provides destination selection words and the memory means includes a stored table of destination selection data, and the interface means includes means for addressing the selection data using the selection words to determine if a message is intended for the processor.

118. A bidirectional branching node circuit for a message switching system in which competing concurrent messages are received, comprising:
- a bidirectional upstream port circuit and two bidirectional downstream port circuits each including parallel data lines and collision lines;
- logic means coupled to the downstream port circuits for transferring a single one of two competing upstream messages received at the downstream ports to the upstream port by granting priority in accordance with a predetermined priority rule determined by message content;
- means coupling the upstream and downstream port circuits and responsive to messages received at the upstream port for providing downstream transmission of such messages to both downstream ports; and
- control means coupled to the logic means, the upstream port circuit and the downstream port circuits and responsive to the grant of priority between upstream messages for generating signals on the losing collision line to indicate that priority has been granted a message other than the message received at the port, and for transferring a signal received at the upstream port on the collision line thereat.

119. The system as set forth in claim 118 above, wherein the port circuits each include clock lines to and from the port circuit, and the node circuit further includes clock timing means coupled to the clock lines.

120. The system as set forth in claim 119, wherein said control means further comprises means responsive to the termination of a message for resetting the control means.

121. The system as set forth in claim 120 above, wherein the node circuit comprises, at each port, a plurality of upstream and downstream data lines, and at least one parity line and wherein the collision line from the upstream port is coupled to reset the control means on the termination of the collision signal from the upstream port.

122. A system for transferring data from multiple sources along a chain of nodes with zero time skew between the data flow at the nodes comprising:
- a plurality of individual active circuit nodes in a sequential array culminating at an apex node, the coupling between successive nodes introducing no more than a given maximum time delay;
- a master clock source coupled to the apex node;
- a plurality of individual clock generating circuits, each disposed at a different node and generating a controllably adjustable clock signal at the nominal frequency of the master clock source;
- means coupling successive pairs of nodes for returning clock signals from the next successive node to an originating node;
- means at each node coupled to receive the clock signal and the returning clock signal for comparing the clock from an individual clock generating circuit to the retardation of the returning clock signals to generate an error signal; and
- means for controlling the individual clock generating circuit with the error signal, whereby all clock generating circuits maintain a uniform time relation to the master clock.

123. The system as set forth in claim 122 above, wherein the sequential array comprises a bidirectional tree, wherein the data is transmitted in message packets, and wherein the active circuit node include means responsive to the individual clock signals for transferring the message packets in both directions from the tree base and along the tree to arrive back at the tree base in synchronism.

124. The system as set forth in claim 123 above, including in addition sources coupled to each node at the base of the tree, and clock means at each source for subdividing the clock interval to provide at least one other higher frequency clock in predetermined phase relationship therewith.

125. The system as set forth in claim 124 above, wherein the means for providing the higher frequency clock signal includes means defining at least three signal phases within the clock interval.

126. In a multiprocessor system in which processors transfer message packets by broadcasting to all other processors, means for generating messages organized as a series of bytes defining a plurality of fields comprising:
- a command field comprising one of a selected sequence of message characterizing values of fixed byte length;
- a tag field following the command field and comprising a fixed length transaction number or processor identification number, both of varying data content and fixed byte length; and
- control bits in parallel with the bytes, the control bit sequences defining the fields.

127. The system as set forth in claim 126 above, including further an idle field to designate separations between messages, the idle field being defined by control bit sequences of fixed data content.

128. The system as set forth in claim 127 above, wherein the message further comprises a destination selection field of fixed length and varying data content following the tag field, and a data field of variable length following the destination selection field, the data field optionally including an initial key field of varying data content for characterizing the data.

129. The system as set forth in claim 128 above, wherein the destination selection field is subdivided into hash map address and hash map code selection portions of fixed length.

130. The system as set forth in claim 129 above, wherein the message further comprises an end of message field defined by a predetermined control bit sequence.

131. A system for determining the global status of the resources in a multiprocessor system, where the resource is associated with a local semaphore means in each processor which contains the resource, comprising:
- means for querying the local semaphore means in each processor to derive a plurality of concurrent responses; and
- means responsive to the concurrent responses for sorting the responses to derive a priority response indication of global status.

132. The system as set forth in claim 131 above, wherein the means for sorting comprises a network intercoupled throughout the multiprocessor system and sorting the responses in accordance with the contents thereof.

133. A multiprocessor system comprising:
- a plurality of individual processors having local, externally accessible semaphores; and
- a network coupled to all the processors for broadcasting queries and updates as to semaphore status concurrently to the processors.

134. The system as set forth in claim 133 above, wherein the processors further comprise means for transmitting messages, including semaphore status queries, having varying data contents and the network includes means for sorting the transmitted messages to broadcast a selected status query.

135. A multiprocessor system comprising:
- a plurality of processors, each including means for transmitting a status response of selected data content, concurrently with responses from other processors, to a status query; and
- network means coupled to the processors for arbitrating the responses in accordance with the data contents thereof to provide global indication of multiprocessor status in response to the query.

136. The system as set forth in claim 135 above, wherein the status responses vary in data content in accordance with processor readiness and wherein the global indication corresponds to the least ready processor status.

137. The system as set forth in claim 136 above, wherein the network means comprises a sort network.

138. The method of operating a plurality of processors which may be performing related tasks asynchronously so as to provide global task coordination, which method comprises the steps of:
- identifying tasks with global transaction numbers;
- sorting competing messages from different processors utilizing the data content of the communications, including the transaction numbers, to establish priority;
- locally establishing processor status pertaining to each given transaction number;
- transmitting a status request for sorting with competing messages;

concurrently transmitting transaction status from the processors in response to a status request that gains priority; and merging the status responses in accordance with a predetermined priority rule such that an "update level" having the least priority takes precedence, whereby the global resource ascertains from the received response the readiness of the system in global terms.

139. The method as set forth in claim 138 above, wherein a transaction number of 0 identifies a non-merge mode, and wherein transaction numbers other than 0 identify competing communications that are to be merged, whereby processors are commanded as well as referenced by the transaction numbers.

140. The method as set forth in claim 139 above, including in addition the steps of commanding the processors to assign and relinquish transaction numbers by messages transmitted for sorting with competing messages.

141. The method as set forth in claim 140 above, including the steps of including destination selection information in the messages and locally determining from the priority messages sorted from competing messages which messages are to be acted on by the individual processor, whereby with the transaction numbers and commands the different processors can intercommunicate in different ways.

142. The method of monitoring the status of related but asynchronous individual processor activities in a multiprocessor system coupled by a sorting network comprising the steps of:
transmitting a transaction identity on the network to the processors for common referencing relative to each particular task that is to be performed by related subtasks;
accepting the transaction identity reference at each processor that is to function relative to the task;
associating with the transaction identity at each processor that is to function as to the task, a locally updated local status indication that is accessible to the network;
querying the processors concurrently to obtain concurrent local status indications as to a given transaction identity; and
merging the local status indications pertaining to a transaction identity to obtain a network determination of the transaction status.

143. The method as set forth in claim 142 above, further including the step of merging processed messages pertaining to a transaction identity following indication of readiness of all processors functioning on the given task.

144. The method as set forth in claim 142 above, further including the step of shifting to a different transaction identity to determine the readiness state thereof when the processors are not yet ready as to a first transaction identity.

145. The method as set forth in claim 144 above, wherein the local status indications have an order of priority and further including the steps of concurrently transmitting local status indications from each processor and merging such indications in accordance with the order of priority, with the least ready indication representing the global system status as to that transaction identity.

146. The method as set forth in claim 145 above, further including the step of assigning further coordination of global status determinations to the processor in the least ready status.

147. The method of placing messages from a plurality of processors in a sorted order, the messages being generated during the completion of asynchronous processing tasks, the method comprising the steps of:
assembling, at the individual processors, sorted sequences of messages in suborders pertaining to transaction numbers in the messages;
synchronously transmitting the highest priority messages from each of the processors pertaining to a given transaction number;
dynamically prioritizing the competing messages to reject all but that message having highest priority;
synchronously repeating the transmission of successive highest priority messages until all the messages in the sorted suborder pertaining to a given transaction number have been completely transmitted; and
successively repeating the sequence for messages pertaining to transaction numbers in descending order of priority.

148. The method as set forth in claim 147 above further comprising the steps of:
querying all processors concurrently as to state of readiness pertaining to a given transaction number;
locally indicating status of readiness concurrently; and
prioritizing the local indications to determine the least state of readiness as to the given transaction number.

149. The method of communicating with a plurality of processors in a multiprocessor system to determine the global status of the system as to a task divided into subtasks being performed asynchronously by the processors, comprising the steps of:
providing concurrent status indications from each of the processors as to the state of readiness of that processor as to its subtask; and
sorting the concurrent status indications.

150. The method as set forth in claim 149 above, wherein the status indications vary in data content and the step of sorting comprises sorting in accordance with data content.

151. The method as set forth in claim 150 above, further including the steps of:
broadcasting a query to the processors to elicit the concurrent status indications;
providing the concurrent status indications as serial signal trains; and
sorting the serial signal trains to a single or common priority signal train in a predetermined fixed time interval.

152. The method of communicating between multiple processors comprising the steps of:
maintaining a plurality of differently identified semaphores at each processor under local processor control; and
externally testing corresponding semaphores at all processors with a broadcast addressed to all processors for a specific identity.

153. The method as set forth in claim 152 above, further comprising the steps of:
transmitting messages from the processors concurrently; and
sorting the concurrent messages to derive a message for broadcast.

154. The method of providing a global assessment of the work status of processors as to a given task in a multiprocessor system comprising the steps of:
- locally selecting, at each processor, one of a number of predetermined messages of different data content to indicate the local instantaneous readiness state as to the given task;
- externally eliciting the messages concurrently from all processors involved in the given task; and
- aribtrating the messages to establish the priority message based on data content.

155. The method as set forth in claim 154 above, wherein the messages vary in data content in accordance with a predetermined schedule of readiness states, the lowest data content indicating least readiness state, and wherein the arbitration step awards priority to the message of lowest data content.

* * * * *

UNITED STATES PATENT AND TRADEMARK OFFICE
CERTIFICATE OF CORRECTION

PATENT NO. : 4,412,285

DATED : October 25, 1983

INVENTOR(S) : Philip M. Neches et al

It is certified that error appears in the above-identified patent and that said Letters Patent are hereby corrected as shown below:

Column 14, line 6, "('hased')" should read --("hashed")--. Column 17, line 49, after "the" (first occurrence) and before "AO", "ouput" should read --output--. Column 19, lines 1 and 2, strike "The same 0, 1 sequence defines the start of a field."; line 9, after "signals", "ane" should read --are--. Column 20, line 53, after "by", "96" should read --τ--. Column 27, line 31, before "transmission", "from" should read --for--. Column 33, line 21, after "depicted", "at" should read --as--. Columns 37 and 38, under "Simple Semaphore", line 17, after "alone", insert --and--. Column 44, line 59, after "employed", "there" should read --these--. Column 45, line 12, after "cycle", the comma (",") should read a period (--.--). Column 49, line 48, after "the", "procesor" should read --processor--. Column 51, line 3, after "above," "therin" should read --therein--. Column 52, line 51, after "the" (second occurrence), "procesor" should read --processor--. Column 54, line 29, after "identification", "or" should read --of--. Column 56, line 13, after "the" (second occurrence), strike "associated"; line 14, before

UNITED STATES PATENT AND TRADEMARK OFFICE
CERTIFICATE OF CORRECTION

PATENT NO. : 4,412,285

DATED : October 25, 1983

INVENTOR(S) : Philip M. Neches et al

Page 2 of 2

It is certified that error appears in the above—identified patent and that said Letters Patent are hereby corrected as shown below:

"therewith" insert --associated--. Column 58, line 44, after "numbers", "are" should read --and--. Column 60, line 26, after "field", "translations" should read --transitions--.

Signed and Sealed this

Twenty-sixth Day of June 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,412,285

DATED : October 25, 1983

INVENTOR(S) : Philip M. Neches et al

Page 1 of 2

It is certified that error appears in the above-identified patent and that said Letters Patent are hereby corrected as shown below:

Column 14, line 6, "('hased')" should read --("hashed")--. Column 17, line 49, after "the" (first occurrence) and before "AO", "ouput" should read --output--. Column 19, lines 1 and 2, strike "The same 0, 1 sequence defines the start of a field."; line 9, after "signals", "ane" should read --are--. Column 20, line 53, after "by", "96" should read --τ--. Column 27, line 31, before "transmission", "from" should read --for--. Column 33, line 21, after "depicted", "at" should read --as--. Columns 37 and 38, under "Simple Semaphore", line 17, after "alone", insert --and--. Column 44, line 59, after "employed", "there" should read --these--. Column 45, line 12, after "cycle", the comma (",") should read a period (--.--). Column 49, line 48, after "the", "procesor" should read --processor--. Column 51, line 3, after "above," "wherin" should read --wherein--. Column 52, line 51, after "the" (second occurrence), "procesor" should read --processor--. Column 54, line 29, after "identification", "or" should read --of--. Column 56, line 13, after "the" (second occurrence), strike "associated"; line 14, before

UNITED STATES PATENT AND TRADEMARK OFFICE
CERTIFICATE OF CORRECTION

PATENT NO. : 4,412,285

DATED : October 25, 1983

INVENTOR(S) : Philip M. Neches et al

It is certified that error appears in the above-identified patent and that said Letters Patent is hereby corrected as shown below:

"therewith" insert --associated--. Column 58, line 44, after "numbers","are" should read --and--. Column 60, line 26, after "field", "translations" should read --transitions--.

This certificate supersedes certificate of correction issued June 26, 1984.

Signed and Sealed this

Twenty-second Day of October 1985

[SEAL]

Attest:

DONALD J. QUIGG

Attesting Officer

Commissioner of Patents and Trademarks—Designate